(12) United States Patent  
Koyanagi et al.

(10) Patent No.: US 6,849,797 B2  
(45) Date of Patent: Feb. 1, 2005

(54) PHOTOVOLTAIC CELL

(75) Inventors: Tsuguo Koyanagi, Kitakyushu (JP); Michio Komatsu, Kitakyushu (JP)

(73) Assignee: Catalysts & Chemicals Industries Co., Ltd. (JP)

( * ) Notice: Subject to any disclaimer, the term of this patent is extended or adjusted under 35 U.S.C. 154(b) by 0 days.

(21) Appl. No.: 10/422,429

(22) Filed: Apr. 24, 2003

(65) Prior Publication Data

US 2003/0201010 A1 Oct. 30, 2003

Related U.S. Application Data

(62) Division of application No. 09/786,093, filed as application No. PCT/JP00/04334 on Jun. 30, 2000, now Pat. No. 6,580,026.

(30) Foreign Application Priority Data

Jun. 30, 1999 (JP) .......................................... 11-186105  
Sep. 29, 1999 (JP) .......................................... 11-276268  
Nov. 25, 1999 (JP) .......................................... 11-333995  
Dec. 28, 1999 (JP) .......................................... 11-373673

(51) Int. Cl.⁷ ......................... H01L 31/04; H01M 14/00  
(52) U.S. Cl. ....................... 136/256; 136/263; 136/252; 429/111  
(58) Field of Search .............................. 136/263, 256, 136/252; 429/111; 106/287.18, 287.19, 285, 287.26, 287.3; 516/88, 90

(56) References Cited

U.S. PATENT DOCUMENTS

| | | | |
|---|---|---|---|
| 4,775,520 A | 10/1988 | Unger et al. | |
| 4,927,721 A | 5/1990 | Gratzel et al. | |
| 5,350,644 A | * 9/1994 | Graetzel et al. | ............ 429/111 |
| 5,486,941 A | 1/1996 | Saiuchi et al. | |
| 5,683,833 A | 11/1997 | Haussling et al. | |
| 6,291,763 B1 | * 9/2001 | Nakamura | .................. 136/256 |
| 6,469,243 B2 | 10/2002 | Yamanaka et al. | |
| 6,580,026 B1 | * 6/2003 | Koyanagi et al. | ............ 136/263 |

FOREIGN PATENT DOCUMENTS

| | | | |
|---|---|---|---|
| JP | 63-58878 A | * | 3/1988 |
| JP | (1988) 63-58878 A | | 3/1988 |
| JP | (1988) 63-94224 A | | 4/1988 |
| JP | (1987) 62-72514 A | | 10/1988 |
| JP | (1989) 01-220380 A | | 5/1990 |
| JP | (1991) 03-218915 A | | 9/1991 |
| JP | (1992) 04-21515 A | | 1/1992 |
| JP | 6-318766 A | * | 11/1994 |
| JP | (1993) 05-504023 A | | 6/1995 |
| JP | 11-260428 A | * | 9/1999 |
| JP | (1995) 7-140472 A | | 9/1999 |
| JP | (1999) 11-260428 A | | 9/1999 |

* cited by examiner

Primary Examiner—Alan Diamond  
(74) Attorney, Agent, or Firm—Webb Ziesenheim Logsdon Orkin & Hanson, P.C.

(57) ABSTRACT

A photovoltaic cell includes a first substrate having on its surface a first electrode layer having on its surface a semiconductor film on which a photosensitizer is adsorbed, and a second substrate having on its surface a second electrode layer. The first and second substrates are arranged so that the first electrode layer overlaid with the semiconductor film and the second electrode layer are opposite each other with an electrolyte disposed therebetween. Spacer particles are interposed between the semiconductor film and the second electrode layer, and at least one of the electrode-layer-having substrates is transparent. A coating liquid for forming the semiconductor film includes both a component for forming the semiconductor film as well as the spacer particles, dispersed in a dispersion medium.

4 Claims, 4 Drawing Sheets

PHOTOVOLTAIC CELL

CROSS-REFERENCE TO RELATED APPLICATION

This application is a divisional of U.S. patent application Ser. No. 09/786,093 filed Feb. 28, 2001, now U.S. Pat No. 6,580,026, which is the national phase of PCT/JP00/04334 filed Jun. 30, 2000.

BACKGROUND OF THE INVENTION

1. Field of the Invention

The present invention relates to a photovoltaic cell which is excellent in photovoltaic transduction efficiency (photovoltaic transfer efficiency).

More particularly, the present invention relates to a photovoltaic cell which realizes high electyron moving velocity, ensures prolonged stability of electrolyte layer and exhibits high photovoltaic transduction efficiency. Still more particularly, the present invention relates to a thin photovoltaic cell for solar cell, or thin flexible photovoltaic cell for solar cell, exhibiting high energy transduction efficiency.

2. Description of Related Art

Photovoltaic transducers are a material from which light energy is continuously taken out as electric energy and a material which converts light energy to electric energy by the utilization of an electrochemical reaction between electrodes. When a photovoltaic transducer material is irradiated with light, electrons are generated from one electrode. The electrons move to a counter electrode, and the electrons having reached the counter electrode return by migrating as ions through an electrolyte to the one elect-rode. This energy conversion is continuously carried out, so that it is utilized in, for example, a solar cell.

The common solar cell is produced by first forming an electrode on a support such as a glass plate coated with a transparent conductive film, subsequently forming a semiconductor film having a photosensitizer adsorbed thereon on a surface of the electrode, thereafter providing a counter electrode comprising a support such as a glass plate coated with another transparent conductive film, sealing an electrolyte between the counter electrode and the semiconductor film, and finally sealing the side faces with a resin or the like.

When the above semiconductor film is irradiated with sunlight, the photosensitizer adsorbed on the semiconductor absorbs visible-region rays to thereby excite itself. Electrons generated by this excitation move to the semiconductor, next to the transparent conductive glass electrode, and further to the counter electrode across a lead connecting the two electrodes to each other. The electrons having reached the counter electrode reduce the oxidation-reduction system in the electrolyte. On the other hand, the photosensitizer having caused electrons to move to the semiconductor is in oxidized form. This oxidized form is reduced by the oxidation-reduction system of the electrolyte to thereby return to the original form. In this manner, electrons continuously flow. Therefore, functioning as the solar cell can be realized.

The electrolyte to be sealed between the electrodes is dissolved in a solvent, selected according to the type of the electrolyte, to thereby obtain an electrolytic solution. The electrolytic solution is sealed in a cavity created by sealing the sides of the photovoltaic cell with, for example, a resin.

The above solvent can be selected from among, for example, water, alcohols, oligoesters, carbonates such as propione carbonate, phosphoric acid esters, dimethylformamide, dimethyl sulfoxide, N-methylpyrrolidone, N-vinylpyrrolidone, sulfur compounds such as sulfolane 66, ethylene carbonate and acetonitrile.

However, when the electrolyte is used in the form of such an electrolytic solution, the solar cell may suffer from, during a long-term service, alteration of solvent molecules, decomposition of solvent molecules, vaporization of low-boiling-point solvent, leakage of electrolytic solution (solvent and/or electrolyte) from sealed parts, etc. with the result that the performance, such as photovoltaic transduction efficiency, thereof is deteriorated. That is, the use of the electrolyte in the form of an electrolytic solution has a drawback in that the long-term stability is poor.

Moreover, depending on the type of electrolyte used in the electrolytic solution, hygroscopicity is exhibited to thereby absorb water, and it may occur that the water causes the electrolyte and the photosensitizer to decompose to result in performance deterioration.

The photovoltaic transduction efficiency of the current solar cell is not always satisfactory and there are limitations in the application thereof. Therefore, there is a demand for further enhancement of light utilization ratio.

It is an object of the present invention to provide a photovoltaic cell which is excellent in long-term stability, ensures high light utilization ratio and exhibits high photovoltaic transduction efficiency.

SUMMARY OF THE INVENTION

The first photovoltaic cell of the present invention comprises:

a first substrate (base) having on its surface an electrode layer (1), the electrode layer (1) having on its surface a semiconductor film (2) on which a photosensitizer is adsorbed, and a second substrate having on its surface an electrode layer (3), the first substrate and the second substrate arranged so that the electrode layer (1) overlaid with the semiconductor film (2) and the electrode layer (3) are opposite to each other with an electrolyte layer (4) interposed therebetween, wherein the electrolyte layer (4) comprises an electrolyte and a liquid crystal, and wherein at least one of the electrode-layer-having substrates is transparent.

The first photovoltaic cell of the present invention contains a liquid crystal in the electrolyte layer thereof, so that, even if the angle of light incidence is large, the quantity of light received is not much decreased by virtue of the light scattering depending on the existence of the liquid crystal with the result that light energy can be stably transduced to electrical energy and taken out.

The second photovoltaic cell of the present invention comprises:

a first substrate having on its surface an electrode layer (21), the electrode layer (21) having on its surface a semiconductor film (22) on which a photosensitizer is adsorbed, and a second substrate having on its surface an electrode layer (23), the first substrate and the second substrate arranged so that the electrode layer (21) overlaid with the semiconductor film (22) and the electrode layer (23) are opposite to each other with an electrolyte sealed between the semiconductor film (22) and the electrode layer (23), wherein spacer particles are interposed between the semiconductor film (22) and the electrode layer (23), and wherein at least one of the electrode-layer-having substrates is transparent.

In the second photovoltaic cell of the present invention, spacer particles are interposed between the semiconductor film and the electrode layer opposite thereto, so that not only can the inter-electrode gap be decreased and uniformized but also the energy loss of charges (electrons) moving through the electrolyte layer can be reduced. Moreover, the whole cell can exhibit uniform optical and electrical characteristics. Therefore, the photovoltaic transduction efficiency can be enhanced, and the amount of electrolyte can be reduced.

The third photovoltaic cell of the present invention comprises:

a first substrate having on its surface an electrode layer (31), the electrode layer (31) having on its surface a semiconductor film (32) on which a photosensitizer is adsorbed, and a second substrate having on its surface an electrode layer (33), the first substrate and the second substrate arranged so that the electrode layer (31) overlaid with the semiconductor film (32) and the electrode layer (33) are opposite to each other with an electrolyte sealed between the semiconductor film (32) and the electrode layer (33), wherein spacer particles are sunk in the semiconductor film (32) in such a manner that at least portions of the spacer particles are exposed from the semiconductor film (32) so as to contact the electrode layer (33).

In the third photovoltaic cell of the present invention, the semiconductor film in which spacer particles are partly sunk is disposed opposite to the electrode layer with spacer particles interposed therebetween, so that not only can the-inter-electrode gap be decreased and uniformized but also the energy loss of charges (electrons) moving through the electrolyte layer can be reduced. Moreover, the whole cell can exhibit uniform optical and electrical characteristics to thereby enable improving apparent curve factor (FF) and configuration factor. Therefore, high photovoltaic transduction efficiency can be exhibited. Furthermore, by virtue of the interposition of spacer particles, contacting of the semiconductor film with the electrode layer opposite thereto can be avoided even when pressure is applied to the cell. Still further, the electrolyte layer can be made uniform and extremely thin, so that the light absorption by the electrolyte can be reduced. Still further, electromotive force is also effectively produced by incident light from the side of electrode opposite to the semiconductor film. Therefore, the photovoltaic cell can appropriately be used as a thin, or thin flexible, film solar cell.

In the above second and third photovoltaic cells, it is preferred that the spacer particles be spherical particles having an average diameter (D) of 1 to 100 μm.

Further, it is preferred that a surface of the semiconductor film (22), (32) that is brought into contact with the spacer particles have a roughness ($R_S$) of 5 μm or less, and also a surface of the electrode layer (23), (33) that is brought into contact with the spacer particles have a roughness ($R_E$) of 5 μm or less, and that the ratio of surface roughness ($R_S$) to average diameter of spacer particles (D), $R_S/D$, and the ratio of surface roughness ($R_E$) to average diameter of spacer particles (D), $R_E/D$, be both 0.2 or less.

The above semiconductor film (2), (22), (32) is preferably a metal oxide semiconductor film.

The spacer particles are preferably particles having a hydrophobic (water repellent) surface, and a dispersion medium thereof is preferably a solvent which is miscible with water. The component for semiconductor film formation preferably comprises particles of crystalline titanium oxide.

The fourth photovoltaic cell of the present invention comprises:

a first substrate having on its surface an electrode layer (41), the electrode layer (41) having on its surface a metal oxide semiconductor film (42) on which a photosensitizer is adsorbed, and a second substrate having on its surface an electrode layer (43), the first substrate and the second substrate arranged so that the metal oxide semiconductor film (42) and the electrode layer (43) are opposite to each other with an electrolyte layer interposed therebetween, wherein:

(i) the metal oxide semiconductor film (42) comprises metal oxide particles having an average diameter of 5 to 600 nm, (ii) the metal oxide particles each have a core/shell structure comprising a core particle part and, disposed on a surface thereof, a shell part, (iii) the core particle parts have an average diameter of 2 to 500 nm, and the shell parts have a thickness ranging from 1 to 150 nm, and (iv) the metal oxide constituting the core particle parts and the metal oxide constituting the shell parts have intrinsic volume resistivity values ($E_C$) and ($E_S$), respectively, which satisfy the relationship:

$$E_C < E_S.$$

In the fourth photovoltaic cell, it is preferred that the metal oxide constituting the shell parts be crystalline titanium oxide. The crystalline titanium oxide is preferably one obtained by heating/aging of peroxotitanic acid. Further, it is preferred that the metal oxide semiconductor film comprise metal oxide particles and a titanium oxide binder.

The coating liquid for forming a semiconductor film for use in a photovoltaic cell according to the present invention comprises a component for semiconductor film formation and spacer particles both dispersed in a dispersion medium. Peroxotitanic acid is preferably contained as the binder component. The average diameter of spacer particles is preferably in the range of 1 to 100 μm.

DESCRIPTION OF MARK

1: transparent electrode layer,
2: metal oxide semiconductor film,
3: electrode layer,
4: electrolyte,
5: transparent substrate,
6: substrate,
11: transparent electrode layer,
12: metal oxide semiconductor layer,
13: electrode layer,
14: conductive protrusions,
15: electrolyte,
16: transparent substrate,
17: substrate,
21: transparent electrode layer,
22: metal oxide semiconductor film,
23: electrode layer,
24: electrolyte,
25: transparent substrate,
26: substrate,
27: spacer particles,
31: transparent electrode layer,
32: semiconductor film,
33: electrode layer,
34: electrolyte,
35, 36: substrate,
37: spacer particles,
41: transparent electrode layer,
42: semiconductor film having a photosensitizer adsorbed thereon,
43: electrode layer,
44: electrolyte,
45, 46: substrate, and
47: spacer particles.

DETAILED DESCRIPTION OF THE INVENTION

The photovoltaic cells of the present invention will now be described in detail.

First Photovoltaic Cell

The first photovoltaic cell of the present invention comprises:

a first substrate having on its surface an electrode layer (1), the electrode layer (1) having on its surface a semiconductor film (2) on which a photosensitizer is adsorbed, and a second substrate having on its surface an electrode layer (3), the first substrate and the second substrate arranged so that the electrode layer. (1) overlaid with the semiconductor film (2) and the electrode layer (3) are opposite to each other with an electrolyte layer (4) interposed therebetween, wherein the electrolyte layer (4) comprises an electrolyte and a liquid crystal, and wherein at least one of the electrode-layer-having substrates is transparent.

Figure 1:
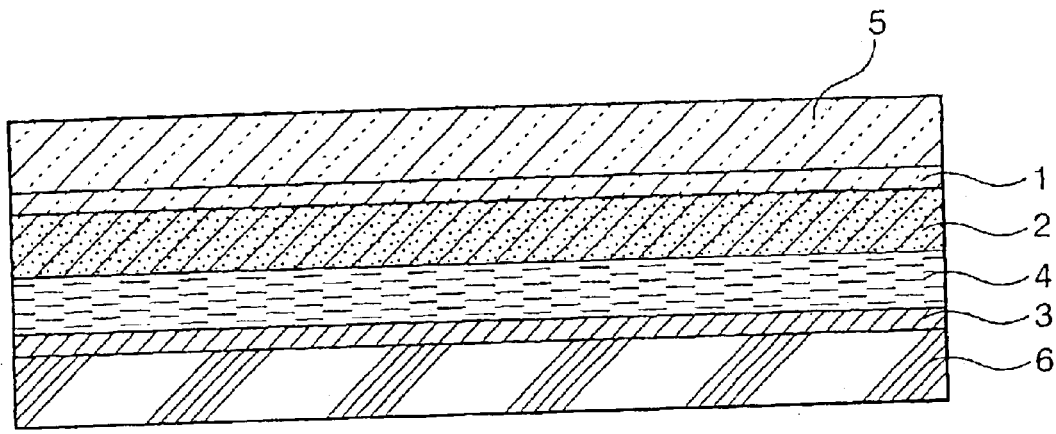
FIG. 1 is a schematic sectional view of one form of the first photovoltaic cell according to the present invention.

This photovoltaic cell is, for example, as shown in FIG. 1.

FIG. 1 is a schematic sectional view of one form of the first photovoltaic cell according to the present invention. Referring to FIG. 1, the photovoltaic cell comprises:

a first substrate 5 having on its surface a transparent electrode layer 1, the transparent electrode layer 1 having on its surface a semiconductor film 2 on which a photosensitizer is adsorbed, and a second substrate 6 having on its surface an electrode layer 3 with reducing catalytic activity, the first substrate 5 and the second substrate 6 arranged so that the electrode layer 1 and the electrode layer 3 are opposite to each other with an electrolyte layer 4 sealed between the semiconductor film 2 and the electrode layer 3, the electrolyte layer 4 comprising an electrolyte and a liquid crystal.

(Substrate and Semiconductor Film)

Substrates which are transparent and have insulating properties, such as a glass plate and a substrate of PET or other organic polymers, can be used as transparent substrate 5.

On the other hand, the substrate 6 is not particularly limited as long as it has the strength not to break easily. Not only insulating substrates such as a glass plate and a substrate of PET or other organic polymers but also conductive substrates of metals such as titanium, aluminum, copper and nickel can be employed.

The transparent electrode layer 1 superimposed on a surface of the transparent substrate 5 can be composed of common electrodes such as those of tin oxide, tin oxide doped with Sb, F or P, indium oxide doped with Sn and/or F, antimony oxide, zinc oxide and noble metals.

The above transparent electrode layer 1 can be formed by the use of conventional methods, such as the pyrolytic method and the CDV method.

The electrode layer 3 superimposed on a surface of the substrate 6 is not particularly limited as long as it is composed of a material having reducing catalytic activity. For example, the electrode material can be any of platinum, rhodium, metallic ruthenium and ruthenium oxide. Further, conductive materials, such as tin oxide, tin oxide doped with Sb, F or P, indium oxide doped with Sn and/or F and antimony oxide, having their surfaces overlaid with the above electrode materials by plating or vapor deposition can also be used as the electrode layer 3. Still further, common electrodes, such as carbon electrode, can be used for constituting the electrode layer 3.

This electrode layer 3 can be formed by overlaying the substrate 6 with the above electrode material by direct coating, plating or vapor deposition. Also, the electrode layer 3 can be formed by first being formed a conductive material into a conductive layer by the use of conventional methods such as the pyrolytic method and the CDV method and subsequently overlaying the conductive layer with the above electrode material by the use of conventional methods such as plating or vapor deposition.

The substrate 6 may be transparent like the transparent substrate 5. Also, the electrode layer 3 may be a transparent electrode like the transparent electrode layer 1.

It is preferred that the visible light transmission through the transparent substrate 5 and the transparent electrode layer 1 be high. For example, it is preferred that the visible light transmission be 50% or over, especially 90% or over. When the visible light transmission is lower than 50%, the photovoltaic transduction efficiency may be unfavorably low.

The value of resistance of each of the transparent electrode layer 1 and electrode layer 3 is preferably 100 Ω/□ or less. When the electrode layer resistance is higher than 100 Ω/□, the photovoltaic transduction efficiency may be unfavorably low.

Figure 2:
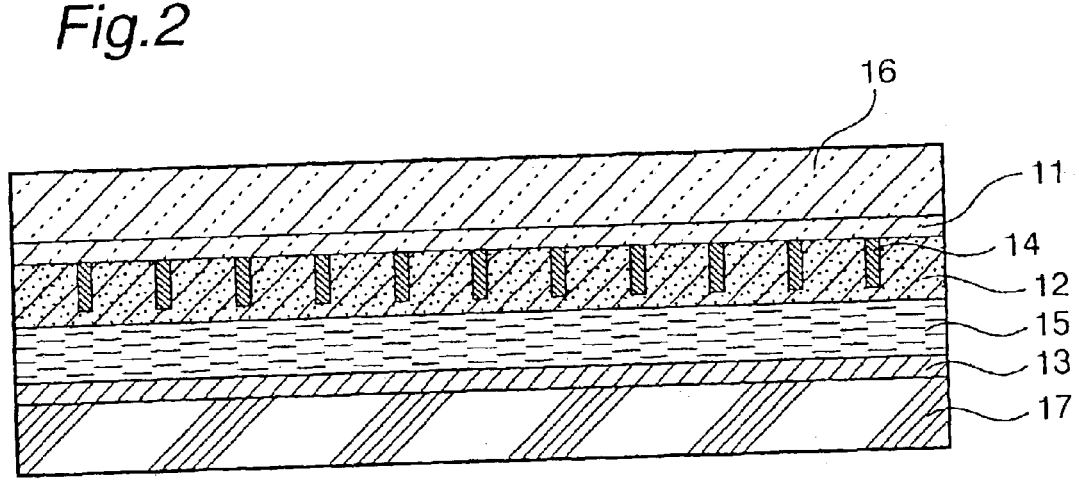
FIG. 2 is a schematic sectional view of another form of the first photovoltaic cell according to the present invention.

The transparent electrode layer 1 may have its surface furnished with conductive protrusions as shown in FIG. 2. When such conductive protrusions are provided, the semiconductor layer is formed so as to cover the conductive protrusions. FIG. 2 is a schematic sectional view of another form of the first photovoltaic cell according to the present invention. The photovoltaic cell comprises a transparent substrate 16 having on its surface a transparent electrode layer 11. The transparent electrode layer 11 has its surface furnished with conductive protrusions 14. The conductive protrusions 14 are overlaid with a semiconductor layer 12 on which a photosensitizer is adsorbed. The photovoltaic cell further comprises a substrate 17 having on its surface an electrode layer 13. The transparent substrate 16 and the substrate 17 are arranged so that the electrode layer 11 and the electrode layer 13 are opposite to each other with an electrolyte 15 sealed between the semiconductor layer 12 and the electrode layer 13.

The configuration of the conductive protrusions is not limited to the rectangular parallelopiped shown in FIG. 2, and the conductive protrusions may have, for example, a net or band shape. The conductive protrusions have not necessarily to be formed on a surface of the transparent electrode layer 11 as shown in FIG. 2, and may also be formed on a surface of the counter electrode layer 13. The conductive protrusions can be composed of common conductive materials as employed in the formation of the above electrode layer 13 and transparent electrode layer 11. When the conductive protrusions are formed on a surface of the transparent electrode layer 11, the conductive protrusions are preferably formed from a transparent conductive material. The conductive protrusions may be formed from conductive materials which are identical with or different from those employed in the transparent electrode layer 11 or electrode layer 13 on which the conductive protrusions are formed.

Figure 3:
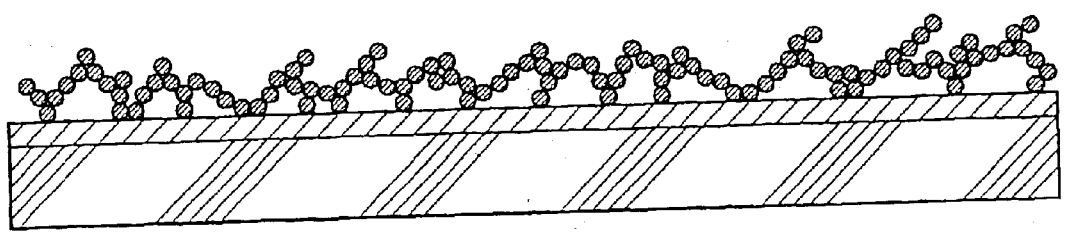
FIG. 3 is an enlarged sectional view of one form of conductive protrusion contour.
Figure 4:
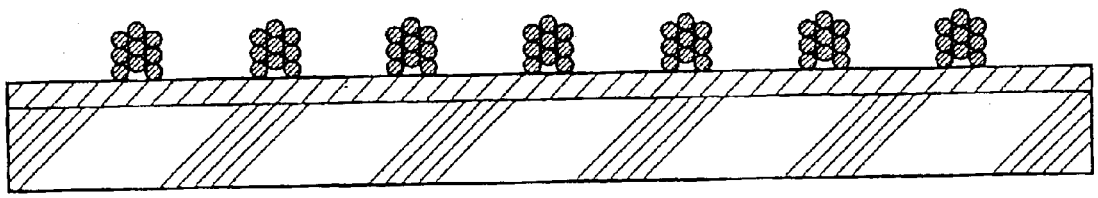
FIG. 4 is an enlarged sectional view of another form of conductive protrusion contour.

The conductive protrusions formed on an electrode layer are electrically connected with the electrode layer. The method of forming the conductive protrusions is not particularly limited. The formation thereof can be accomplished by, for example, the method in which an electrode film is superimposed on a substrate by the pyrolytic technique, the CVD technique, the vapor deposition technique or the like, subsequently a resist is applied onto a surface of the electrode film, thereafter patterning for the conductive protrusions is carried out, and finally the resist is etched. Also, after the formation of the transparent electrode layer 11 or electrode layer 13 by the CVD technique, the vapor deposition technique or the like, a conductive particle layer may be formed by applying a coating liquid containing conductive particles composed of the above conductive materials to thereby provide the conductive protrusions. The formation of protrusions in this manner enables providing those of a net structure as shown in FIG. 3. Alternatively, the conductive protrusions can be formed by applying a coating liquid containing conductive particles composed of a conductive material to thereby provide a conductive particle layer of closest packing, subsequently coating a layer surface with a resist, thereafter performing patterning for the conductive protrusions, and finally etching the resist. The formation of conductive protrusions in this manner enables providing those of a rectangular parallelopiped structure as shown in FIG. 4.

When the conductive protrusions are provided on the surface of electrode layer in the above manner, generated electrons can rapidly move to the electrode. Further, recombining of electrons with the photosensitizer can be inhibited. Therefore, the photovoltaic transduction efficiency of the photovoltaic cell can be enhanced.

When the conductive protrusions are provided, it is preferred that the individual conductive protrusions be positioned with a spacing therebetween which is at least twice the average thickness of the semiconductor layer. The height of the conductive protrusions is preferably in the range of 20 to 98% of the thickness of the semiconductor layer including the conductive protrusions. When the height falls within this range, the electrons within the semiconductor layer rapidly move to the electrode layer without recombining with the photosensitizer, so that the photovoltaic transduction efficiency of the photovoltaic cell can be enhanced. When the height is less than 20%, the effect of increasing the velocity of electron move to the electrode is unsatisfactory. On the other hand, when the height is greater than 98%, it may occur that the conductive protrusions are electrically connected with the electrolyte.

(Semiconductor Film)

The semiconductor film 2 is superimposed on the transparent electrode layer 1 provided on the transparent substrate 5. The semiconductor film 2 may be superimposed on either of the electrode layers. Thus, the semiconductor film may be superimposed on the electrode layer 3 provided on the substrate 6.

The thickness of this semiconductor film 2 is preferably in the range of 0.1 to 50 $\mu$m.

The pore volume of this semiconductor film 2 is preferably in the range of 0.05 to 0.8 ml/g, still preferably 0.1 to 0.6 ml/g. When the pore volume is smaller than 0.05 ml/g, the adsorption amount of photosensitizer is likely to be unfavorably small. On the other hand, when the pore volume is larger than 0.8 ml/g, it may occur that the electron mobility within the film is decreased to thereby lower the photovoltaic transduction efficiency.

The average pore diameter of the semiconductor film is preferably in the range of 2 to 250 nm, still preferably 5 to 100 nm. When the average pore diameter is smaller than 2 nm, the adsorption amount of photosensitizer is likely to be unfavorably small. On the other hand, when the average pore diameter is larger than 250 nm, it may occur that the electron mobility is decreased to thereby lower the photovoltaic transduction efficiency.

Figure 5:
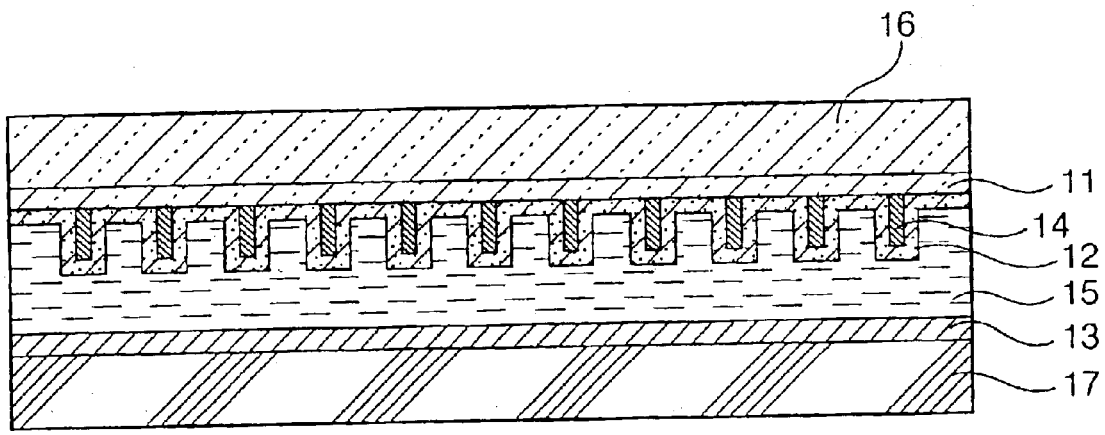
FIG. 5 is a schematic sectional view of a further form of the first photovoltaic cell according to the present invention.

When the conductive protrusions 14 are provided on the surface of electrode layer 11 as shown in FIG. 2, the semiconductor layer 12 may be formed so that the conductive protrusions 14 are buried therein as shown in FIG. 2, or so that the semiconductor layer is provided along the contour of the electrode layer 11 and conductive protrusions 14 as shown in FIG. 5. It is preferred that the semiconductor layer 12 be formed so that the semiconductor layer is provided along the contour of the electrode layer 11 and conductive protrusions 14 as shown in FIG. 5. The reference numerals of FIG. 5 have the same meaning as those of FIG. 2.

Even when the conductive protrusions are provided on the surface of transparent electrode layer, it is also preferred that the semiconductor layer 12 be formed so that the semiconductor layer is provided along the contour of the transparent electrode layer and conductive protrusions.

When the semiconductor layer 12 is formed so that the semiconductor layer is provided along the contour of the electrode layer and conductive protrusions, not only the area of contact of the semiconductor layer with the electrolyte but also the quantity of light incident on the semiconductor layer and the adsorption amount of photosensitizer are increased. As a result, the photovoltaic transduction efficiency can be enhanced.

For example, an inorganic semiconductor film formed from an inorganic semiconductor material, an organic semiconductor film formed from an organic semiconductor material and an organic inorganic hybrid semiconductor film can be used as the above semiconductor film.

The organic semiconductor material can be selected from among common compounds, such as phthalocyanine, phthalocyanine/bisnaphthohalocyanine, polyphenol, polyanthracene, polysilane and polypyrrole.

The inorganic semiconductor material can be selected from among metal compounds having semiconductor properties, such as titanium oxide, lanthanum oxide, zirconium oxide, niobium oxide, tungsten oxide, strontium oxide, zinc oxide, tin oxide and indium oxide, or among mixtures and composite oxides composed of two or more of these metal compounds.

In the present invention, a metal oxide semiconductor film is preferably employed as the semiconductor film. The metal oxide semiconductor film can be rendered porous, so that the adsorption amount of photosensitizer can be increased.

In the metal oxide semiconductor film of the present invention, the metal oxide is contained in the form of fine particles.

The fine particles of metal oxide can be produced by conventional methods, for example, the method in which a hydrous metal oxide gel or sol is prepared from an inorganic compound salt or organometallic compound containing titanium, lanthanum, zirconium, niobium, tungsten, strontium, zinc, tin, indium or the like by, for example, the sol gel technique and in which an acid or alkali is added to the sol or gel according to necessity and heated and aged.

The average diameter of metal oxide particles is preferably in the range of 5 to 600 nm, still preferably 10 to 300 nm. When the average diameter of metal oxide particles is less than 5 nm, it may occur that the formed metal oxide semiconductor film is likely to have cracks, thereby rendering it difficult to form a crackless thick film having a thickness mentioned later without carrying out two or more film forming operations. Further, it may occur that the pore diameter and pore volume of the metal oxide semiconductor film are reduced to thereby cause the adsorption amount of photosensitizer to unfavorably decrease. On the other hand, when the average diameter of metal oxide particles is larger than 600 nm, it may occur that the strength of the metal oxide semiconductor film is unsatisfactory.

The metal oxide particles for constituting the above metal oxide semiconductor film can be produced by conventional methods, for example, the method in which a hydrous metal oxide gel or sol is prepared from an inorganic compound salt or organometallic compound containing any of the above metals by the sol gel technique and in which, after an acid or alkali is added to the sol or gel according to necessity, the sol or gel is heated and aged.

It is preferred that the metal oxide particles be spherical particles. Especially, the metal oxide for constituting the particles is preferably crystalline titanium oxide consisting of at least one member selected from among anatase titanium oxide, brucite titanium oxide and rutile titanium oxide. The crystalline titanium oxide has advantageous properties, such as large band gap, high dielectric constant, larger adsorption amount of photosensitizer than in the use of other metal oxide particles, excellent stability and safety and easy film formation.

It is preferred that the crystallite diameter of the above crystalline titanium oxide particles be in the range of 1 to 50 nm, especially 5 to 30 nm. The crystallite diameter of the crystalline titanium oxide particles can be determined by measuring the half-value width of peak ascribed to crystal face of each crystal form by X-ray diffractometry and calculating from the measured width with the use of the Debye-Scherrer formula. Also, the crystallite diameter can be determined by observation of a field emission transmission electron micrograph (FE-TEM).

When the crystallite diameter of the crystalline titanium oxide particles is less than 1 nm, the electron mobility within the particles is decreased. On the other hand, when the crystallite diameter is larger than 50 nm, the adsorption amount of photosensitizer is reduced. Thus, in both instances, the photovoltaic transduction efficiency may be unfavorably low.

The crystalline titanium oxide particles can be obtained by conventional methods, for example, the method in which hydrous titanic acid gel or sol is prepared by, for example, the sol gel technique and, after the addition of an acid or alkali according to necessity, the gel or sol is heated and aged.

Also, the crystalline titanium oxide particles can be obtained by first adding hydrogen peroxide to a gel or sol of titanium oxide hydrate so that the titanium oxide hydrate is dissolved therein and converted to peroxotitanic acid, subsequently adding an alkali, preferably ammonia and/or an organic base, to the peroxotitanic acid so as to render the same alkaline and thereafter heating and aging at 80 to 350 C. Further, the crystalline titanium oxide particles can be obtained by adding the obtained crystalline titanium oxide particles as seed particles to peroxotitanic acid and repeating the above operations. According to necessity, firing can be effected at high temperatures of 350° C. or over.

The terminology "peroxotitanic acid" used herein refers to titanium peroxide hydrate. This titanium peroxide hydrate exhibits absorption in the visible light region, and can be prepared by adding hydrogen peroxide to an aqueous solution of a titanium compound or a sol or gel of titanium oxide hydrate and heating the mixture. The sol or gel of titanium oxide hydrate can be obtained by adding an acid or alkali to an aqueous solution of a titanium compound to thereby effect hydrolysis and, if necessary, carrying out washing, heating and aging of the hydrolyzate. The titanium compound to be employed, although not particularly limited, can be any of, for example, titanium salts such as titanium halides and titanyl sulfate, titanium alkoxides such as tetraalkoxytitaniums, and titanium compounds such as titanium hydride.

In the present invention, in particular, those obtained by adding an alkali to peroxotitanic acid and heating and aging the mixture are preferably employed as the crystalline titanium oxide particles.

The above crystalline titanium oxide particles are preferably in the form of colloid particles having an average particle diameter of 1 to 600 nm. The diameter of the crystalline titanium oxide particles can be measured by laser Doppler type particle diameter measuring instrument (manufactured by NIKKISO CO., LTD. microtrack). When the average particle diameter of the crystalline titanium oxide particles is less than 1 nm, it may occur that the formed metal oxide semiconductor film is likely to have cracks, thereby rendering it difficult to form a crackless thick film by a small number of coating operations. Further, it may occur that the pore diameter and pore volume of the metal oxide semiconductor film are reduced to thereby cause the adsorption amount of photosensitizer to unfavorably decrease. On the other hand, when the average particle diameter of the crystalline titanium oxide particles is larger than 600 nm, it may occur that the strength of the metal oxide semiconductor film is unsatisfactory.

The metal oxide particles can be those each having a core/shell structure comprising a core particle part and, disposed on a surface thereof, a shell part.

In the metal oxide particles having a core/shell structure for use in the present invention, it is preferred that the metal oxide constituting the core particle parts and the metal oxide constituting the shell parts have intrinsic volume resistivity values ($E_C$) and ($E_S$), respectively, which satisfy the relationship:

$$E_C < E_S.$$

When the intrinsic volume resistivity $E_C$ of the metal oxide constituting the core particle parts and the intrinsic volume resistivity $E_S$ of the metal oxide constituting the shell parts satisfy the above relationship, the photovoltaic cell comprising the semiconductor film composed of the metal oxide particles exhibits an enhanced photovoltaic transduction efficiency.

With respect to an especially appropriate combination of the metal oxide constituting the core particle parts and the metal oxide constituting the shell parts, it is preferred that the core particle parts be composed of F-doped tin oxide, Sn-doped indium oxide, indium oxide, low-order titanium oxide ($Ti_2O_3$), Al-doped zinc oxide or the like while the metal oxide constituting the shell parts consists of crystalline titanium oxide such as anatase titanium oxide, brucite titanium oxide or rutile titanium oxide.

When the shell parts are composed of the above crystalline titanium oxide, there can be realized advantageous properties, such as large band gap, high dielectric constant, larger adsorption amount of photosensitizer than in the use of other metal oxide particles, excellent stability and safety and easy film formation.

The average diameter of the core particle parts is preferably in the range of 2 to 500 nm, still preferably 4 to 250 nm. The thickness of the shell parts of the metal oxide particles, although depending on the size of the metal oxide particles, is preferably in the range of 1 to 150 nm, still preferably 2 to 100 nm.

The metal oxide semiconductor film 2 preferably contains a binder together with the above metal oxide particles.

As the binder, a titanium oxide binder obtained from a gel or sol of titanium oxide hydrate obtained by the sol gel technique or the like, or a titanium oxide binder composed of a peroxotitanic acid decomposition product obtained by adding hydrogen peroxide to a gel or sol of titanium oxide hydrate so that the titanium oxide hydrate is dissolved, can be used. Of these, a titanium oxide binder composed of a peroxotitanic acid decomposition product is preferred.

When this binder is contained, there can be obtained a dense homogeneous semiconductor film containing metal oxide (crystalline titanium oxide) particles. This metal oxide semiconductor film has a high adherence to the electrode. Further, the use of the above titanium oxide binder causes the mutual contact of metal oxide particles to change from a point contact to a surface contact with the result that the electron mobility can be enhanced. And then, the use of the above titanium oxide binder can cause the adsorption amount of photosensitizer to be increased.

In the metal oxide semiconductor film 2, the weight ratio, in terms of oxide, of binder to metal oxide particles (binder/metal oxide particles) is preferably in the range of 0.05 to 0.50, still preferably 0.10 to 0.30. When the weight ratio is less than 0.05, it may occur that the absorption of visible-region light is unsatisfactory and that the adsorption amount of photosensitizer cannot be increased. On the other hand, when the weight ratio is higher than 0.50, it may occur that no porous metal oxide semiconductor film cannot be obtained and that the adsorption amount of photosensitizer cannot be increased.

In the metal oxide semiconductor film 2, the pore volume is preferably in the range of 0.05 to 0.8 ml/g, still preferably 0.1 to 0.7 ml/g. Further, in the metal oxide semiconductor film 2, the average pore diameter is preferably in the range of 2 to 250 nm, still preferably 5 to 50 nm. When the pore volume is smaller than 0.05 ml/g, the adsorption amount of photosensitizer is likely to be unfavorably small. On the other hand, when the pore volume is larger than 0.8 ml/g, it may occur that the electron mobility within the film is decreased to thereby lower the photovoltaic transduction efficiency. Also, when the average pore diameter is smaller than 2 nm, the adsorption amount of photosensitizer is likely to be unfavorably small. On the other hand, when the average pore diameter is larger than 250 nm, it may occur that the electron mobility is decreased to thereby lower the photovoltaic transduction efficiency.

This metal oxide semiconductor film can be provided by coating a surface of electrode layer with a coating liquid for forming a metal oxide semiconductor film, which comprises the above metal oxide particles and dispersion medium, optionally together with a precursor of binder component.

When a precursor of metal oxide binder component is contained in the coating liquid for forming a metal oxide semiconductor film, the weight ratio to metal oxide particles ($MO_x(1)/MO_x(2)$ wherein $MO_x(1)$ represents a precursor of metal oxide binder component and $MO_x(2)$ represents metal oxide particles) is preferably in the range of 0.03 to 0.50, still preferably 0.10 to 0.30. When the weight ratio is less than 0.03, it may occur that the strength and conductivity of semiconductor film are unsatisfactory and that the adsorption amount of photosensitizer cannot be increased. On the other hand, when the weight ratio is higher than 0.50, it may occur that porous semiconductor film cannot be obtained and that the electron mobility cannot be increased.

These precursors of metal oxide binder component and metal oxide particles are preferably contained in the coating liquid for forming a metal oxide semiconductor film in a concentration of 1 to 30% by weight, still preferably 2 to 20% by weight, in terms of oxide ($MO_x(1)+MO_x(2)$).

Dispersion medium can be employed without any particular limitation as long as the precursor of metal oxide binder component and metal oxide particles can be dispersed therein and the dispersion medium can be removed by, for example, drying performed after coating. In particular, alcohols are preferred.

Furthermore, if necessary, a film formation auxiliary may be contained in the coating liquid for forming a metal oxide semiconductor film according to the present invention. The film formation auxiliary can be, for example, any of polyethylene glycol, polyvinylpyrrolidone, hydroxypropylcellulose, polyacrylic acid and polyvinyl alcohol.

When this film formation auxiliary is contained in the coating liquid, the viscosity of the coating liquid is increased to thereby enable obtaining a film of uniform thickness. Further, the metal oxide particles are densely packed in the film to thereby increase the bulk density. Thus, a metal oxide semiconductor film exhibiting high adherence to the electrode can be obtained.

The coating liquid is preferably applied in such an amount that the thickness of the finally formed metal oxide semiconductor film is in the range of 0.1 to 50 $\mu$m. With respect to the application method, the coating liquid can be applied by the use of conventional methods such as the dipping, spinner, spray, roll coater and flexographic printing methods.

The drying temperature for film is not limited as long as the dispersion medium can be removed.

According to necessity, the film may be irradiated with ultraviolet light to thereby decompose the precursor of binder component and promote hardening of the film. When the film formation auxiliary is contained in the coating liquid, the film may be heated after the hardening of the film to thereby decompose the film formation auxiliary.

After the hardening of the film, the film may be exposed to ions of at least one gas selected from among $O_2$, $N_2$, $H_2$, neon, argon, krypton and other inert gases belonging to Group 0 of the periodic table and annealed.

The method of exposing the film to ions is not particularly limited. For example, known methods such as the method of infiltrating a fixed amount of boron or phosphorus to a fixed depth in a silicon wafer at the time of manufacturing IC and LSI can be employed. The annealing is performed by heating at 200 to 500° C., preferably 250 to 400° C., for a period of 10 min to 20 hr.

By virtue of the above exposure to ions, a multiplicity of defects are formed at the surface of metal oxide particles, so that not only is the crystallinity of metal oxide particles after annealing enhanced but also the mutual joining of individual particles is promoted. As a result, not only is the bonding strength thereof with the photosensitizer increased but also the adsorption amount of photosensitizer is augmented. Furthermore, the promotion of particle joining increases the electron mobility. Consequently, the photovoltaic transduction efficiency can be enhanced.

(Spacer Particle)

Figure 6:
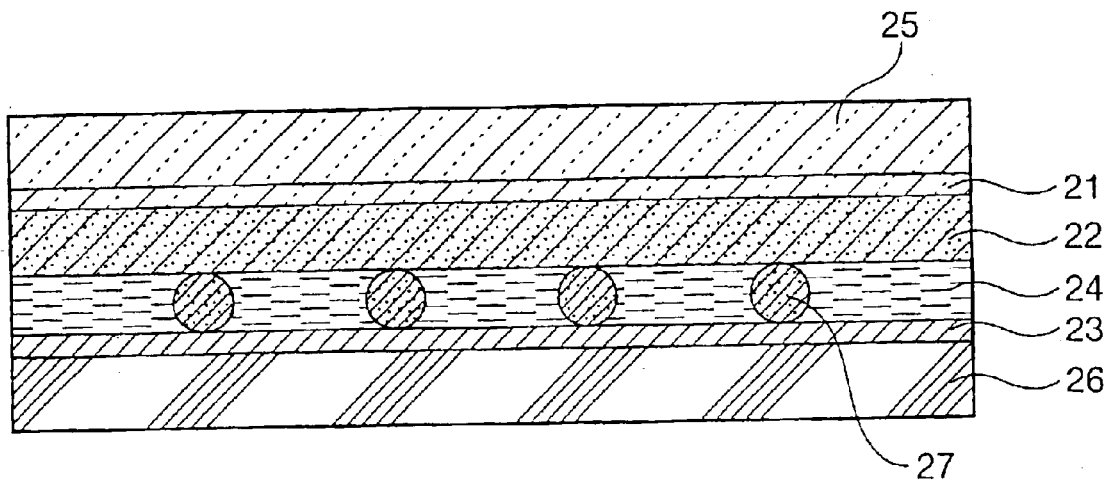
FIG. 6 is a schematic sectional view of one form of the second photovoltaic cell according to the present invention.
Figure 7:
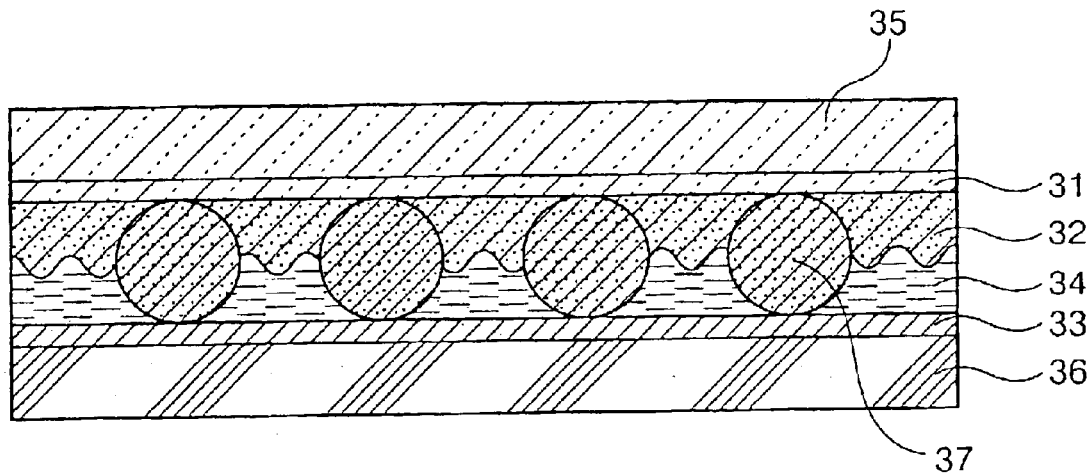
FIG. 7 is a schematic sectional view of one form of the third photovoltaic cell according to the present invention.
Figure 8:
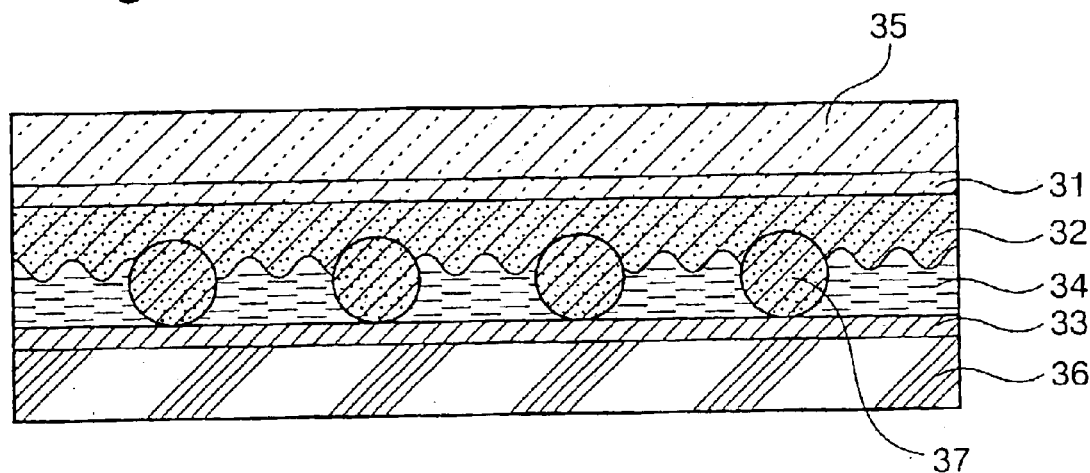
FIG. 8 is a schematic sectional view of another form of the third photovoltaic cell according to the present invention.

In the photovoltaic cell of the present invention, according to necessity, spacer particles may be interposed between the metal oxide semiconductor film and the electrode layer as shown in FIG. 6 described later. FIG. 6 is a schematic sectional view of one form of the second photovoltaic cell according to the present invention, and its detail will be described later. Referring to FIG. 7, spacer particles may be sunk in the semiconductor film in such a manner-that at least portions of the spacer particles are exposed from the semiconductor film 22 so as to contact the electrode layer 3. Further, referring to FIG. 8, spacer particles may be sunk in the semiconductor film in the state of being afloat on the semiconductor film 32. FIGS. 7 and 8 are schematic sectional views of varied forms of the third photovoltaic cell according to the present invention, and their details will be described later.

When the metal oxide semiconductor film is provided on the surface of electrode layer, it is appropriate to interpose spacer particles between the transparent electrode layer and the metal oxide semiconductor film which are opposite to each other.

The spacer particles are not particularly limited as long as the spacer particles are capable of inhibiting mutual contacting of the metal oxide semiconductor film and the electrode layer without damaging them. Use can be made of, for example, spherical spacer particles and rod-shaped spacer particles. With respect to materials, use can be made of known insulating particles of resins (plastics), organic inorganic composites, metal oxides, ceramics and the like. Interposing of spacer particles 7 enables efficiently obtaining a photovoltaic cell in which the gap between the metal oxide semiconductor film 2 and the electrode layer 3 is as small as about 1 to 50 $\mu$m.

Spacer particles of resins can be resin particles disclosed in, for example, Japanese Patent Publication No. 7(1995)-95165.

Particles obtained by hydrolyzing metal alkoxides, disclosed in, for example, Japanese Patent Laid-open Publication No. 7(1995)-140472 and Japanese Patent Publication No. 8(1996)-25739, can appropriately be employed as the spacer particles of organic inorganic composites.

Perfectly spherical particles disclosed in, for example, Japanese Patent Laid-open Publication No. 3(1991)-218915 and Japanese Patent Publication No. 7(1995)-64548 can appropriately be employed as the spacer particles of metal oxides or ceramics.

Furthermore, particles resulting from fusion bonding of a synthetic resin to surfaces of the above particles can also be appropriately used. Resin-coated particles disclosed in, for example, Japanese Patent Laid-open Publication No. 63(1988)-94224 can appropriately be employed as such particles. In particular, particles coated with an adherent resin adhere to the metal oxide semiconductor film and/or electrode layer, so that the particles are immobilized and do not easily move to thereby exert an effect of uniform gap regulation and a stress absorbing effect.

Particular examples of these spacer particles are the same as employed in the second and third photovoltaic cells, which will be described later.

(Photosensitizer)

In the present invention, a photosensitizer is adsorbed on the semiconductor film 2.

The photosensitizer is not particularly limited as long as it is capable of absorbing visible region and/or infrared region radiation to thereby excite itself. For example, an organic dye or a metal complex can be used as the photosensitizer.

Common organic dyes having, in the molecules thereof, functional groups such as carboxyl, hydroxyalkyl, hydroxyl, sulfone and carboxyalkyl groups can be used as the above organic dye. For example, use can be made of metal-free phthalocyanines, cyanine dyes, metalocyanine dyes, triphenylmethane dyes, and xanthene dyes such as uranine, eosine, Rose Bengale, Rhodamine B and dibromofluorescein. These organic dyes are characterized in that the adsorption velocity on the semiconductor film is high.

On the other hand, as the metal complex, there can be mentioned metal phthalocyanines such as copper phthalocyanine and titanylphthalocyanine; chlorophyll; hemin; ruthenium cis-diaqua-bipyridyl complexes such as ruthenium tris(2,2'-bispyridyl-4,4'-dicarboxylate), cis-(SCN⁻)-bis(2,2'-bipyridyl-4,4'-dicarboxylato)ruthenium and ruthenium cis-diaqua-bis(2,2'-bipyridyl-4,4'-dicarboxylate); porphyrin such as zinc tetra(4-carboxyphenyl)porphine; and ruthenium, osmium, iron and zinc complexes such as iron hexacyanide complex, as described in, for example, Japanese Patent Laid-open Publication No. 1(1989)-220380 and Japanese Translation of PCT Patent Applications from Other States, No. 5(1993)-504023 These metal complexes are excellent in spectral sensitization effect and durability.

The above organic dyes or metal complexes as the photosensitizer may be used either individually or in mixture, and, further, the organic dyes can be used in combination with the metal complexes.

The method of adsorbing these photosensitizers is not particularly limited. For example, use can be made of the customary method in which a photosensitizer is dissolved in a solvent and the thus obtained solution is absorbed on the metal oxide semiconductor film by, for example, the dipping, spinner or spray method and thereafter dried. If necessary, the absorbing operation can be repeated. Alternatively, the photosensitizer solution, while being heated, is circulated so as to contact the substrate, thereby enabling adsorption of the photosensitizer on the semiconductor film.

The solvent for dissolving photosensitizers is not limited as long as it is capable of dissolving them. For example, use can be made of any of water, alcohols, toluene, dimethylformamide, chloroform, ethyl cellosolve, N-methylpyrrolidone, tetrahydrofuran and the like.

The amount of photosensitizer adsorbed on the semiconductor film is preferably 50 μg or more per cm² of the semiconductor film. When the amount of photosensitizer is less than 50 μg, it may occur that the photovoltaic transduction efficiency is unsatisfactory.

(Electrolyte Layer)

The photovoltaic cell of the present invention is fabricated by first arranging the electrode-furnished substrates so that the semiconductor film 2 is opposite to the transparent electrode layer 3 (electrode layer plus semiconductor film when the semiconductor film is superimposed on the surface of transparent electrode layer), subsequently sealing the side faces with a resin or the like and thereafter interposing an electrolyte layer 4 comprising an electrolyte and a liquid crystal between the electrodes in a hermetically sealed manner.

A mixture of an electrochemically active salt and at least one compound capable of forming an oxidation-reduction system therewith is used as the electrolyte.

The electrochemically active salt can be, for example, a quaternary ammonium salt such as tetrapropylammonium iodide.

The compound capable of forming an oxidation-reduction system therewith can be, for example, any of quinone, hydroquinone, iodide (I⁻/I⁻₃), potassium iodide, bromide (Br⁻/Br⁻₃) and potassium bromide.

Further, in the present invention, a liquid crystal is used in combination with the electrolyte.

Conventional liquid crystals can be used without any particular limitation as long as the solubility of photosensitizer therein is so low that the photosensitizer adsorbed on the semiconductor film is not desorbed and dissolved.

Use can be made of smectic, nematic and cholesteric liquid crystals known as thermotropic liquid crystals. For example, use can be made of at least one liquid crystal compound selected from the group consisting of those represented by the formula:

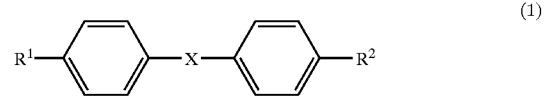

wherein X represents a direct bond for the phenyl groups, an ethylene group, an acetylene group (—C≡C—), an azo group (—N=N—), an azoxy group

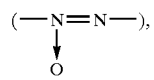

an ester group (—COO—), or a Schiff base (—CH=N—).

R¹ and R² may be identical with or different from each other, and each thereof represents an alkyl, an aryl, an arylalkyl, an alkylaryl, an alkoxy, an alkoxyalkyl, an alkoxyaryl, a carboxylic acid ester, a cyano or a nitro.

In the above formula (1), each of the atoms bonded to each benzene ring may be a hydrogen atom or a fluorine atom. The hydrogen atom as a constituent of an alkyl, an alkoxy or a carboxylic acid ester may be replaced by a fluorine atom.

n is an integer of 1 or greater.

Examples of these liquid crystal compounds include the following compounds:

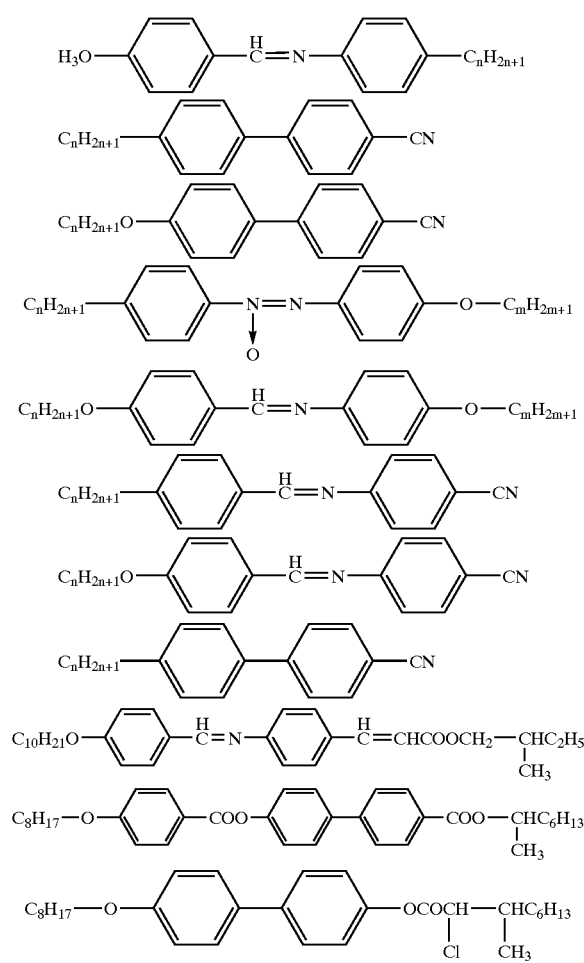

-continued
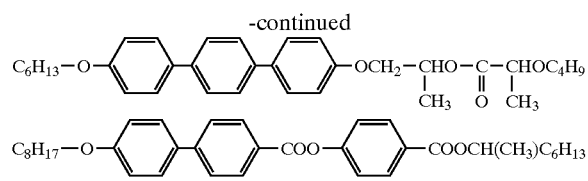
In place of the above, use can be made of the following liquid crystal compounds:
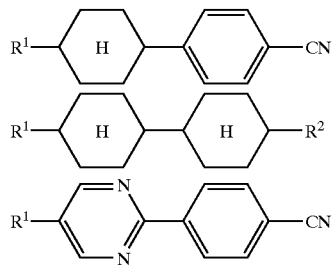
wherein $R^1$ and $R^2$ are as defined in the above formula (1).
Further, use can be made of the following liquid crystal compounds:
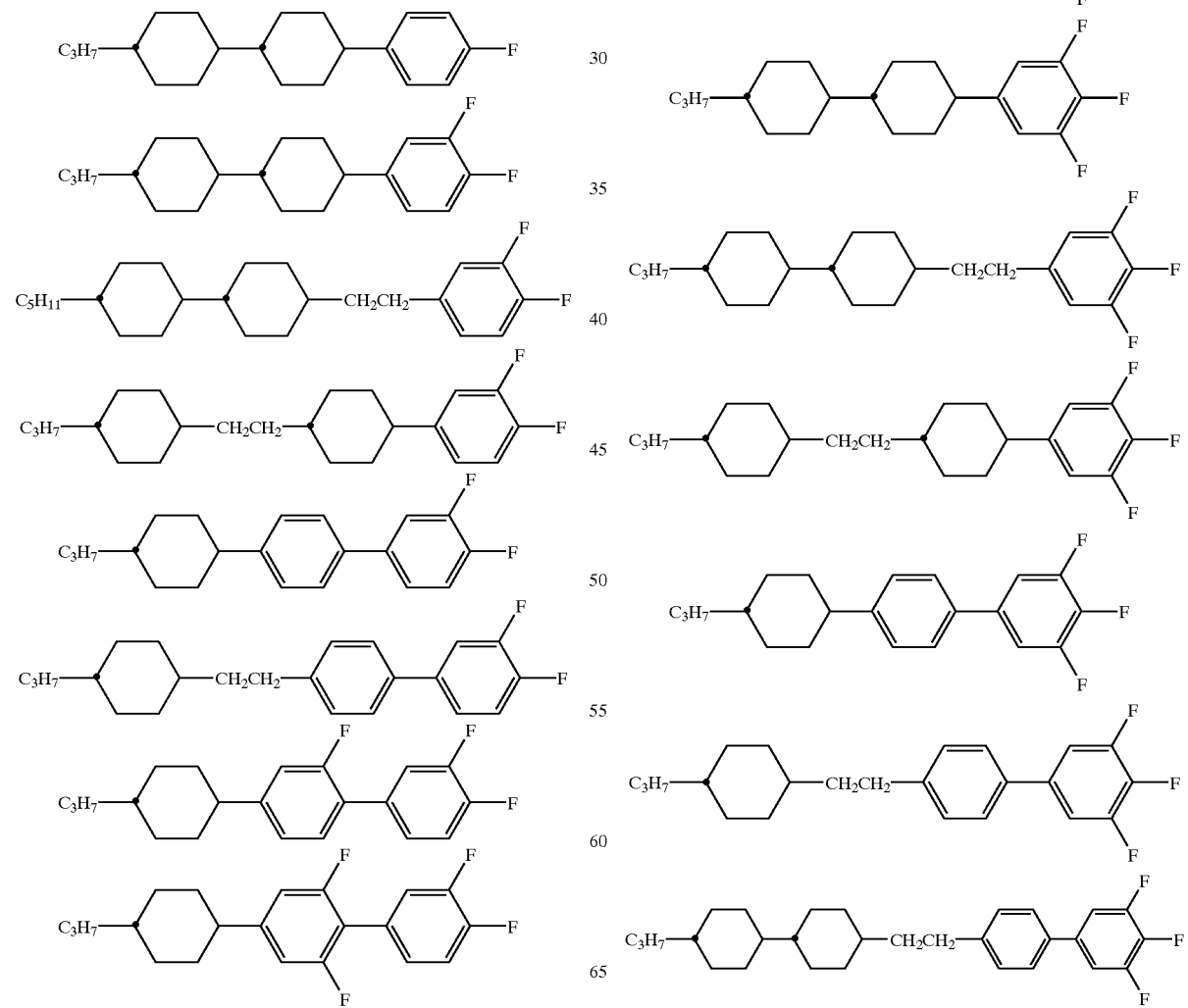
-continued
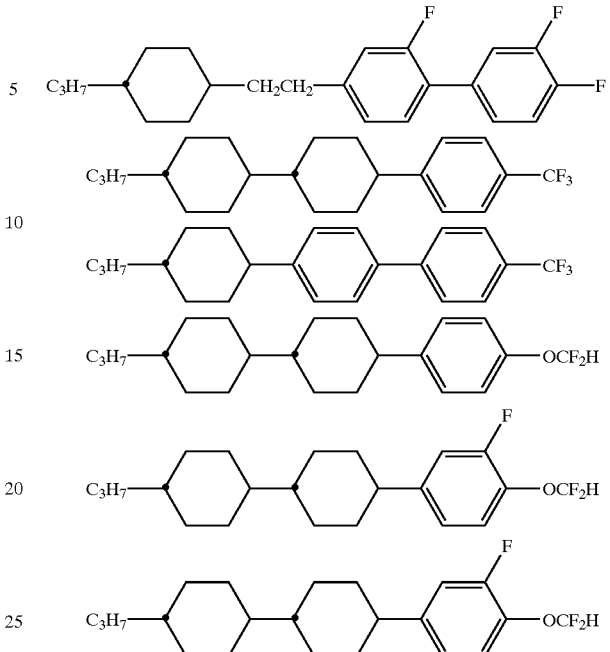

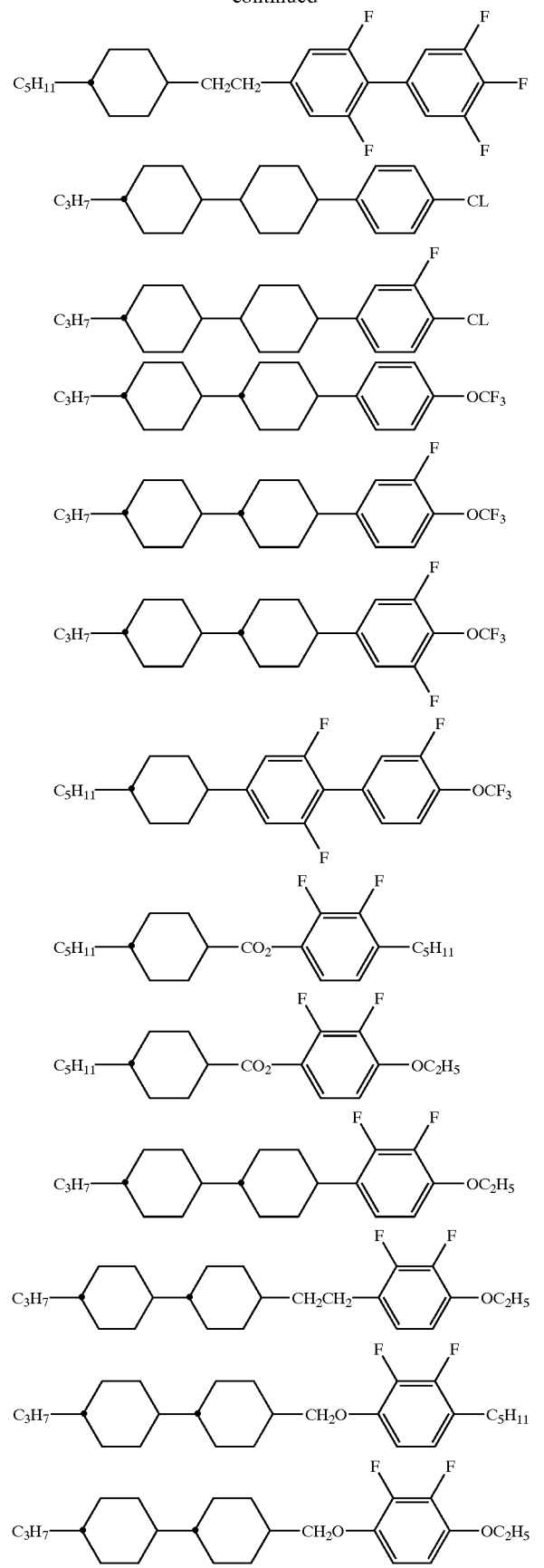
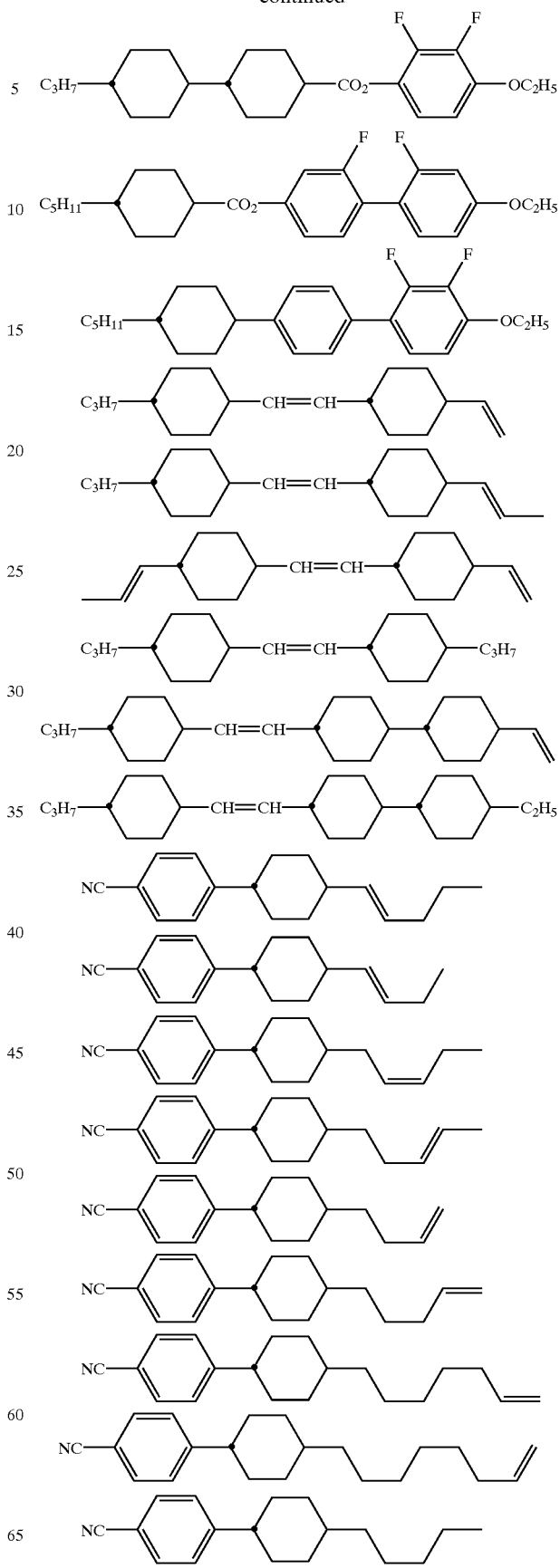

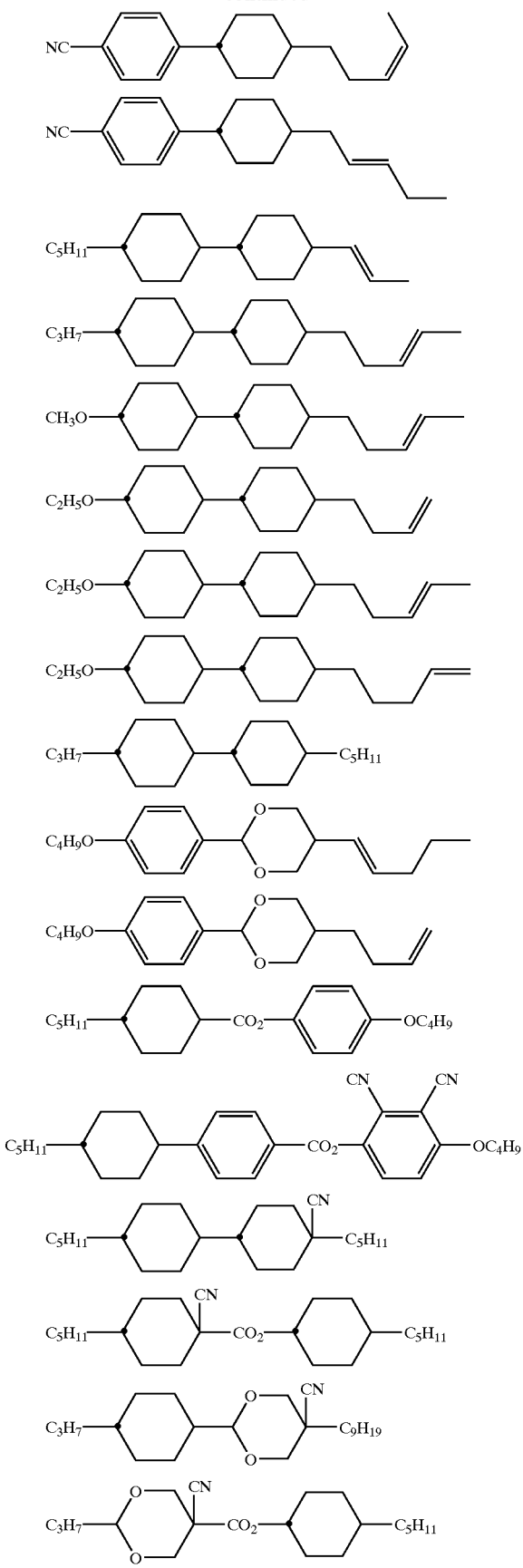

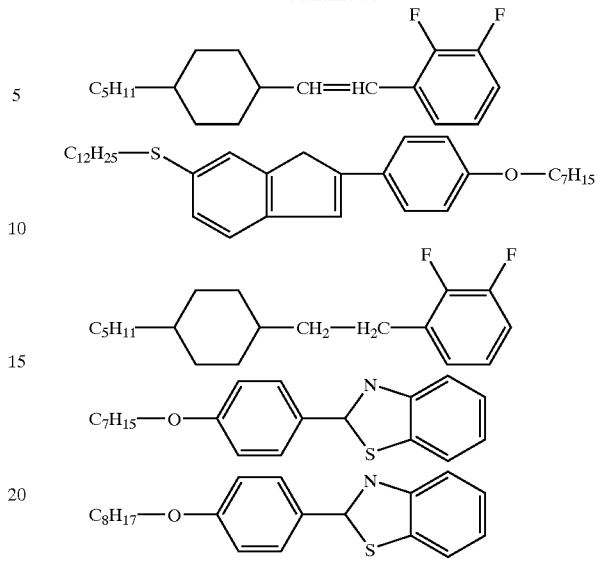

These liquid crystal compounds may be used in combination.

Still further, use can be made of lyotropic liquid crystals, polymer liquid crystals, polymer-dispersed liquid crystals and discotic liquid crystals. Of these, when liquid crystal compounds containing fluorine atoms are employed, high hydrophobicity and long-term stability can be realized.

A solvent may be contained in combination with the liquid crystal. The solvent is preferably one wherein the solubility of photosensitizer is so low that the photosensitizer adsorbed on the semiconductor film is not desorbed and dissolved. The solvent can be, for example, any of water, alcohols, oligoethers, carbonates such as propione carbonate, phosphoric esters, dimethylformamide, dimethyl sulfoxide, N-methylpyrrolidone, N-vinylpyrrolidone, sulfur compounds such as sulfolane 66, ethylene carbonate, acetonitrile and γ-butyrolactone.

Although the concentration of electrochemically active salt in the electrolyte layer is not particularly limited, it is generally preferred that the concentration be in the range of 0.01 to 5 mol/lit., especially 0.1 to 2 mol/lit., based on lit. of liquid crystal compound (when a solvent is contained, total of liquid crystal compound and solvent). When the concentration of electrochemically active salt is less than 0.01 mol/lit., it may occur that the concentration is so low that the capability of electron donation to, or acceptance from, the photosensitizer or electrode, exhibited by the electrochemically active salt is deteriorated to thereby result in low photovoltaic transduction efficiency. On the other hand, when the concentration of electrochemically active salt exceeds 5 mol/lit., it may occur that the electrochemically active salt is not dissolved in the liquid crystal and solvent.

Although the concentration of compound capable of forming an oxidation-reduction system in the electrolyte layer is not particularly limited, it is generally preferred that the concentration be in the range of 0.01 to 5 mol/lit., especially 0.1 to 2 mol/lit., based on lit. of liquid crystal compound (when a solvent is contained, total of liquid crystal compound and solvent). When the concentration of compound capable of forming an oxidation-reduction system is less than 0.01 mol/lit., it may occur that the concentration is so low that the capability of electron donation to, or acceptance from, the photosensitizer or electrode, exhibited by the compound capable of forming an oxidation-reduction system is deteriorated to thereby result in low photovoltaic transduction efficiency. Increasing of the concentration of compound capable of forming an oxidation-reduction system over 5 mol/lit. would not enhance the capability of electron donation and acceptance, and hence would not enhance the photovoltaic transduction efficiency. Further, when the concentration exceeds 5 mol/lit., it may occur that the long-term stability is deteriorated.

The molar ratio of compound capable of forming an oxidation-reduction system to electrochemically active salt (compound capable of forming an oxidation-reduction system/electrochemically active salt) in the electrolyte is preferably in the range of 1/20 to 3/10.

When a solvent is contained, the volume ratio ($V_S/V_{LC}$) of solvent ($V_S$) to liquid crystal ($V_{LC}$) is preferably 1.0 or less, still preferably 0.75 or less. When the volume ratio exceeds 1.0, it may occur that the ratio of liquid crystal is so low that the effect of increasing light energy utilization owing to the above light scattering effect is unsatisfactory and enhancement of the long-term stability cannot be accomplished.

The photovoltaic cell of the present invention is fabricated by first arranging a first substrate 5 having on its surface a transparent electrode layer 1, the transparent electrode layer 1 having on its surface a metal oxide semiconductor film 2 on which a photosensitizer is adsorbed, and a second substrate 6 having on its surface an electrode layer 3 with reducing catalytic activity so that the metal oxide semiconductor film 2 and the electrode layer 3 are opposite to each other; subsequently sealing the side faces with a resin; thereafter interposing an electrolyte and a liquid crystal optionally together with a solvent between the metal oxide semiconductor film 2 and the electrode layer 3 in a hermetically sealed manner; and finally connecting the electrodes to each other by means of a lead wire.

In the use of the thus obtained photovoltaic cell of the present invention, because the liquid crystal is contained in the electrolyte layer, the quantity of light received does not change much, even if the angle of light incidence is increased, owing to the light scattering effect of the liquid crystal to thereby enable stably transducing light energy to electrical energy and withdrawing the resultant electrical energy. Further, rays not having participated in the excitation of photosensitizer and having been reflected by the semiconductor film, among the incident rays, are re-utilized in the irradiation of the photosensitizer of the semiconductor film by virtue of the light scattering effect of the liquid crystal so that the rays are transduced to electrical energy. Thus, the transduction efficiency of light energy can be enhanced. Still further, when a hydrophobic liquid crystal is used as the liquid crystal, hygroscopicity is reduced as compared with that exhibited in the use of hygroscopic electrolyte only to thereby enable inhibiting the deterioration attributed to the decomposition of electrolyte, photosensitizer and solvent by moisture absorption. As a result, the effect of enhancing the long-term stability can be obtained.

Second Photovoltaic Cell

The second photovoltaic cell of the present invention comprises:

a first substrate having on its surface an electrode layer (21), the electrode layer (21) having on its surface a semiconductor film (22) on which a photosensitizer is adsorbed, and a second substrate having on its surface an electrode layer (23), the first substrate and the second substrate arranged so that the electrode layer (21) overlaid with the semiconductor film (22) and the electrode layer (23) are opposite to each other with an electrolyte sealed between the semiconductor film (22) and the electrode layer (23), wherein spacer particles are interposed between the semiconductor film (22) and the electrode layer (23), and wherein at least one of the electrode-layer-having substrates is transparent.

This second photovoltaic cell can be, for example, one shown in FIG. 6.

FIG. 6 is a schematic sectional view of one form of the second photovoltaic cell according to the present invention. Referring to FIG. 6, the second photovoltaic cell comprises:

a substrate 25 having on its surface a transparent electrode layer 21, the transparent electrode layer 21 having on its surface a semiconductor film 22 on which a photosensitizer is adsorbed, and a substrate 26 having on its surface an electrode layer 23 with reducing catalytic activity, the substrate 25 and the substrate 26 arranged so that the electrode layers 21 and 23 are opposite to each other. Between the semiconductor film 22 and the electrode layer 23, there are interposed spacer particles 27 and also there is provided an electrolyte layer 24 in which an electrolyte is sealed.

(Substrate)

As the transparent substrate 25, there can be employed substrates which are transparent and possess insulating properties, such as a glass plate and a substrate of PET or other organic polymers, particularized hereinbefore with respect to the first photovoltaic cell.

On the other hand, the substrate 26 is not particularly limited as long as the strength thereof can endure use. Not only insulating substrates such as a glass plate and a substrate of PET or other organic polymers but also conductive substrates of metallic titanium, metallic aluminum, metallic copper, metallic nickel and other metals can be employed.

The substrate 26 may be transparent like the transparent substrate 25.

In the present invention, spacer particles are interposed between the semiconductor film 22 and the transparent electrode layer 23. Therefore, the transparent substrate 25 and the substrate 26 do not necessarily have to be rigid, and use can be made of deformable substrates such as PET film. The use of deformable substrates enables preparing a photovoltaic cell having a non-planar configuration, for example, a semicylindrical or hemispherical configuration in order to enlarge the angle for receiving light.

(Electrode Layer)

Conventional electrodes as particularized hereinbefore with respect to the first photovoltaic cell can be used as the transparent electrode layer 21 to be superimposed on the surface of transparent substrate 25.

The electrode layer 23 superimposed on the surface of substrate 26 is not particularly limited as long as it has reducing catalytic activity, and use can be made of conventional electrodes as particularized hereinbefore with respect to the first photovoltaic cell.

This electrode layer 23 can be formed by the same conventional methods as in the preparation of the first photovoltaic cell, for example, the method in which the substrate 26 is overlaid with the above electrode material by direct coating, plating or vapor deposition, or the method in which a conductive material is first shaped into a conductive layer by the use of conventional methods such as the pyrolytic method and the CDV method and subsequently the conductive layer is overlaid with the above electrode material by the use of conventional methods such as plating or vapor deposition.

The electrode layer 23 may be transparent like the transparent electrode layer 21.

It is preferred that the visible light transmission through the transparent substrate 25 and the transparent electrode layer 21 be high. For example, it is preferred that the visible light transmission be 50% or over, especially 90% or over. When the visible light transmission is lower than 50%, the photovoltaic transduction efficiency may be unfavorably low.

The value of resistance of each of the transparent electrode layer 21 and electrode layer 23 is preferably 100 Ω/□ or less. When the electrode layer resistance is higher than 100 Ω/□, the photovoltaic transduction efficiency may be unfavorably low. Conductive protrusions may be provided on this transparent electrode layer or electrode layer in the same fashion as in the first photovoltaic cell.

(Semiconductor Film)

The semiconductor film 22 is superimposed on the transparent electrode layer 21 provided on the transparent substrate 25. The semiconductor film 22 may be superimposed on either of the electrode layers. Thus, the semiconductor film may be superimposed on the electrode layer 23 provided on the substrate 26. When conductive protrusions are provided, the semiconductor film may be formed so that the conductive protrusions are buried therein, or so that the semiconductor film is provided along the contour of the conductive protrusions.

The thickness of this semiconductor film 22 is preferably in the range of 0.1 to 50 μm.

The pore volume of this semiconductor film 22 is preferably in the range of 0.05 to 0.8 ml/g, still preferably 0.1 to 0.6 ml/g. When the pore volume is smaller than 0.05 ml/g, the adsorption amount of photosensitizer is likely to be unfavorably small. On the other hand, when the pore volume is larger than 0.8 ml/g, it may occur that the electron mobility within the film is decreased to thereby lower the photovoltaic transduction efficiency.

The same semiconductor films as particularized hereinbefore with respect to the first photovoltaic cell can be employed as the semiconductor film 22.

For example, an inorganic semiconductor film formed from an inorganic semiconductor material, an organic semiconductor film formed from an organic semiconductor material and an organic inorganic hybrid semiconductor film can be used as the above semiconductor film. The organic semiconductor material can be selected from among common compounds, such as phthalocyanine, phthalocyanine/bisnaphthohalocyanine, polyphenol, polyanthracene, polysilane and polypyrrole. In the present invention, an inorganic semiconductor film formed from an inorganic semiconductor material is preferably employed as the semiconductor film 22. It is especially desirable to use a metal oxide as the inorganic semiconductor material from the viewpoint that a porous semiconductor film wherein the adsorption amount of photosensitizer is high can be obtained.

This metal oxide can be at least one metal oxide selected from among titanium oxide, lanthanum oxide, zirconium oxide, niobium oxide, tungsten oxide, strontium oxide, zinc oxide, tin oxide and indium oxide.

The semiconductor film composed of this metal oxide generally comprises metal oxide particles.

The metal oxide particles can be produced by conventional methods, for example, the method described in connection with the first photovoltaic cell.

It is preferred that the metal oxide particles be spherical and have an average particle diameter of 1 to 600 nm. The particle diameter can be measured by laser Doppler type particle diameter measuring instrument (manufactured by NIKKISO CO., LTD.: microtrack).

When the average particle diameter is less than 1 nm, it may occur that the formed metal oxide semiconductor film is likely to have cracks, thereby rendering it difficult to form a crackless thick film having a thickness mentioned later by a small number of coating operations. Further, it may occur that the pore diameter and pore volume of the metal oxide semiconductor film are reduced to thereby cause the adsorption amount of photosensitizer to unfavorably decrease. On the other hand, when the average particle diameter is larger than 600 nm, it may occur that the strength of the metal oxide semiconductor film is unsatisfactory.

The above spherical metal oxide particles are preferably particles of crystalline titanium oxide consisting of at least one member selected from among anatase titanium oxide, brucite titanium oxide and rutile titanium oxide.

The crystalline titanium oxide has advantageous properties, such as large band gap, high dielectric constant, larger adsorption amount of photosensitizer than in the use of other metal oxide particles, excellent stability and safety and easy film formation.

It is preferred that the crystallite diameter of the above crystalline titanium oxide particles, like that of the first photovoltaic cell, be in the range of 1 to 50 nm, especially 5 to 30 nm. The crystalline titanium oxide particles can be produced in the same manner as described hereinbefore in connection with the first photovoltaic cell.

The metal oxide particles can be those each having a core/shell structure comprising a core particle part and, disposed on a surface thereof, a shell part. Those as particularized hereinbefore with respect to the first photovoltaic cell can be used as the above metal oxide particles having a core/shell structure. With respect to the metal oxide particles having a core/shell structure, it is preferred that the metal oxide constituting the core particle parts and the metal oxide constituting the shell parts have intrinsic volume resistivity values ($E_C$) and ($E_S$), respectively, which satisfy the relationship:

$$E_C < E_S.$$

When the intrinsic volume resistivity $E_C$ of the metal oxide constituting the core particle parts and the intrinsic volume resistivity $E_S$ of the metal oxide constituting the shell parts satisfy the above relationship, the photovoltaic cell comprising the semiconductor film composed of the metal oxide particles exhibits an enhanced photovoltaic transduction efficiency.

With respect to an especially appropriate combination of the metal oxide constituting the core particle parts and the metal oxide constituting the shell parts for use in the present invention, it is preferred that the core particle parts be composed of F-doped tin oxide, Sn-doped indium oxide, indium oxide, low-order titanium oxide ($Ti_2O_3$), Al-doped zinc oxide or the like while the metal oxide constituting the shell parts consists of crystalline titanium oxide such as anatase titanium oxide, brucite titanium oxide or rutile titanium oxide.

When the shell parts are composed of the above crystalline titanium oxide, there can be realized advantageous properties, such as large band gap, high dielectric constant, larger adsorption amount of photosensitizer than in the use of other metal oxide particles, excellent stability and safety and easy film formation.

The average diameter of the core particle parts is preferably in the range of 2 to 500 nm, still preferably 4 to 250 nm. The thickness of the shell parts of the metal oxide particles, although depending on the size of the metal oxide particles, is preferably in the range of 1 to 150 nm, still preferably 2 to 100 nm.

In the present invention, the metal oxide semiconductor film 22 may contain a binder component composed of a metal oxide together with the above metal oxide particles. The same compounds as particularized hereinbefore with respect to the first photovoltaic cell can be used as the binder component.

In the metal oxide semiconductor film, the weight ratio of metal oxide binder component to metal oxide particles ($MO_x(1)/MO_x(2)$ wherein $MO_x(1)$ represents a metal oxide binder component and $MO_x(2)$ represents metal oxide particles) is preferably in the range of 0.03 to 0.50, still preferably 0.1 to 0.3. When the weight ratio is less than 0.03, it may occur that the strength and conductivity of semiconductor film are unsatisfactory and that the adsorption amount of photosensitizer cannot be increased. On the other hand, when the weight ratio is higher than 0.50, it may occur that no porous semiconductor film cannot be obtained and that the electron mobility cannot be increased.

In particular, when the metal oxide semiconductor film comprises a titanium oxide binder component and crystalline titanium oxide particles, the weight ratio, in terms of $TiO_2$, of titanium oxide binder component to crystalline titanium oxide particles (titanium oxide binder component/ crystalline titanium oxide particles) is preferably in the range of 0.03 to 0.50, still preferably 0.1 to 0.3. When the weight ratio is less than 0.03, it may occur that the absorption of visible-region light is unsatisfactory and that the adsorption amount of photosensitizer cannot be increased. On the other hand, when the weight ratio is higher than 0.50, it may occur that no porous metal oxide semiconductor film cannot be obtained and that the adsorption amount of photosensitizer cannot be increased.

This metal oxide semiconductor film 22 can be prepared from, for example, the same coating liquid for forming a metal oxide semiconductor film for use in a photovoltaic cell as described hereinbefore in connection with the first photovoltaic cell.

The coating liquid for forming a metal oxide semiconductor film for use in a photovoltaic cell comprises the above metal oxide particles and dispersion medium, optionally together with a precursor of binder component.

For example, when the metal oxide particles are particles of crystalline titanium oxide, the coating liquid for forming a metal oxide semiconductor film for use in a photovoltaic cell comprises peroxotitanic acid as a precursor of binder component, crystalline titanium oxide particles and a dispersion medium. Peroxotitanic acid, as mentioned hereinbefore, can be prepared by adding hydrogen peroxide to an aqueous solution of a titanium compound, or a sol or gel of titanium oxide hydrate, and heating the mixture.

These precursor of metal oxide binder component and metal oxide particles are preferably contained in the coating liquid for forming a metal oxide semiconductor film for use in a photovoltaic cell in a concentration of 1 to 30% by weight, still preferably 2 to 20% by weight, in terms of $MO_x(1)+MO_x(2)$ wherein $MO_x(1)$ represents a precursor of metal oxide binder component and $MO_x(2)$ represents metal oxide particles.

Dispersion medium can be employed without any particular limitation as long as the precursor of metal oxide binder component and metal oxide particles can be dispersed therein and the dispersion medium can be removed by drying. In particular, alcohols are preferred.

Furthermore, if necessary, a film formation auxiliary may be contained in the coating liquid for forming a metal oxide semiconductor film for use in a photovoltaic cell according to the present invention. The film formation auxiliary can be, for example, any of polyethylene glycol, polyvinylpyrrolidone, hydroxypropylcellulose, polyacrylic acid and polyvinyl alcohol. When this film formation auxiliary is contained in the coating liquid, the viscosity of the coating liquid is increased to thereby enable obtaining a film of uniform thickness. Further, the metal oxide particles are densely packed in the film to thereby increase the bulk density. Thus, a metal oxide semiconductor film exhibiting high adherence to the electrode can be obtained.

The metal oxide semiconductor film 22 can be formed by coating the substrate with the coating liquid for forming a metal oxide semiconductor film for use in a photovoltaic cell, drying and, according to necessity, hardening the dried film. With respect to the application method, the coating liquid can be applied by the use of conventional methods such as the dipping, spinner, spray, roll coater, flexographic printing and screen printing methods.

The drying temperature is not limited as long as the dispersion medium can be removed.

The hardening of the film can be accomplished by, for example, ultraviolet irradiation. The ultraviolet irradiation causes the precursor of binder component to decompose to thereby harden the film. When the film formation auxiliary is contained in the coating liquid, the film may be heated after the hardening of the film to thereby decompose the film formation auxiliary.

After the hardening of the film by ultraviolet irradiation, the film may be exposed to ions of at least one gas selected from among $O_2$, $N_2$, $H_2$, neon, argon, krypton and other inert gases belonging to Group 0 of the periodic table and annealed in the same manner as mentioned hereinbefore with respect to the first photovoltaic cell.

In the exposing of the film to ions, use can be made of known methods such as the method of infiltrating a fixed amount of boron or phosphorus to a fixed depth in a silicon wafer at the time of manufacturing of IC and LSI. The annealing is performed by heating at 200 to 500° C., preferably 250 to 400° C., for a period of 10 min to 20 hr.

By virtue of the above exposure to gas ions, a multiplicity of defects are formed at the surface of metal oxide particles without the remaining of ions in the metal oxide semiconductor film, so that not only is the crystallinity of metal oxide particles after annealing enhanced but also the mutual joining of individual particles is promoted. As a result, not only is the bonding strength thereof with the photosensitizer increased but also the adsorption amount of photosensitizer is augmented. Furthermore, the promotion of particle joining increases the electron mobility. Consequently, the photovoltaic transduction efficiency may be enhanced.

A photosensitizer is adsorbed on the thus formed metal oxide semiconductor film 22.

The photosensitizer is not particularly limited as long as it is capable of absorbing visible region and/or infrared region radiation to thereby excite itself. For example, use can be made of the same photosensitizers as particularized hereinbefore with respect to the first photovoltaic cell.

The method of adsorbing these photosensitizers is not particularly limited. For example, use can be made of the same customary method as described hereinbefore with respect to the first photovoltaic cell.

The amount of photosensitizer adsorbed on the metal oxide semiconductor film is preferably 50 μg or more per cm$^2$ of specific surface area of the metal oxide semiconductor film. When the amount of photosensitizer is less than 50 μg, it may occur that the photovoltaic transduction efficiency is unsatisfactory.

(Spacer Particle)

In the second photovoltaic cell of the present invention, spacer particles 27 are interposed between the semiconductor film 22 and the electrode layer 23.

The spacer particles 27 are not particularly limited as long as the spacer particles are capable of uniformizing the inter-electrode gap or the gap between the semiconductor film 22 and the electrode layer 23. Use can be made of, for example, spherical spacer particles and rod-shaped spacer particles. With respect to materials, use can be made of known insulating particles of resins (plastics), organic inorganic composites, metal oxides, ceramics and the like.

As the spacer particles of resins, there can be mentioned, for example, resin particles disclosed in Japanese Patent Publication No. 7(1995)-95165 and other literature. Examples of such spacer particles of resins include those of linear or crosslinked polymers, such as polyethylene, polypropylene, polymethylpentene, polyvinyl chloride, polytetrafluoroethylene, polystyrene, polymethyl methacrylate, polyethylene terephthalate, polybutylene terephthalate, polyamides, polyimides, polysulfones, polyphenylene oxide and polyacetal; and resins having a network structure, such as epoxy resins, phenolic resins, melamine resins, unsaturated polyester resins, divinylbenzene polymer, divinylbenzene/styrene copolymer, divinylbenzene/acrylic ester copolymer, diallyl phthalate polymer, triallyl isocyanate polymer and benzoguanamine polymer. Of these, divinylbenzene polymer, divinylbenzene/styrene copolymer, divinylbenzene/acrylic ester copolymer and diallyl phthalate polymer are preferred.

Particles obtained by hydrolyzing metal alkoxides, disclosed in, for example, Japanese Patent Laid-open Publication No. 7(1995)-140472 and Japanese Patent Publication No. 8(1996)-25739, can appropriately be employed as the spacer particles of organic inorganic composites. Examples thereof include fine particles obtained by subjecting a tetraalkoxysilane and/or an alkyltrialkoxysilane to hydrolysis and polycondensation; and particles obtained by subjecting to hydrolysis, condensation and heating at least one hydrolyzable condensable silicon compound selected from the group consisting of compounds of the general formula $R^1{}_m Si(OR^2)_{1-m}$ (wherein $R^1$ represents a monovalent group selected from the group consisting of substituted or unsubstituted alkyl groups each having 1 to 10 carbon atoms, aryl groups each having 6 to 10 carbon atoms and unsaturated aliphatic residues each having 2 to 10 carbon atoms; $R^2$ represents a monovalent group selected from the group consisting of a hydrogen atom, alkyl groups each having 1 to 5 carbon atoms and acyl groups each having 2 to 5 carbon atoms; and m is an integer of 1 to 3) and derivatives thereof.

Perfectly spherical particles proposed by this applicant in, for example, Japanese Patent Laid-open Publication No. 3(1991)-218915 and Japanese Patent Publication No. 7(1995)-64548 can appropriately be employed as the spacer particles of metal oxides or ceramics. Examples thereof include monodispersed silica particles obtained by adding a tetraethoxysilane and/or silicic acid solution to a seed particle dispersion while keeping it alkaline and causing a tetraethoxysilane hydrolyzate and/or silicic acid polymerization mixture to adhere onto the seed particles.

Further, as the spacer particles, there can be employed particles of core/shell structure obtained by the following procedure. An alkali water dispersion of silica particles (pH=9 to 11) is prepared, heated and cooled. An ion exchange resin is added to thereby remove an alkali. Silica particles are separated, washed and dried. Thus, activated spherical core particles are obtained. Thereafter, the spherical core particles are dispersed in an alcohol, and a silicon compound such as hexamethyldisilazane is added thereto to thereby obtain hydrophobic core particles. Methyltrimethoxysilane is added and hydrolyzed so that the core particles are furnished with a coating layer of polyorganosiloxane, optionally followed by drying and thermal treatment. Thus, particles of core/shell structure are obtained.

Still further, particles resulting from fusion bonding of a synthetic resin to surfaces of the above particles can also be appropriately used. As such particles, there can appropriately be employed particles resulting from coating of surfaces of insulating substance particles with a synthetic resin, proposed by this applicant in Japanese Patent Laid-open Publication No. 63(1988)-94224. In particular, particles coated with an adherent resin adhere to the semiconductor film and/or electrode layer, so that the particles are immobilized and hence do not fluctuate. Further, since the synthetic resin layer at the surface portion can be easily deformed, the particles are excellent in an effect of uniform gap regulation and a stress absorbing effect.

It is preferred that these spacer particles be spherical particles whose average diameter (D) is in the range of 1 to 100 μm, especially 1 to 50 μm, and still especially 10 to 25 μm.

When the average particle diameter is less than 1 nm, the semiconductor film and the electrode layer may contact each other, depending on the roughnesses of the contacted surfaces of the semiconductor film and the electrode layer. On the other hand, when the average particle diameter exceeds 50 μm, the distance between the semiconductor film and the electrode layer may be so large that the energy loss of charges (electrons) moving through the electrolyte layer becomes unfavorably large. Moreover, the whole cell may not exhibit uniform optical and electrical characteristics to thereby lower the photovoltaic transduction efficiency. Further, the electrolyte and photosensitizer may be deteriorated by the use of an increased amount of electrolyte.

It is preferred that the roughnesses of the semiconductor film surface and electrode layer surface brought into contact with the spacer particles (the roughness of semiconductor film surface referred to as $R_S$, and the roughness of electrode layer surface referred to as $R_E$) be simultaneously 5 μm or less. It is also preferred that the ratio of surface roughness ($R_S$) to average diameter of spacer particles (D), $R_S/D$, and the ratio of surface roughness ($R_E$) to average diameter of spacer particles (D), $R_E/D$, be both 0.2 or less.

When the roughnesses of the semiconductor film surface and electrode layer surface brought into contact with the spacer particles are each greater than 5 μm, it may occur that a cell wherein the gap between the semiconductor film and the electrode layer is uniform cannot be produced despite the use of spacer particles. Further, depending on the size of spacer particles, it may unfavorably occur that the semiconductor film and the electrode layer contact each other.

Likewise, when $R_S/D$ or $R_E/D$ exceeds 0.1, it may occur that a cell wherein the gap between the semiconductor film and the electrode layer is uniform cannot be produced despite the use of spacer particles and that, depending on the size of spacer particles, the semiconductor film and the electrode layer contact each other.

The surface roughness can be determined by irradiating the semiconductor film surface or electrode layer surface with laser beam and detecting focal point shifts with the use of laser microscope (manufactured by Keyence) to thereby measure the degree of surface irregularity.

It is preferred that the 10% K-value of spacer particles 27 be in the range of 100 to 5000 Kgf/mm$^2$, especially 200 to 1000 Kgf/mm$^2$ When the 10% K-value is less than 100 Kgf/mm$^2$, the particles are so soft that it may occur that, at the time of application of pressure to the cell, the particles are easily deformed with the result that a uniform gap cannot be maintained to thereby cause the semiconductor film and the electrode layer to contact each other. On the other hand, when the 10% K-value exceeds 5000 Kgf/mm$^2$, the particles are so hard that, at the time of application of pressure to the cell, the semiconductor film or electrode layer may be damaged.

The particle diameter variation coefficient (CV value) of spacer particles is preferably 20% or less. When the CV value exceeds 20%, the applied load may be different according to particles, and excess pressure may be applied to large particles. Thus, it may occur that the spacer particles are broken and that the semiconductor film and electrode layer brought into contact with the spacer particles are damaged.

The distribution of diameters of these spacer particles is measured by photographing the particles through scanning electron microscope (model JSM-5300 manufactured by JEOL LTD.) and analyzing the images of 250 particles with the use of image analyzer (model IP-1000 manufactured by Asahi Chemical Industry Co., Ltd.).

The particle diameter variation coefficient (CV value) can be calculated from the diameters of 250 particles by the following formula:

particle diameter variation coefficient=(standard deviation of particle diameter ($\sigma$)/average particle diameter ($D_n$))×100 standard deviation of particle diameter ($\sigma$) =

$$\sum^{n} |D_1 - D_n| / (n-1) \times D_n.$$

The 10% K-value is evaluated in the following manner.

Microcompression tester (model MCTM-201 manufactured by Shimadzu Corporation) is used as a measuring instrument. One particle of diameter D is used as a sample. Load is applied onto the sample at a constant loading speed, and the particle is deformed until the degree of deformation reaches 10% of the particle diameter. At the 10% deformation, the load and degree of compression deformation (mm) are measured. The 10% K-value is calculated from the particle diameter and the measured compression load and compression deformation by substitution with the use of the following formula (1). Herein, 10% K-values are determined with respect to 10 particles, and an average thereof is used for evaluation.

$$K=(3/2^{1/2})*F*S^{-1/2}*(D/2)^{-1/2} \quad (1)$$

wherein F represents the value of load (Kgf) at the 10% compression deformation of the particle, S represents the compression deformation (mm) at the 10% compression deformation of the particle, and D represents the particle diameter (mm).

With respect to practical measuring conditions, the compression speed constant is set for 1, and the loading speed is changed within the range of 0.029 to 0.27 gf/sec, depending on the particle diameter (i). The maximum of test load is set for 10 gf (ii).

The spreading of the above spacer particles can be accomplished, for example, by first dispersing spacer particles in a solvent wherein the spacer particles are not dissolved, subsequently spraying the dispersion through a nozzle or the like over the surface of semiconductor film or electrode layer (electrode layer arranged opposite to the semiconductor film) and thereafter performing evaporation of the solvent and drying. Although the average particle spreading density is not particularly limited, it is preferred that the spreading be performed at an average density of 30 to 200 particles/mm$^2$.

(Electrolyte Layer)

In the second photovoltaic cell of the present invention, the side faces are sealed with a resin or the like, and an electrolyte layer 24 comprising an enclosed electrolyte is interposed between the electrodes.

A mixture of an electrochemically active salt and at least one compound capable of forming an oxidation-reduction system therewith is used as the electrolyte for constituting the electrolyte layer 24. For example, use can be made of the same electrolytes as particularized hereinbefore with respect to the first photovoltaic cell.

The electrolyte, although may be directly incorporated for forming the electrolyte layer when itself is liquid, is generally applied in the form of a solution. It is generally preferred that the electrolyte concentration be in the range of 0.1 to 5 mol/lit., although depending on the type of electrolyte and the type of employed solvent.

Common solvents can be used for obtaining the electrolyte solution. For example, the solvent can be any of water, alcohols, oligoethers, carbonates such as propione carbonate, phosphoric esters, dimethylformamide, dimethyl sulfoxide, N-methylpyrrolidone, N-vinylpyrrolidone, sulfur compounds such as sulfolane 66, ethylene carbonate, acetonitrile and γ-butyrolactone.

In the present invention, the liquid crystal as particularized hereinbefore with respect to the first photovoltaic cell may be incorporated together with the above solvent in the electrolyte layer 24. As this liquid crystal, use can be made of smectic, nematic and cholesteric liquid crystals known as thermotropic liquid crystals. Further, use can be made of lyotropic liquid crystals, polymer liquid crystals, polymer-dispersed liquid crystals and discotic liquid crystals. Of these, when liquid crystals containing fluorine atoms are employed, high hydrophobicity and long-term stability can be realized.

The second photovoltaic cell of the present invention is fabricated by first arranging a first substrate 25 having on its surface an electrode layer 21, the electrode layer 21 having on its surface a metal oxide semiconductor film 22 on which a photosensitizer is adsorbed, and a second substrate 26 having on its surface an electrode layer 23 with reducing catalytic activity so that the metal oxide semiconductor film 22 and the electrode layer 23 are opposite to each other; subsequently interposing spacer particles between the metal oxide semiconductor film 22 and the electrode layer 23; sealing the side faces with a resin; thereafter interposing an electrolyte and a liquid crystal optionally together with a solvent between the metal oxide semiconductor film 22 and the electrode layer 23 in a hermetically sealed manner; and finally connecting the electrodes to each other by means of a lead wire.

With respect to the thus obtained second photovoltaic cell of the present invention, because the spacer particles are interposed between the semiconductor film and the electrode layer opposite thereto, the inter-electrode gap can be reduced and uniformized. Therefore, the energy loss of charges (electrons) moving through the electrolyte layer can be reduced. Further, the whole cell can exhibit uniform optical and electrical characteristics to thereby enable enhancing the photovoltaic transduction efficiency. Still further, the amount of interposed electrolyte can be reduced.

Third Photovoltaic Cell

The third photovoltaic cell of the present invention comprises:

a first substrate having on its surface an electrode layer (31), the electrode layer (31) having on its surface a semiconductor film (32) on which a photosensitizer is adsorbed, and a second substrate having on its surface an electrode layer (33), the first substrate and the second substrate arranged so that the electrode layer (31) overlaid with the semiconductor film (32) and the electrode layer (33) are opposite to each other with an electrolyte sealed between the semiconductor film (32) and the electrode layer (33), wherein spacer particles are sunk in the semiconductor film (32) in such a manner that at least portions of the spacer particles are exposed from the semiconductor film (32) so as to contact the electrode layer (33).

This photovoltaic cell can be, for example, one shown in FIG. 7.

FIG. 7 is a schematic sectional view of one form of the photovoltaic cell according to the present invention. In FIG. 7, reference numeral 31 denotes a transparent electrode layer, reference numeral 32 a semiconductor film, reference numeral 33 an electrode layer with reducing catalytic activity, reference numeral 34 an electrolyte, reference numerals 35, 36 substrates, and reference numeral 37 spacer particles.

The photovoltaic cell shown in FIG. 7 comprises:

a first substrate 35 having on its surface a transparent electrode layer 31, the transparent electrode layer 31 having on its surface a semiconductor film 32 on which a photosensitizer is adsorbed and in which spacer particles are partly sunk, and a second substrate 36 having on its surface an electrode layer with reducing catalytic activity 33, the first substrate and the second substrate arranged so that the electrode layer 31 overlaid with the semiconductor film 32 and the electrode layer 33 are opposite to each other with an electrolyte layer 34 comprising an enclosed electrolyte interposed between the semiconductor film 32 and the electrode layer 33.

(Substrate and Electrode Layer)

As the transparent substrate 35, there can be employed substrates which are transparent and possess insulating properties, such as a glass plate and a substrate of PET or other organic polymers.

On the other hand, the substrate 36 is not particularly limited as long as the strength thereof can endure uses. Not only insulating substrates such as a glass plate and a substrate of PET or other organic polymers but also conductive substrates of metals such as titanium, aluminum, copper and nickel can be employed.

In the present invention, spacer particles are interposed between the semiconductor film 32 and the transparent electrode layer 33. Therefore, the transparent substrate 35 and the substrate 36 can be composed of deformable substrates such as PET film. The use of deformable substrates enables preparing a photovoltaic cell having a non-planar configuration, for example, an approximately semicylindrical configuration.

Conventional electrode materials as particularized hereinbefore with respect to the first and second photovoltaic cells can be used in the transparent electrode layer 31 to be superimposed on the surface of transparent substrate 35.

The electrode layer 33 superimposed on the surface of substrate 36 is not particularly limited as long as it has reducing catalytic activity, and use can be made of conventional electrodes as particularized hereinbefore with respect to the first and second photovoltaic cells.

The substrate 36 may be transparent like the transparent substrate 35. Also, the electrode layer 33 may be a transparent electrode like the transparent electrode layer 31.

It is preferred that the visible light transmission through the transparent substrate 35 and the transparent electrode layer 31 be high. For example, it is preferred that the visible light transmission through the transparent substrate with transparent electrode comprising the transparent substrate and the transparent electrode provided on the surface of transparent substrate be 50% or over, especially 90% or over. When the visible light transmission is lower than 50%, the photovoltaic transduction efficiency may be unfavorably low.

The surface resistance of each of the transparent electrode layer 31 and electrode layer 33 is preferably 100 Ω/□ or less. When the surface resistance of electrode layer is higher than 100 Ω/□, the photovoltaic transduction efficiency may be unfavorably low. Conductive protrusions may be provided on this transparent electrode layer or electrode layer in the same fashion as in the first photovoltaic cell.

(Semiconductor Film)

The semiconductor film 32 may be superimposed on the electrode layer 33 provided on the substrate 36. Also, the semiconductor film 32 is superimposed on the transparent electrode layer 31 provided on the transparent substrate 35. The semiconductor film may be superimposed on either of the electrode layers superimposed on the substrates. When conductive protrusions are provided, the semiconductor film may be formed so that the conductive protrusions are buried therein, or so that the semiconductor film is provided along the contour of the conductive protrusions.

Figure 9:
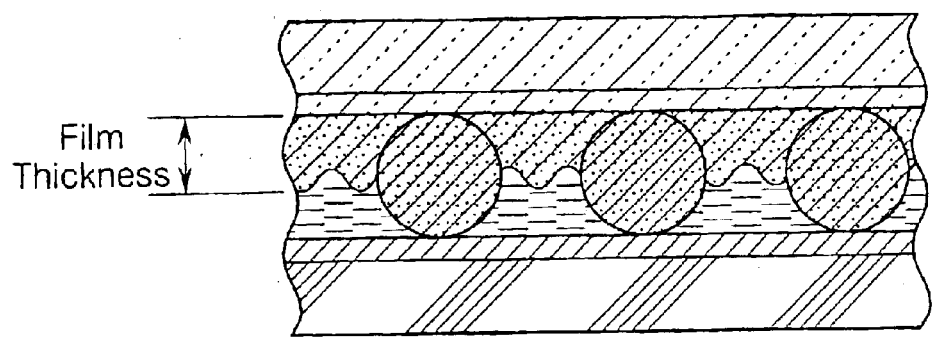
FIG. 9 is a schematic view showing the definition of the thickness of semiconductor film in the third photovoltaic cell of the present invention.

The thickness of this semiconductor film 32 is preferably in the range of 0.1 to 50 μm. With respect to the third photovoltaic cell of the present invention, the terminology "thickness of the semiconductor film 32" means the thickness of the semiconductor film excluding the height of spacer particles as shown in FIG. 9.

The same semiconductor films as particularized hereinbefore with respect to the first and second photovoltaic cells can be employed as the semiconductor film 32.

The semiconductor film 32 of the third photovoltaic cell of the present invention is preferably an inorganic semiconductor film composed of an inorganic semiconductor material. It is especially desirable to use a metal oxide as the inorganic semiconductor material from the viewpoint that a porous metal oxide semiconductor film wherein the adsorption amount of photosensitizer is high can be obtained.

As this metal oxide semiconductor film, there can be mentioned metal oxide semiconductor films composed of particles of at least one metal oxide selected from among titanium oxide, lanthanum oxide, zirconium oxide, niobium oxide, tungsten oxide, strontium oxide, zinc oxide, tin oxide and indium oxide, as particularized hereinbefore with respect to the first and second photovoltaic cells.

Further, the metal oxide particles can be those each having a core/shell structure comprising a core particle part and, disposed on a surface thereof, a shell part, as described hereinbefore with respect to the first and second photovoltaic cells.

It is preferred that the metal oxide semiconductor film 32 contain a binder component together with the above metal oxide particles in the same manner as in the first and second photovoltaic cells.

The same compounds as particularized hereinbefore with respect to the first and second photovoltaic cells can be used as the binder component.

In the metal oxide semiconductor film 32, the weight ratio, in terms of oxide, of binder to metal oxide particles (binder/metal oxide particles) is preferably in the range of 0.05 to 0.50, still preferably 0.1 to 0.3. When the weight ratio is less than 0.05, it may occur that the absorption of visible-region light is unsatisfactory and that the adsorption amount of photosensitizer cannot be increased. On the other hand, when the weight ratio is higher than 0.50, it may occur that no porous metal oxide semiconductor film cannot be obtained and that the adsorption amount of photosensitizer cannot be increased.

In the metal oxide semiconductor film 32, the pore volume is preferably in the range of 0.05 to 0.8 ml/g, still preferably 0.1 to 0.7 ml/g. Further, in the metal oxide semiconductor film 32, the average pore diameter is preferably in the range of 2 to 250 nm, still preferably 5 to 50 nm When the pore volume is smaller than 0.05 ml/g, the adsorption amount of photosensitizer is likely to be unfavorably small. On the other hand, when the pore volume is larger than 0.8 ml/g, it may occur that the electron mobility within the film is decreased to thereby lower the photovoltaic transduction efficiency. Also, when the average pore diameter is smaller than 2 nm, the adsorption amount of photosensitizer is likely to be unfavorably small. On the other hand, when the-average pore diameter is larger than 250 nm, it may occur that the electron mobility is decreased to thereby lower the photovoltaic transduction efficiency.

In the present invention, spacer particles 37 are sunk in the semiconductor film 32 in such a manner that at least portions of the spacer particles are exposed from the semiconductor film 32 so as to contact the electrode layer 33.

Spacer particles 37, although may be sunk in the semiconductor film 32 while contacting the electrode layer 31 as shown in FIG. 7, may be sunk in the semiconductor film 32 in the state of being afloat on the semiconductor film 32 without contacting the electrode layer 31 as shown in FIG. 8. FIG. 8 is a schematic sectional view of another form of the third photovoltaic cell according to the present invention. The reference numerals 31 to 37 appearing in FIG. 8 have the same meaning as in FIG. 7.

(Spacer Particle)

The spacer particles 37 are not particularly limited as long as the spacer particles are capable of uniformizing the inter-electrode gap or the gap between the semiconductor film 32 and the electrode layer 33 and as long as mutual contacting of the semiconductor film 32 and the electrode layer 33 during service can be avoided. Use can be made of, for example, known insulating particles of resins (plastics), organic inorganic composites, metal oxides, ceramics and the like. Specific examples thereof are the same as particularized hereinbefore with respect to the second photovoltaic cell.

In the third photovoltaic cell of the present invention, it is especially preferred that these spacer particles be hydrophobic or have a hydrophobic surface. When the particle surface is hydrophobic (water repellent), the leaving of semiconductor film components on any surface of spacer particles exposed from the semiconductor film at the time of semiconductor film formation by application and subsequent drying of the below described coating liquid for forming a semiconductor film can be avoided. Even if this occurred, the semiconductor film components could be easily removed. Therefore, electrical communication of the semiconductor film with the electrode layer opposite thereto can be avoided.

With respect to the synthetic resin particles or particles to whose surface a synthetic resin has been fusion-bonded, if the synthetic resin is a hydrophobic resin such as polymethyl methacrylate, the particles can be directly employed as the spacer particles. In the use of particles with hydrophilic surface, such as metal oxide or ceramic particles or particles of hydrophilic resins, as the spacer particles, it is preferred that the surface be rendered hydrophobic by conventional surface treating methods. Such conventional surface treatment can be performed with the use of, for example, fluorinated compounds such as $CF_3(CF_2)_3CH_2CH_2Si(CH_3)Cl_2$ and $CH_3(CF_2)_3CH_2CH_2Si(CH_3)Cl_2$, fluorinated compounds such as those obtained by subjecting fluororesins (polytetrafluoroethylene, polyvinylidene fluoride, etc.) to freezing pulverization and subsequently mechanofusion (fusion under the application of mechanical energy) and silane coupling agents such as trimethylsilane, dimethylphenylsilane, dimethylvinylsilane, dimethylsilane, methyldiethoxysilane ($CH_3Si(OC_2H_5)_2H$), diphenylsilane, methylsilane, phenylsilane and tetraalkoxysilanes (e.g., tetramethoxysilane and tetraethoxysilane).

Although the configuration of these spacer particles is not particularly limited and can be, for example, spherical or rod-shaped, spherical spacer particles are preferred. The average diameter of these spacer particles, although varied depending on the intended thickness of semiconductor film and inter-electrode gap, is preferably in the range of 1 to 100 $\mu$m, still preferably 1 to 80 $\mu$m, and optimally 10 to 50 $\mu$m.

Elastic particles are preferably used as the spacer particles. It is preferred that the 10% K-value, as a parameter for elasticity, thereof be in the range of 50 to 5000 Kgf/mm$^2$, especially 100 to 1000 Kgf/mm$^2$. When the 10% K-value is less than 50 Kgf/mm$^2$, the particles are so soft that it may occur that, at the time of application of pressure to the cell, the particles are easily deformed, with the result that a uniform gap cannot be maintained to thereby cause the semiconductor film 32 and the electrode layer 33 to contact each other, thereby inviting short circuit of the cell. On the other hand, when the 10% K-value exceeds 5000 Kgf/mm$^2$, the particles are so hard that, at the time of application of pressure to the cell, the electrode layer 33 may be damaged.

The particle diameter variation coefficient (CV value) of spacer particles is preferably 20% or less. When the CV value exceeds 20%, the mathematical dispersion of spacer particle diameter becomes large and high pressure is applied to spacer particles of large diameter as compared with that to spacer particles of small diameter. Thus, it may unfavorably occur that the spacer particles are broken and that the electrode layer brought into contact with the spacer particles is damaged.

The semiconductor film wherein the spacer particles are sunk can be prepared from the following coating liquid for semiconductor film formation which contains spacer particles and film components.

Alternatively, the surface of electrode layer can be coated first with the coating liquid for semiconductor film formation of the same composition except that spacer particles are not contained and thereafter with the above coating liquid for semiconductor film preparation which contains spacer particles so that thickness of finally formed semiconductor film is in the range of 0.1 to 50 μm. As a result, the semiconductor film of FIG. 8 can be formed. In the semiconductor film of FIG. 8, the spacer particles are not brought into direct contact with the substrate on which the semiconductor film is superimposed. Thus, according to necessity, use can be made of spacer particles of a diameter smaller than the thickness of the semiconductor film. Accordingly, the ratio of spacer particles incorporated in the semiconductor film can be reduced so that any decrease of the photovoltaic transduction efficiency in the semiconductor film can be avoided. In the semiconductor film of FIG. 8, the semiconductor film not containing spacer particles is first formed and subsequently the semiconductor film containing spacer particles is formed, so that the effect of gap regulation is excellent.

With respect to the application method of coating liquid, the coating liquid can be applied by the use of conventional methods such as the dipping, spinner, spray, roll coater, flexographic printing and screen printing methods.

The drying temperature is not limited as long as the dispersion medium can be removed.

After the drying, according to necessity, the film can be hardened by irradiating the same with ultraviolet light. The ultraviolet irradiation causes the precursor of binder component to decompose to thereby harden the film. When the film formation auxiliary is contained in the coating liquid, the film may be heated after the hardening of the film to thereby decompose the film formation auxiliary.

In the production of the third photovoltaic cell of the present invention, in the same manner as in the production of the first and second photovoltaic cells, the film can be exposed, after the hardening of the film by ultraviolet irradiation, to ions of at least one gas selected from among $O_2$, $N_2$, $H_2$, neon, argon, krypton and other inert gases belonging to Group 0 of the periodic table and annealed.

In the event that semiconductor components adhere to the surface of spacer particles in the formation of the semiconductor film wherein spacer particles are partly sunk, an operation for removing the semiconductor components from the surface of spacer particles may be carried out.

(Photosensitizer)

In the photovoltaic cell of the present invention, a photosensitizer is adsorbed on the semiconductor film 32.

As the photosensitizer, there can be employed the same photosensitizers as particularized hereinbefore with respect to the first and second photovoltaic cells.

The method of adsorbing these photosensitizers is not particularly limited. For example, use can be made of the same method as described hereinbefore with respect to the first and second photovoltaic cells.

(Electrolyte Layer)

In the photovoltaic cell of the present invention, the semiconductor film 32 wherein spacer particles are partly sunk is arranged opposite to the electrode layer 33. The side faces thereof are sealed with a resin or the like. The electrolyte layer 34 wherein an electrolyte is enclosed is interposed between the electrodes.

As the electrolyte, there can be employed a mixture of an electrochemically active salt and at least one compound capable of forming an oxidation-reduction system therewith as particularized hereinbefore with respect to the first and second photovoltaic cells.

Although the electrolyte may be directly incorporated for forming the electrolyte layer when it is liquid, it is generally applied in the form of a solution. It is generally preferred that the electrolyte concentration be in the range of 0.1 to 5 mol/lit., depending on the type of employed solvent.

Common solvents can be used for obtaining the electrolyte solution. For example, the solvent can be any of water, alcohols, oligoethers, carbonates such as propione carbonate, phosphoric esters, dimethylformamide, dimethylsulfoxide, N-methylpyrrolidone, N-vinylpyrrolidone, sulfur compounds such as sulfolane 66, ethylene carbonate, acetonitrile and γ-butyrolactone, as set forth hereinbefore with respect to the second photovoltaic cell.

In the present invention, the same liquid crystal as particularized hereinbefore with respect to the second photovoltaic cell may be incorporated together with the above solvent in the electrolyte layer 34. When the liquid crystal is contained in the electrolyte layer, the quantity of light received does not decrease much, even if the angle of light incidence is increased, owing to the light scattering effect of the liquid crystal to thereby enable stably transducing light energy to electrical energy and withdrawing the resultant electrical energy. Further, rays having been reflected by the semiconductor film without participating in the excitation of photosensitizer, among the incident rays, are reutilized in the irradiation of the photosensitizer of the semiconductor film by virtue of the light scattering effect of the liquid crystal so that the rays are transduced to electrical energy. Thus, the effect of enhancing the transduction efficiency of light energy can be obtained. Still further, when a hydrophobic liquid crystal is used as the above liquid crystal, hygroscopicity is reduced as compared with that exhibited in the use of hygroscopic electrolyte only to thereby enable inhibiting the deterioration attributed to the decomposition of electrolyte, photosensitizer and solvent by moisture absorption. As a result, the long-term stability of the photovoltaic cell can be enhanced. As the liquid crystal, conventional liquid crystals can be used without any particular limitation as long as the solubility of photosensitizer therein is so low that the photosensitizer adsorbed on the semiconductor film is not desorbed and dissolved. Specifically, as the liquid crystal, use can be made of smectic, nematic and cholesteric liquid crystals known as thermotropic liquid crystals. Further, use can be made of lyotropic liquid crystals, polymer liquid crystals, polymer-dispersed liquid crystals and discotic liquid crystals. Of these, when liquid crystals containing fluorine atoms are employed, high hydrophobicity and long-term stability can be realized.

The photovoltaic cell of the present invention is fabricated by first arranging a first substrate 5 having on its surface an electrode layer 31, the electrode layer 31 having on its surface a metal oxide semiconductor film 32 on which a photosensitizer is adsorbed and in which spacer particles are partly sunk, and a second substrate 36 having on its surface an electrode layer 33 with reducing catalytic activity so that the metal oxide semiconductor film 32 and the electrode layer 33 are opposite to each other; subsequently sealing the side faces with a resin; thereafter interposing an electrolyte 34 between the metal oxide semiconductor film 32 and the transparent electrode layer 33 in a hermetically sealed manner; and finally connecting the electrodes to each other by means of a lead wire.

With respect to the thus obtained third photovoltaic cell of the present invention, by virtue of the interposition of spacer particles, the inter-electrode gap can be reduced to 1 μm, preferably 2 μm. When the inter-electrode gap is smaller than 1 μm, mutual contacting of the electrode layers may occur although depending on the roughness of electrode layer surfaces.

The upper limit of inter-electrode gap is 80 μm, preferably 50 μm. When the inter-electrode gap exceeds 80 μm, the loss of charge energy between the electrodes is increased with the result that the effect of enhancing the photovoltaic transduction efficiency cannot be exerted.

In the third photovoltaic cell of the present invention, spacer particles are interposed between the semiconductor film and the electrode opposite thereto, so that not only can the inter-electrode gap be decreased and uniformized but also the energy loss of charges (electrons) moving through the electrolyte layer can be reduced to thereby realize a high photovoltaic transduction efficiency. Further, by virtue of the interposition of spacer particles, contacting of the semiconductor film with the opposite electrode layer can be avoided even under the application of pressure onto the cell. Still further, the electrolyte layer can be rendered uniform and extremely thin, so that the loss of received light quantity attributed to the light absorption by electrolyte can be reduced. Since electromotive force can be effectively generated also by the light incident from the opposite electrode side of the semiconductor film, there can be obtained a photovoltaic cell appropriately available as a thin, or thin and flexible, film solar cell.

Coating Liquid for Forming a Semiconductor Film

The coating liquid for forming a semiconductor film for use in a photovoltaic cell according to the present invention comprises a component for semiconductor film formation, used for forming the semiconductor film 32, and spacer particles both dispersed in a dispersion medium.

As the component for semiconductor film formation for use in the coating liquid of the present invention, there can be employed, for example, the above inorganic semiconductor material, organic semiconductor material and organic inorganic hybrid semiconductor material.

In the coating liquid for forming a semiconductor film according to the present invention, an inorganic semiconductor material is preferably employed. It is especially desirable to use a metal oxide as the inorganic semiconductor material from the viewpoint that a porous metal oxide semiconductor film wherein the adsorption amount of photosensitizer is high can be obtained.

This metal oxide semiconductor material can be, for example, at least one metal oxide selected from among titanium oxide, lanthanum oxide, zirconium oxide, niobium oxide, tungsten oxide, strontium oxide, zinc oxide, tin oxide and indium oxide.

The aforementioned metal oxide particles can appropriately be used as the metal oxide semiconductor material.

As these metal oxide particles, there can be employed those each having a core/shell structure as mentioned hereinbefore, wherein the shell part is composed of crystalline titanium oxide.

The aforementioned spherical spacer particles, rod-shaped spacer particles, etc. can be used as the spacer particles. With respect to materials, use can be made of known insulating particles of resins (plastics), organic inorganic composites, metal oxides, ceramics and the like.

Further, the particles with a core/shell structure, comprising the above metal oxide particles having their surfaces coated with an elastic layer, can be used as the spacer particles.

Still further, the particles resulting from fusion bonding of a synthetic resin to surfaces of the above particles can also be appropriately used as the spacer particles.

As aforementioned, it is preferred that the spacer particles for use in the present invention have a hydrophobic (water repellent) surface. When the particle surface is hydrophobic, the leaving of semiconductor film components on any surface of spacer particles exposed from the semiconductor film at the time of semiconductor film formation by application and subsequent drying of the above coating liquid for semiconductor film formation can be avoided. Even if this occurred, the semiconductor film components could be easily removed. Therefore, electrical communication of the semiconductor film with the electrode layer opposite thereto can be avoided.

It is especially preferred that these spacer particles be spherical. The average diameter of the particles is preferably in the range of 1 to 80 μm, still preferably 10 to 50 μm.

The coating liquid for semiconductor film formation according to the present invention preferably contains the aforementioned binder component together with the above component for semiconductor film formation and spacer particles.

As a titanium oxide binder component, there can be mentioned, for example, a gel or sol of titanium oxide hydrate obtained by the sol gel technique or the like, and peroxotitanic acid obtained by adding hydrogen peroxide to a gel or sol of titanium oxide hydrate so that the titanium oxide hydrate is dissolved.

Of these, peroxotitanic acid is preferably used as the binder component.

In the coating liquid for forming a metal oxide semiconductor film, the weight ratio, in terms of $TiO_2$, of titanium oxide binder component to crystalline titanium oxide particles (titanium oxide binder component/crystalline titanium oxide particles) is preferably in the range of 0.03 to 0.50, still preferably 0.1 to 0.3. When the weight ratio is less than 0.03, it may occur that the strength of obtained semiconductor film and the adherence thereof to the electrode layer are unsatisfactory and that the adsorption amount of photosensitizer cannot be increased. On the other hand, that porous semiconductor film cannot be obtained to thereby disenable increasing the adsorption amount of photosensitizer and that the electron mobility cannot be enhanced.

These binder component and metal oxide particles as the component for semiconductor film formation are preferably contained in the coating liquid for semiconductor film formation for use in a photovoltaic cell in a concentration of 1 to 30% by weight, still preferably 2 to 20% by weight, in terms of $MO_x(1)+MO_x(2)$ wherein $MO_x(1)$ represents the binder component and $MO_x(2)$ represents the metal oxide particles.

In the coating liquid for semiconductor film formation for use in a photovoltaic cell according to the present invention, the dispersion medium can be employed without any particular limitation as long as the binder component, metal oxide particles and spacer particles can be dispersed therein and the dispersion medium can be removed by drying. Dispersion mediums which are miscible with water, especially alcohols, are preferred.

The ratio of spacer particles to film formation component (in terms of oxide) in the coating liquid for semiconductor film formation for use in a photovoltaic cell is preferably in the range of 0.01 to 0.5% by weight.

When the ratio of spacer particles in the coating liquid is less than 0.01% by weight, the density of spacer particles (on the surface of semiconductor film) is so low that, when the cell is, for example, curved or otherwise deformed, contacting with the opposite electrode may occur to result in electrode breakage and electrical communication. On the other hand, when the ratio of spacer particles exceeds 0.5% by weight, the density of spacer particles is so high that the quantity of light incident upon the semiconductor film is likely to decrease to thereby lower the photovoltaic transduction efficiency.

Furthermore, if necessary, a film formation auxiliary may be contained in the coating liquid for semiconductor film formation for use in a photovoltaic cell according to the present invention. The film formation auxiliary can be, for example, any of polyethylene glycol, polyvinylpyrrolidone, hydroxypropylcellulose, polyacrylic acid, polyvinyl alcohol and ethylcellulose. When this film formation auxiliary is contained in the coating liquid, the viscosity of the coating liquid is increased to thereby enable obtaining a uniformly dried film. Further, the metal oxide particles for semiconductor film formation are densely packed in the film to thereby increase the bulk density. Thus, a metal oxide semiconductor film exhibiting high adherence to the electrode can be obtained.

The coating liquid is preferably applied in such an amount that the thickness of the finally formed semiconductor film is in the range of 0.1 to 50 μm.

With respect to the application method, as aforementioned, the coating liquid can be applied by the use of conventional methods such as the dipping, spinner, spray, roll coater, flexographic printing and screen printing methods.

According to necessity, the film after application may be irradiated with ultraviolet light to thereby harden the same. When the film formation auxiliary is contained in the coating liquid, the film may be heated after the hardening of the film to thereby decompose the film formation auxiliary. Further, after the hardening of the film by ultraviolet irradiation, the film may be exposed to ions of at least one gas selected from among $O_2$, $N_2$, $H_2$, neon, argon, krypton and other inert gases belonging to Group 0 of the periodic table and annealed.

Fourth Photovoltaic Cell

The fourth photovoltaic cell of the present invention comprises:

a first substrate having on its surface an electrode layer (41), the electrode layer (41) having on its surface a metal oxide semiconductor film (42) on which a photosensitizer is adsorbed, and a second substrate having on its surface an electrode layer (43), the first substrate and the second substrate arranged so that the metal oxide semiconductor film (42) and the electrode layer (43) are opposite to each other with an electrolyte layer interposed therebetween.

In the photovoltaic cell, the metal oxide semiconductor film (42) comprises metal oxide particles having an average diameter of 5 to 600 nm;

the metal oxide particles each have a core/shell structure comprising a core particle part having an average diameter of 2 to 500 nm and, disposed on a surface thereof, a shell part composed of a metal oxide, the shell parts having a thickness ranging from 1 to 150 nm; and the metal oxide constituting the core particle parts and the metal oxide constituting the shell parts have intrinsic volume resistivity values ($E_C$) and ($E_S$), respectively, which satisfy the relationship:

$$E_C < E_S.$$

Figure 10:
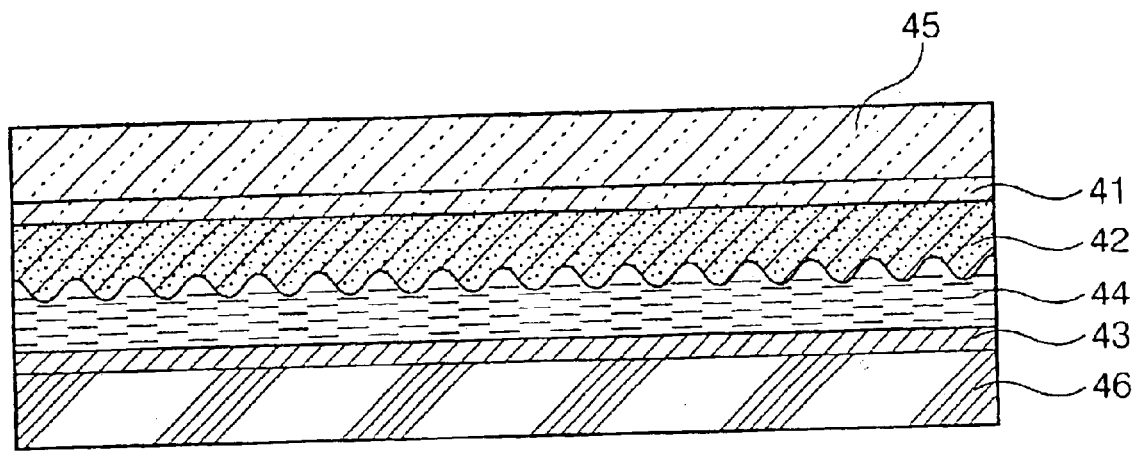
FIG. 10 is a schematic sectional view of one form of the fourth photovoltaic cell according to the present invention.

This photovoltaic cell can be, for example, one shown in FIG. 10.

FIG. 10 is a schematic sectional view of one form of the fourth photovoltaic cell according to the present invention. In FIG. 10, reference numeral 41 denotes a transparent electrode layer, reference numeral 42 a semiconductor film, reference numeral 43 an electrode layer with reducing catalytic activity, reference numeral 44 an electrolyte, and reference numerals 45, 46 substrates.

The photovoltaic cell shown in FIG. 10 comprises:

a first substrate 45 having on its surface a transparent electrode layer 41, the transparent electrode layer 41 having on its surface a metal oxide semiconductor film 42 on which a photosensitizer is adsorbed, and a second substrate 46 having on its surface an electrode layer 43 with reducing catalytic activity, the first substrate and the second substrate arranged so that the electrode layer 41 overlaid with the metal oxide semiconductor film 42 and the electrode layer 43 are opposite to each other with an electrolyte 44 sealed between the metal oxide semiconductor film 42 and the electrode layer 43.

(Substrate and Electrode Layer)

As the transparent substrate 45 and substrate 46, there can be employed those particularized hereinbefore with respect to the first to third photovoltaic cells.

Spacer particles 47 may be interposed between the metal oxide semiconductor film 42 and the transparent electrode layer 43. The interposition of spacer particles enables using a deformable substrate such as a PET film in the transparent substrate 45 and substrate 46, and accordingly enables preparing a photovoltaic cell having a non-planar configuration, for example, an approximately semicylindrical configuration. In the use of spacer particles, for example, a transparent, or thin flexible, photovoltaic cell can be obtained.

Conventional electrode materials as particularized hereinbefore with respect to the first to third photovoltaic cells can be used in the transparent electrode layer 41 to be superimposed on the surface of transparent substrate 45. Conductive protrusions may be provided on this transparent electrode layer or electrode layer in the same fashion as in the first to third photovoltaic cells.

The electrode layer 43 superimposed on the surface of substrate 46 is not particularly limited as long as it has reducing catalytic activity, and use can be made of conventional electrodes as particularized hereinbefore with respect to the first to third photovoltaic cells.

The substrate 46 may be transparent like the transparent substrate 45. Also, the electrode layer 43 may be a transparent electrode like the transparent electrode layer 41.

(Metal Oxide Semiconductor Film)

The metal oxide semiconductor film 42 may be superimposed on the electrode layer 43 provided on the substrate 46. The metal oxide semiconductor film may be superimposed on either of the electrode layers, and thus may be superimposed on the other electrode layer. When conductive protrusions are provided, the semiconductor film may be formed so that the conductive protrusions are buried therein, or so that the semiconductor film is provided along the contour of the conductive protrusions.

The thickness of this metal oxide semiconductor film 42 is preferably in the range of 0.1 to 50 μm.

In the present invention, the metal oxide semiconductor film comprises metal oxide particles each having a specified core/shell structure.

The average diameter of metal oxide particles each having a core/shell structure is preferably in the range of 5 to 600 nm, still preferably 10 to 300 nm. When the average diameter of metal oxide particles is less than 5 nm, it may occur that the formed metal oxide semiconductor film is likely to have cracks, thereby rendering it difficult to form a crackless thick film having a thickness mentioned later by a small number of coating operations. Further, it may occur that the pore diameter and pore volume of the metal oxide semiconductor film are reduced to thereby cause the adsorption amount of photosensitizer to unfavorably decrease. On the other hand, when the average diameter of metal oxide particles is larger than 600 nm, it may occur that the strength of the metal oxide semiconductor film is unsatisfactory.

The diameter of metal oxide particles and below described core particles can be measured by laser Doppler type particle diameter measuring instrument (manufactured by NIKKISO CO., LTD.: microtrack).

These metal oxide particles each have a core/shell structure comprising a core particle part and, disposed on a surface thereof, a shell part.

The average diameter of core particle parts is preferably in the range of 2 to 500 nm, still preferably 4 to 250 nm.

When the average diameter of core particle parts is less than 2 nm, the effect of using core particle parts whose conductivity is higher than that of the shell parts cannot be fully exerted. The core/shell structure particles are not different from metal oxide particles consisting of a monophase of metal oxide employed for forming the shell parts. Thus, electron recombination would occur to thereby cause the photovoltaic transduction efficiency to be poor. On the other hand, when the average diameter of core particle parts exceeds 500 nm, the adsorption amount of photosensitizer would be large, and the ratio of shell parts capable of absorbing visible light to thereby excite themselves so that electrons can be efficiently emitted would be decreased. Therefore, the photovoltaic transduction efficiency would become unsatisfactory.

The thickness of the shell parts for constituting the metal oxide particles is preferably in the range of 1 to 150 nm, still preferably 2 to 100 nm, although depending on the size of metal oxide particles.

In the metal oxide particles each having a core/shell structure for use in the present invention, the intrinsic volume resistivity ($E_C$) of the metal oxide constituting the core particle parts and the intrinsic volume resistivity ($E_S$) of the metal oxide constituting the shell parts satisfy the relationship:

$$E_C < E_S.$$

The intrinsic volume resistivity $E_C$ of the core particle parts is preferably $10^{10}$ Ω·cm or less, still preferably $10^5$ Ω·cm or less, and optimally $10^3$ Ω·cm or less. On the other hand, the intrinsic volume resistivity $E_S$ of the shell parts is preferably $10^{16}$ Ω·cm or less, still preferably $10^{14}$ Ω·cm or less.

When the intrinsic volume resistivity $E_C$ of the metal oxide constituting the core particle parts and the intrinsic volume resistivity $E_S$ of the metal oxide constituting the shell parts satisfy the above relationships the photovoltaic cell comprising the semiconductor film composed of the metal oxide particles exhibits an enhanced photovoltaic transduction efficiency. Although the reason for the enhancement of photovoltaic transduction efficiency has not been elucidated, the following is presumed. In the common particles composed of a monophase metal oxide component, electrons of the photosensitizer layer having been excited by absorbing light at the surface layer part of particles move across the particle surface part to thereby either recombine with other excited photosensitizer electrons or cause the distance of electron movement to increase. Thus, the photovoltaic transduction efficiency cannot be enhanced. By contrast, however, in the use of the particles with core/shell structure according to the present invention, electrons of the photosensitizer layer having been excited by absorbing light at the shell parts rapidly move into the core particle parts of higher conductivity without recombination, and, further, electron movement to the electrode layer can be rapidly effected. These would enhance the photovoltaic transduction efficiency.

The intrinsic volume resistivity of the metal oxide particles can be measured by the following method. A ceramic cylindrical cell of 0.5 cm$^2$ sectional area is packed with 0.5 g of particles, and mounted on a frame fitted with a terminal for connection with a resistance measuring device. Under a pressure of 100 Kg/cm$^2$ onto a cover fitted with a terminal-equipped press bar (piston-like) applied from upward, the resistance and height of pressurized metal oxide particles in the cell are measured. The value of resistance (Ω) is calculated per cm and per cm$^2$ of sectional area. With respect to the intrinsic volume resistivity of the shell parts, the material constituting the shell parts is formed into particles, and the intrinsic volume resistivity of the particles are measured in the above manner. This intrinsic volume resistivity is regarded as the intrinsic volume resistivity of the shell parts.

For example, when the measured resistance is 100Ω and the height is 0.4 cm, the intrinsic volume resistivity is:

$$100 \times (1/0.4 \text{ cm}) \times 0.5 \text{ cm}^2 = 125 \text{ Ω·cm}.$$

The metal oxides for constituting the core particle parts and shell parts are not particularly limited as long as the above relationship can be satisfied (namely, as long as the conductivity of the metal oxide constituting the core particle parts is larger than the conductivity of the metal oxide constituting the shell parts). Examples thereof include at least one metal oxide selected from among titanium oxide, lanthanum oxide, zirconium oxide, niobium oxide, tungsten oxide, strontium oxide, zinc oxide, tin oxide, indium oxide, low-order titanium oxide ($Ti_2O_3$), Al-doped zinc oxide, F- or Sn-doped tin oxide and Sn-doped indium oxide.

With respect to an especially appropriate combination of the metal oxide constituting the core particle parts and the metal oxide constituting the shell parts for use in the present invention, it is preferred that the core particle parts be composed of F-doped tin oxide, Sn-doped indium oxide, indium oxide, low-order titanium oxide ($Ti_2O_3$), Al-doped zinc oxide or the like while the metal oxide constituting the shell parts consists of crystalline titanium oxide such as anatase titanium oxide, brucite titanium oxide or rutile titanium oxide.

When the shell parts are composed of the above crystalline titanium oxide, there can be realized advantageous properties, such as large band gap, high dielectric constant, larger adsorption amount of photosensitizer than in the use of other metal oxides, excellent stability and safety and easy film formation.

It is preferred that the crystallite diameter of the above crystalline titanium oxide be in the range of 1 to 50 nm, especially 5 to 30 nm. The crystallite diameter of crystalline titanium oxide particles can be determined by measuring the half-value width of peak ascribed to crystal face of each crystal form by X-ray diffractometry and calculating from the measured width with the use of the Debye-Scherrer formula. Also, the crystallite diameter can be determined by observation of a field emission transmission electron micrograph (FE-TEM).

When the crystallite diameter of the crystalline titanium oxide is less than 1 nm, the electron mobility within the shell parts is decreased. On the other hand, when the crystallite diameter is larger than 50 nm, the adsorption amount of photosensitizer is reduced. Thus, the photovoltaic transduction efficiency may be unfavorably low. Further, because of the excess largeness of the particles, the adherence to the core particle parts is so low that the electron movement from the shell parts to the core particle parts becomes difficult.

The core particle parts for constituting the core/shell structure for use in the present invention can be produced by conventional methods. That is, they can be produced by, for example, the method in which a hydrous metal oxide gel or sol is prepared from an inorganic compound salt or organometallic compound as a precursor of the above metal oxide by, for example, the sol gel technique and, after the addition of an acid or alkali according to necessity, the gel or sol is heated and aged.

The shell parts can be formed on the surface of core particle parts by, for example, the method in which the obtained core particle parts are dispersed in, for example, an aqueous solution or alcohol solution of an inorganic compound salt or organometallic compound as a precursor of the above metal oxide and, after the addition of an acid or alkali according to necessity, heated and aged.

For example, the core/shell particles wherein the shell parts are composed of crystalline titanium oxide can be produced in the following manner.

Specifically, the above core particle parts whose conductivity is higher than that of titanium oxide are dispersed in the hydrous titanic acid gel or sol prepared by, for example, the sol gel technique and, after the addition of an acid or alkali according to necessity, heated and aged. Thus, there can be obtained the core/shell particles wherein the shell parts are composed of crystalline titanium oxide.

Also, the core/shell particles wherein the shell parts are composed of crystalline titanium oxide can be obtained by first adding hydrogen peroxide to hydrous titanic acid gel or sol so that the hydrous titanic acid is dissolved therein and converted to peroxotitanic acid, subsequently dispersing therein the above core particle parts whose conductivity is higher than that of crystalline titanium oxide, thereafter adding an alkali, preferably ammonia and/or an organic base, so as to render the mixture alkaline and finally heating and aging at 80 to 350° C. According to necessity, firing can be effected at high temperatures of 350° C. or over. In the metal oxide particles of core/shell structure for use in the present invention, it is preferred that the shell parts be composed of crystalline titanium oxide obtained by adding an alkali to peroxotitanic acid and heating and aging the mixture.

This peroxotitanic acid can be prepared by adding hydrogen peroxide to an aqueous solution of titanium compound or a sol or gel of titanium oxide hydrate and heating the mixture. The sol or gel of titanium oxide hydrate can be obtained by adding an acid or alkali to an aqueous solution of titanium compound to thereby effect a hydrolysis, followed by washing if necessary, and heating and aging the mixture. The employable titanium compound, although not particularly limited, can be, for example, a titanium salt such as a titanium halide or titanyl sulfate, a titanium alkoxide such as a tetraalkoxytitanium, or a titanium compound such as titanium hydride.

The sol or gel of titanium oxide hydrate can be obtained by adding an acid or alkali to an aqueous solution of titanium compound to thereby effect a hydrolysis, followed by washing if necessary, and heating and aging the mixture. The employable titanium compound, although not particularly limited, can be, for example, a titanium salt such as a titanium halide or titanyl sulfate, a titanium alkoxide such as a tetraalkoxytitanium, or a titanium compound such as titanium hydride.

The metal oxide semiconductor film 42 preferably contains a titanium oxide binder component together with the above metal oxide particles.

This titanium oxide binder component can be, for example, a titanium oxide composed of hydrous titanic acid gel or sol obtained by the sol gel technique or the like, or an amorphous titanium oxide binder such as a peroxotitanic acid decomposition product obtained by adding hydrogen peroxide to hydrous titanic acid gel or sol so that the hydrous titanic acid is dissolved. When the shell parts of metal oxide particles are composed of crystalline titanium oxide, a peroxotitanic acid decomposition product is preferably used as the binder component.

This titanium oxide binder component forms a dense homogeneous adsorption layer on the surface of metal oxide (crystalline titanium oxide) particles. By virtue of this adsorption layer, the obtained metal oxide semiconductor film can have an increased adherence to the electrode. Further, the use of the above titanium oxide binder component causes the mutual contact of metal oxide (crystalline titanium oxide) particles to change from a point contact to a surface contact with the result that not only can the electron mobility be enhanced but also the adsorption amount of photosensitizer can be increased.

In the metal oxide semiconductor film 42, the weight ratio, in terms of oxide, of titanium oxide binder component to metal oxide particles (titanium oxide binder component/metal oxide particles) is preferably in the range of 0.05 to 0.50, still preferably 0.1 to 0.3. When the weight ratio is less than 0.05, it may occur that the absorption of visible-region light is unsatisfactory and that the adsorption amount of photosensitizer cannot be increased. On the other hand, when the weight ratio is higher than 0.50, it may occur that no porous metal oxide semiconductor film is obtained and that the adsorption amount of photosensitizer cannot be increased.

In the metal oxide semiconductor film 42, the pore volume is preferably in the range of 0.05 to 0.8 ml/g, still preferably 0.2 to 0.8 mL/g. Further, in the metal oxide semiconductor film 42, the average pore diameter is preferably in the range of 2 to 250 nm, still preferably 5 to 150 nm. When the pore volume is smaller than 0.05 ml/g, the adsorption amount of photosensitizer is likely to be unfavorably small. On the other hand, when the pore volume is larger than 0.8 ml/g, it may occur that the electron mobility within the film is decreased to thereby lower the photovoltaic transduction efficiency. Also, when the average pore diameter is smaller than 2 nm, the adsorption amount of photosensitizer is likely to be unfavorably small. On the other hand, when the average pore diameter is larger than 250 nm, it may occur that the electron mobility is decreased to thereby lower the photovoltaic transduction efficiency.

This metal oxide semiconductor film 42 can be produced from, for example, the following coating liquid for forming a metal oxide semiconductor film for use in a photovoltaic cell.

The coating liquid for forming a metal oxide semiconductor film for use in a photovoltaic cell according to the present invention comprises the aforementioned metal oxide particles and dispersion medium. Further, the coating liquid may contain a precursor of binder component according to necessity. In particular, when use is made of metal oxide particles wherein the shell parts disposed on the surface of core particles are composed of crystalline titanium oxide obtained by adding an alkali to peroxotitanic acid and heating and aging the mixture, it is preferred that peroxotitanic acid be contained as the precursor of binder component. Peroxotitanic acid, as aforementioned, can be prepared by adding hydrogen peroxide to an aqueous solution of a titanium compound or a sol or gel of titanium oxide hydrate and heating the mixture. The sol or gel of titanium oxide hydrate can be obtained by adding an acid or alkali to an aqueous solution of a titanium compound to thereby effect hydrolysis and, if necessary, carrying out washing, heating and aging of the hydrolyzate. The titanium compound to be employed, although not particularly limited, can be any of, for example, titanium salts such as titanium halides and titanyl sulfate, titanium alkoxides such as tetraalkoxytitaniums, and titanium compounds such as titanium hydride.

In the coating liquid for forming a metal oxide semiconductor film for use in a photovoltaic cell, it is preferred that the weight ratio of precursor of metal oxide binder component to metal oxide particles ($MO_x(1)/MO_x(2)$ wherein $MO_x(1)$ represents a precursor of metal oxide binder component and $MO_x(2)$ represents metal oxide particles) is preferably in the range of 0.03 to 0.50, still preferably 0.1 to 0.3. When the weight ratio is less than 0.03, it may occur that the strength and conductivity of metal oxide semiconductor film are unsatisfactory and that the adsorption amount of photosensitizer cannot be increased. On the other hand, when the weight ratio is higher than 0.50, it may occur that no porous semiconductor film cannot be obtained and that the electron mobility cannot be increased.

These precursor of metal oxide binder component and metal oxide particles are preferably contained in the coating liquid for forming a metal oxide semiconductor film in a concentration ($MO_x(1)+MO_x(2)$) of 1 to 30% by weight, still preferably 2 to 20% by weight.

Dispersion medium can be employed without any particular limitation as long as the precursor of metal oxide binder component and the metal oxide particles can be dispersed therein and the dispersion medium can be removed by drying. In particular, alcohols are preferred.

Furthermore, if necessary, a film formation auxiliary may be contained in this coating liquid for forming a metal oxide semiconductor film for use in a photovoltaic cell. The film formation auxiliary can be, for example, any of polyethylene glycol, polyvinylpyrrolidone, hydroxypropylcellulose, polyacrylic acid and polyvinyl alcohol. When this film formation auxiliary is contained in the coating liquid, the viscosity of the coating liquid is increased to thereby enable obtaining a uniformly dried film. Further, the metal oxide particles are densely packed in the film to thereby increase the bulk density. Thus, a metal oxide semiconductor film exhibiting high adherence to the electrode can be obtained.

The desired metal oxide semiconductor film can be formed by applying this coating liquid for forming a metal oxide semiconductor film for use in a photovoltaic cell to the above substrate overlaid with electrode layer on the surface of electrode layer and by carrying out drying and film hardening.

The coating liquid is preferably applied in such an amount that the thickness of the finally formed metal oxide semiconductor film is in the range of 0.1 to 50 μm. With respect to the application method, the coating liquid can be applied by the use of conventional methods such as the dipping, spinner, spray, roll coater, flexographic printing and screen printing methods. The drying temperature for film is not limited as long as the dispersion medium can be removed. According to necessity, the film may be irradiated with ultraviolet light to thereby harden the film.

Decomposition of the precursor of binder component and hardening of the film can be effected by the ultraviolet irradiation. When the film formation auxiliary is contained in the coating liquid, the film may be heated after the hardening of the film to thereby decompose the film formation auxiliary.

After the hardening of the film by ultraviolet irradiation, the film may be exposed to ions of at least one gas selected from among $O_2$, $N_2$, $H_2$, neon, argon, krypton and other inert gases belonging to Group 0 of the periodic table and annealed. In the exposure to ions, there can be employed known methods such as the method of infiltrating a fixed amount of boron or phosphorus to a fixed depth in a silicon wafer at the time of manufacturing IC and LSI. The annealing is performed by heating at 200 to 500° C., preferably 250 to 400° C., for a period of 10 min to 20 hr.

By virtue of the above exposure to ions, a multiplicity of defects are formed at the surface of metal oxide particles without the remaining of ions in the metal oxide semiconductor film. By virtue of the annealing, not only is the crystallinity of metal oxide particles enhanced but also the mutual joining of individual particles is promoted. As a result, not only is the bonding strength thereof with the photosensitizer increased but also the adsorption amount of photosensitizer is augmented. Furthermore, the promotion of particle joining increases the electron mobility. Consequently, the photovoltaic transduction efficiency can be enhanced.

In the present invention, a photosensitizer is adsorbed on the metal oxide semiconductor film 42.

The photosensitizer is not particularly limited as long as it is capable of absorbing visible region and/or infrared region radiation to thereby excite itself. There can be employed the same photosensitizers as particularized hereinbefore with respect to the first to third photovoltaic cells.

Figure 11:
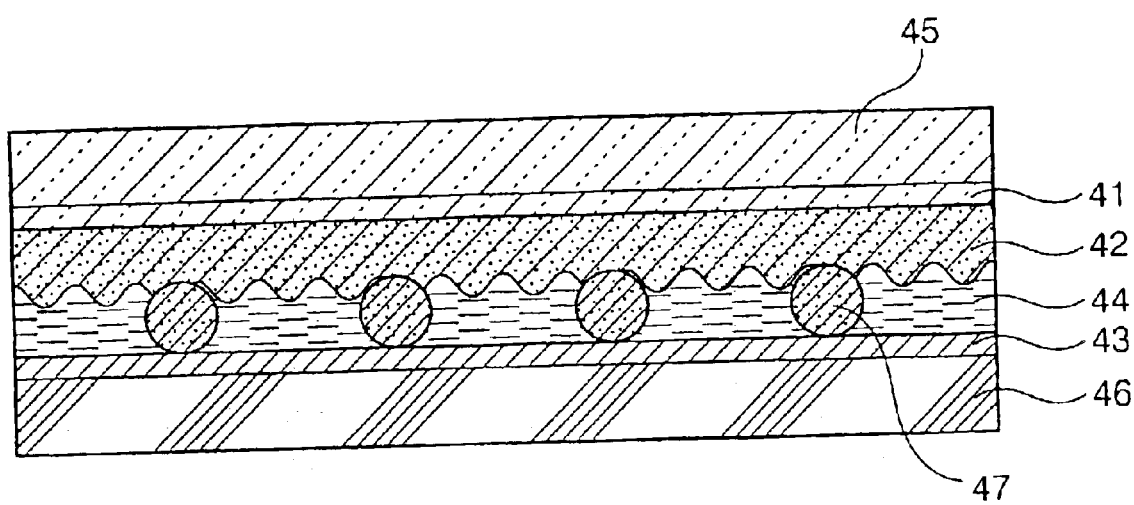
FIG. 11 is a schematic sectional view of another form of the fourth photovoltaic cell according to the present invention.

The photovoltaic cell of the present invention can be structured as follows. Referring to FIG. 11, spacer particles 47 are interposed between the metal oxide semiconductor film 42 and the electrode layer 43. The side faces thereof are sealed with a resin or the like. The electrolyte layer 44 wherein an electrolyte is enclosed is interposed between the electrodes. FIG. 11 is a schematic sectional view of another form of the photovoltaic cell according to the present invention. In FIG. 11, reference numerals 41 to 46 have the same meaning as in FIG. 10. Reference numeral 47 denotes spacer particles.

The spacer particles 47 are not particularly limited as long as the spacer particles do not damage the metal oxide semiconductor film 42 and the electrode layer 43 and are capable of avoiding mutual contacting thereof. Use can be made of, for example, spherical spacer particles and rod-shaped spacer particles. With respect to materials, use can be made of known insulating particles of resins (plastics), organic inorganic composites, metal oxides, ceramics and the like. The interposition of spacer particles 47 enables effectively obtaining the photovoltaic cell wherein the gap between the metal oxide semiconductor film 42 and the electrode layer 3 is as small as about 1 to 50 μm.

The same spacer particles as particularized hereinbefore with respect to the first to third photovoltaic cells can be employed as these spacer particles.

(Photosensitizer)

In the photovoltaic cell of the present invention, a photosensitizer is adsorbed on the semiconductor film 42.

As the photosensitizer, there can be employed the same photosensitizers as particularized hereinbefore with respect to the first to third photovoltaic cells.

The method of adsorbing the photosensitizer is not particularly limited. For example, there can be employed the same method as described hereinbefore with respect to the first to third photovoltaic cells.

In the photovoltaic cell of the present invention, the semiconductor film 42 is arranged opposite to the electrode layer 43. The side faces thereof are sealed with a resin or the like. The electrolyte layer 44 wherein an electrolyte is enclosed is interposed between the electrodes.

As the electrolyte, there can be employed a mixture of an electrochemically active salt and at least one compound capable of forming an oxidation-reduction system therewith as particularized hereinbefore with respect to the first to third photovoltaic cells.

In the present invention, a liquid crystal can be incorporated together with the solvent in the electrolyte layer 44. When a liquid crystal is contained in the electrolyte layer, the quantity of light received does not decrease much, even if the angle of light incidence is increased, owing to the light scattering effect of the liquid crystal to thereby enable stably transducing light energy to electrical energy and withdrawing the resultant electrical energy. Further, rays having been reflected by the semiconductor film without participating in the excitation of photosensitizer, among the incident rays, are reutilized in the irradiation of the spectral sensitizing dye of the semiconductor film by virtue of the light scattering effect of the liquid crystal so that the rays are transduced to electrical energy. Thus, the effect of enhancing the utilization ratio of light energy can be obtained. Still further, when a hydrophobic liquid crystal is used as the above liquid crystal, hygroscopicity is reduced as compared with that exhibited in the use of hygroscopic electrolyte only to thereby enable inhibiting the deterioration attributed to the decomposition of electrolyte, photosensitizer and solvent by moisture absorption. As a result, the long-term stability of the photovoltaic cell can be enhanced. As the liquid crystal, conventional liquid crystals can be used without any particular limitation as long as the solubility of photosensitizer therein is so low that the photosensitizer adsorbed on the semiconductor film is not desorbed and dissolved. Specifically, as the liquid crystal, use can be made of smectic, nematic and cholesteric liquid crystals known as thermotropic liquid crystals. Further, use can be made of lyotropic liquid crystals, polymer liquid crystals, polymer-dispersed liquid crystals and discotic liquid crystals. Of these, when liquid crystals containing fluorine atoms are employed, high hydrophobicity and long-term stability can be realized.

The photovoltaic cell of the present invention is fabricated by first arranging a first substrate 45 having on its surface an electrode layer 41, the electrode layer 41 having on its surface a metal oxide semiconductor film 42 on which a photosensitizer is adsorbed, and a second substrate 46 having on its surface an electrode layer 43 with reducing catalytic activity so that the metal oxide semiconductor film 42 and the electrode layer 43 are opposite to each other; subsequently sealing the side faces with a resin; thereafter interposing an electrolyte 44 between the metal oxide semiconductor film 42 and the transparent electrode layer 43 in a hermetically sealed manner; and finally connecting the electrodes to each other by means of a lead wire.

In this photovoltaic cell of the present invention, the metal oxide semiconductor film is composed of metal oxide particles each having a specified core/shell structure wherein the intrinsic volume resistivity of the core particle parts is higher than the intrinsic volume resistivity of the metal oxide constituting the shell parts. Accordingly, the electron movement from the photosensitizer layer having absorbed light and having been excited to the metal oxide semiconductor film can be rapidly effected. Therefore, the photovoltaic cell which is excellent in photovoltaic transduction efficiency can be obtained.

EFFECT OF THE INVENTION

In the use of the photovoltaic cell of the present invention, because the liquid crystal is contained in the electrolyte layer, the quantity of light received does not decrease much, even if the angle of light incidence is increased, owing to the light scattering effect of the liquid crystal. Therefore, the photovoltaic cell of the present invention enables stably transducing light energy to electrical energy and withdrawing the resultant electrical energy.

Further, this photovoltaic cell is excellent in long-term stability, and is hence useful in a variety of photovoltaic transduction applications.

EXAMPLE

The present invention will be further illustrated below with reference to the following Examples, which in no way limit the scope of the invention.

Example 1

5 g of titanium hydride was suspended in 1 lit. of pure water, 400 g of an aqueous hydrogen peroxide solution of 5% by weight concentration was added to the suspension over a period of 30 min, and heated to 80° C. to effect dissolution. Thus, a solution of peroxotitanic acid was obtained. 90% by volume was divided from the whole amount of the solution, and its pH was adjusted to 9 by adding concentrated aqueous ammonia. The resultant mixture was placed in an autoclave and subjected to a hydrothermal treatment at 250° C. for 5 hr under saturated vapor pressure. Thus, titania colloid particles were obtained. The obtained titania colloid particles were analyzed by X-ray diffractometry, and it was found that they consisted of highly crystalline anatase titanium oxide. The average crystallite diameter and average particle diameter of particulate anatase titanium oxide are listed in Table 1.

Subsequently, the obtained titania colloid particles were concentrated to a concentration of 10% and mixed with the peroxotitanic acid solution so that the weight ratio, in terms of $TiO_2$, of peroxotitanic acid to titania colloid (peroxotitanic acid/titania colloid) was 0.2. Hydroxypropylcellulose (film formation auxiliary) was added to the mixture in an amount of 30% by weight based on the weight of $TiO_2$, specifically the weight, in terms of $TiO_2$, of titanium contents of the mixture. Thus, a coating liquid for forming a metal oxide semiconductor film was obtained.

Thereafter, this coating liquid was applied onto a transparent glass plate overlaid with an electrode layer of fluoride-doped tin oxide on the side of the electrode layer, air dried and irradiated with 6000 $mJ/cm^2$ ultraviolet light by means of a low pressure mercury lamp. Thus, the peroxotitanic acid was decomposed and the coating film was hardened. The coating film was heated at 300° C. for 30 min to thereby carry out decomposition of hydroxypropylcellulose and annealing. Thus, a metal oxide semiconductor film was formed.

With respect to the formed metal oxide semiconductor film, the film thickness and the pore volume and average pore diameter measured by the nitrogen adsorption technique are listed in Table 1.

Adsorption of Photosensitizer

A ruthenium complex of cis-($SCN^-$)-bis(2,2'-bipyridyl-4,4'-dicarboxylato)ruthenium (II) as a photosensitizer was dissolved in ethanol in a concentration of $3 \times 10^{-4}$ mol/lit. The thus obtained ethanol solution of photosensitizer was applied onto the metal oxide semiconductor film by the use of 100 rpm spinner, and dried. These application and drying operations were performed five times.

The photosensitizer adsorption amount of the obtained metal oxide semiconductor film is listed in Table 1.

The adsorption amount is one measured by performing a chemical analysis of ruthenium as a tracer element contained in the photosensitizer with respect to the metal oxide semiconductor film having undergone the application of photosensitizer and drying.

Preparation of Photovoltaic Cell p-Cyanophenyl-pentylpyrimidine of the formula:

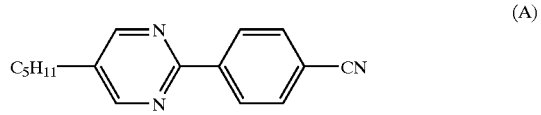

(A)

was used as a liquid crystal. Tetrapropylammonium iodide and iodine were mixed with the liquid crystal in respective concentrations of 0.46 mol/lit. and 0.06 mol/lit. Thus, a mixture for electrolyte layer consisting of a liquid crystal and an electrolyte was obtained.

The above obtained electrode as one: electrode and a transparent glass plate overlaid with an electrode layer of fluoride-doped tin oxide having platinum superimposed thereon, as a counter electrode, were arranged so that the one electrode and the counter electrode were opposite to each other. The side faces thereof were sealed with a resin, and the above mixture for electrolyte layer was interposed between the two electrodes in a hermetically sealed manner. These electrodes were electrically connected to each other by a lead. Thus, a photovoltaic cell was obtained.

The photovoltaic cell was irradiated with light of 100 W/m² intensity at angles of light incidence (against cell surface) of 90°, 60° and 30° by means of a solar simulator. The Voc (voltage in open circuit condition), Joc (density of current flowing at a short circuit), FF (curve factor) and $\eta_{(1)}$ to $\eta_{(3)}$ (transduction efficiency) of the photovoltaic cell were measured.

The photovoltaic cell (A) was heated in a dryer at 75° C. for 500 hr, taken out, and irradiated with light of 100 W/m² intensity at an angle of light incidence of 90° by means of the solar simulator. The $\eta_{(4)}$ (transduction efficiency) of the photovoltaic cell was measured, thereby evaluating the long-term stability of the photovoltaic cell.

The results are given in Table 1.

Example 2

Preparation of Photovoltaic Cell

Acetonitrile and ethylene carbonate were mixed together at a volume ratio (acetonitrile:ethylene carbonate) of 1:4 to thereby obtain a solvent. This solvent was mixed with the same liquid crystal as in Example 1 at a ratio of 30% by volume: 70% by volume. Tetrapropylammonium iodide and iodine were mixed thereinto in respective concentrations of 0.46 and 0.06 mol/lit. Thus, a mixture for electrolyte layer consisting of a liquid crystal and an electrolyte was obtained.

A photovoltaic cell was prepared in the same manner as in Example 1, except that the above mixture for electrolyte layer was interposed between the electrodes. With respect to the photovoltaic cell, the Voc, Joc, FF, η and long-term stability were evaluated. The results are given in Table 1.

Example 3

18.3 g of titanium tetrachloride was diluted with pure water, thereby obtaining an aqueous solution of 1.0% by weight concentration in terms of $TiO_2$. Aqueous ammonia of 15% by weight concentration was added to the aqueous solution under agitation, thereby obtaining a white slurry of pH 9.5. This slurry was filtered and washed, thereby obtaining a cake of titanium oxide hydrate gel of 10.2% by weight in terms of $TiO_2$. This cake was mixed with 400 g of a 5% aqueous solution of hydrogen peroxide, and heated to 80° C. to thereby effect dissolution. Thus, a solution of peroxotitanic acid was obtained.

90% by volume was divided from the whole amount of the solution, and its pH was adjusted to 9 by adding concentrated aqueous ammonia. The resultant mixture was placed in an autoclave and subjected to a hydrothermal treatment at 250° C. for 5 hr under saturated vapor pressure. Thus, titania colloid particles were obtained. The obtained titania colloid particles were analyzed by X-ray diffractometry, and it was found that they consisted of highly crystalline anatase titanium oxide. The crystallite diameter and average particle diameter of the obtained particles are listed in Table 1.

Subsequently, the obtained titania colloid particles were concentrated to a concentration of 10% and mixed with the peroxotitanic acid solution remaining after the above division. Hydroxypropylcellulose (film formation auxiliary) was added to the obtained mixture in an amount of 30% by weight based on the weight of $TiO_2$, specifically the weight, in terms of $TiO_2$, of titanium contents of the mixture. Thus, a coating liquid for forming a metal oxide semiconductor film was obtained. From this coating liquid, a metal oxide semiconductor film was formed in the same manner as in Example 1.

The thickness, pore volume and average pore diameter of the obtained metal oxide semiconductor film are listed in Table 1.

Adsorption of Photosensitizer

An adsorption of photosensitizer was performed in the same manner as in Example 1. The photosensitizer adsorption amount of the obtained metal oxide semiconductor film is listed in Table 1.

Preparation of Photovoltaic Cell

A photovoltaic cell was prepared in the same manner as in Example 1, except that 2,3-difluoro-4-ethylene phenyl-p-pentylcyclohexane of the formula:

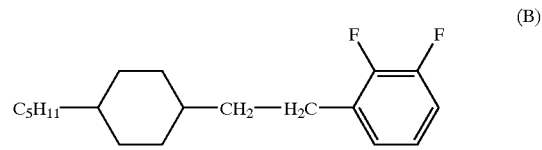

(B)

was employed as a liquid crystal. With respect to the photovoltaic cell, the Voc, Joc, FF, η and long-term stability were evaluated. The results are given in Table 1.

Example 4

Preparation of Photovoltaic Cell

A photovoltaic cell was prepared in the same manner as in Example 3, except that 2-(4'-heptyloxyphenyl)-6-dodecylthiobenzothiazole of the formula:

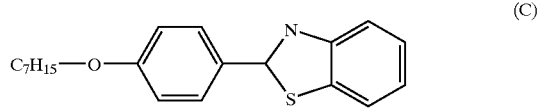

(C)

was employed as a liquid crystal. With respect to the photovoltaic cell, the Voc, Joc, FF, η and long-term stability were evaluated. The results are given in Table 1.

Example 5

Titania colloid particles were prepared in the same manner as in Example 1. The obtained titania colloid particles were dried and fired at 550° C. for 2 hr, thereby obtaining titania particles. The resultant titania particles were analyzed by X-ray diffractometry, and it was found that they consisted of rutile titanium oxide in which anatase titanium oxide was mixed. The crystallite diameter and average particle diameter of obtained particles are listed in Table 1.

Subsequently, the obtained fired titania particles were dispersed in water, thereby obtaining a dispersion of 10% by weight concentration. This dispersion was mixed with the same peroxotitanic acid solution as in Example 1 so that the weight ratio, in terms of $TiO_2$, of peroxotitanic acid to titania colloid (peroxotitanic acid/titania colloid) was 0.2. Hydroxypropylcellulose (film formation auxiliary) was added to the obtained mixture in an amount of 30% by weight based on the weight of $TiO_2$, specifically the weight, in terms of $TiO_2$, of titanium contents of the mixture. Thus, a coating liquid for forming a metal oxide semiconductor film was obtained.

Thereafter, this coating liquid was applied onto a transparent glass plate overlaid with an electrode layer of fluoride-doped tin oxide on the side of the electrode layer, air dried and irradiated with 6000 mJ/cm$^2$ ultraviolet light by means of a low pressure mercury lamp. Thus, the peroxotitanic acid was decomposed and the coating film was hardened. The coating film was heated at 300° C. for 30 min to thereby carry out decomposition of hydroxypropylcellulose and annealing. Thus, a metal oxide semiconductor film was formed.

With respect to the formed metal oxide semiconductor film, the film thickness and the pore volume and average pore diameter measured by the nitrogen adsorption technique are listed in Table 1.

Adsorption of Photosensitizer

An adsorption of photosensitizer was performed in the same manner as in Example 1. The photosensitizer adsorption amount of the obtained metal oxide semiconductor film is listed in Table 1.

Preparation of Photovoltaic Cell

Acetonitrile and ethylene carbonate were mixed together at a volume ratio (acetonitrile:ethylene carbonate) of 1:4 to thereby obtain a solvent. This solvent was mixed with the liquid crystal of the formula (A) at a ratio of 50% by volume: 50% by volume. Tetrapropylammonium iodide and iodine were mixed thereinto in respective concentrations of 0.46 and 0.06 mol/lit. Thus, a mixture for electrolyte layer consisting of a liquid crystal and an electrolyte was obtained.

A photovoltaic cell was prepared in the same manner as in Example 1, except that the above mixture for electrolyte layer was interposed between the electrodes. With respect to the photovoltaic cell, the Voc, Joc, FF, η and long-term stability were evaluated.

The results are given in Table 1.

Example 6

18.3 g of titanium tetrachloride was diluted with pure water, thereby obtaining an aqueous solution of 1.0% by weight concentration in terms of $TiO_2$. Aqueous ammonia of 15% by weight concentration was added to the aqueous solution under agitation, thereby obtaining a white slurry of pH 9.5. This slurry was filtered and washed, and suspended in pure water to thereby obtain a slurry of titanium oxide hydrate gel of 0.6% by weight concentration in terms of $TiO_2$. The pH of the slurry was adjusted to 2 by adding hydrochloric acid. The resultant slurry was placed in an autoclave and subjected to a hydrothermal treatment at 180° C. for 5 hr under saturated vapor pressure. Thus, titania colloid particles were obtained. The crystal form of the obtained particles was analyzed by X-ray diffractometry, and it was found that the particles were amorphous. The average particle diameter of the titania colloid particles is listed in Table 1.

Subsequently, the obtained titania colloid particles were concentrated to a concentration of 10% by weight. Hydroxypropylcellulose as a film formation auxiliary was added thereto in an amount of 30% by weight in terms of $TiO_2$. Thus, a coating liquid for forming a semiconductor film was obtained. Thereafter, this coating liquid was applied onto a transparent glass plate overlaid with an electrode layer of fluoride-doped tin oxide on the side of the electrode layer, air dried and irradiated with 6000 mJ/cm$^2$ ultraviolet light by means of a low pressure mercury lamp. Thus, the coating film was hardened. Further, the coating film was heated at 300° C. for 30 min to thereby carry out decomposition of hydroxypropylcellulose and annealing. Thus, a metal oxide semiconductor film was formed.

With respect to the formed metal oxide semiconductor film, the film thickness and the pore volume and average pore diameter measured by the nitrogen adsorption technique are listed in Table 1.

Adsorption of Photosensitizer

An adsorption of photosensitizer was performed in the same manner as in Example 1. The photosensitizer adsorption amount of the obtained metal oxide semiconductor film is listed in Table 1.

Preparation of Photovoltaic Cell

Acetonitrile and ethylene carbonate were mixed together at a volume ratio (acetonitrile:ethylene carbonate) of 1:4 to thereby obtain a solvent. This solvent was mixed with the same liquid crystal as in Example 1 at a ratio of 30% by volume 70% by volume. Tetrapropylammonium iodide and iodine were mixed thereinto in respective concentrations of 0.46 and 0.06 mol/lit. Thus, a mixture for electrolyte layer consisting of a liquid crystal and an electrolyte was obtained.

A photovoltaic cell was prepared in the same manner as in Example 1, except that the above mixture for electrolyte layer was interposed between the electrodes. With respect to the photovoltaic cell, the Voc, Joc, FF, η and long-term stability were evaluated. The results are given in Table 1.

Comparative Example 1

Preparation of Photovoltaic Cell

Acetonitrile and ethylene carbonate were mixed together at a volume ratio (acetonitrile:ethylene carbonate) of 1:4.

Tetrapropylammonium iodide and iodine were mixed into the mixture in respective concentrations of 0.46 and 0.06 mol/lit. Thus, a mixture for electrolyte layer was obtained.

A photovoltaic cell was prepared in the same manner as in Example 6, except that the above mixture for electrolyte layer was interposed between the electrodes. With respect to the photovoltaic cell, the Voc, Joc, FF, η and long-term stability were evaluated. The results are given in Table 1.

Production Example 1 a) Preparation of Spacer Particle
(1) Silica Particle
 Preparation of Silica Particle (1)
 249 g of silica particles (SW-5.0 produced by Catalysts & Chemicals Industries Co., Ltd., average particle diameter: 5.0 μm, and 10% K-value: 4800 Kgf/mm$^2$) were dispersed

TABLE 1

| | titanium oxide particle | | | semiconductor film | | | | electrolyte layer | |
|---|---|---|---|---|---|---|---|---|---|
| | | | | | | average | ads. | electrolyte | |
| | crystal form | Diameter of crystallite (nm) | average diameter (nm) | thickness (μm) | pore volume (ml/g) | pore diameter (nm) | amt. of photo.* μg/cm$^2$ | type | con- centration (mol/L) |
| Example 1 | anatase | 30 | 40 | 12 | 0.6 | 18 | 200 | TPAI I$_2$ | 0.46 0.06 |
| Example 2 | anatase | 30 | 40 | 12 | 0.6 | 18 | 200 | TPAI I$_2$ | 0.46 0.06 |
| Example 3 | anatase | 18 | 25 | 12 | 0.5 | 18 | 260 | TPAI I$_2$ | 0.46 0.06 |
| Example 4 | anatase | 10 | 25 | 12 | 0.5 | 18 | 260 | TPAI I$_2$ | 0.46 0.06 |
| Example 5 | rutile (min. ana.)** | 5 | 45 | 12 | 0.6 | 28 | 110 | TPAI I$_2$ | 0.46 0.06 |
| Example 6 | amor- phous | — | 4 | 7 | 0.4 | 6 | 160 | TPAI I$_2$ | 0.46 0.06 |
| Comp. Ex 1 | amor- phous | — | 4 | 7 | 0.4 | 6 | 160 | TPAI I$_2$ | 0.46 0.06 |

| | electrolyte layer | | | | photovoltaic cell | | | angle of incident light | | | long-term stability |
|---|---|---|---|---|---|---|---|---|---|---|---|
| | liquid crystal compound | | solvent | | | | | transduction efficiency | | | |
| | type | ratio in electrolyte layer (v %) | type | ratio in electrolyte layer (v %) | Voc (V) | Joc mA/cm$^2$ | FF | (1) η 90° | (2) η 60° | (3) η 30° | (4) η % |
| Example 1 | A | 100 | — | — | 0.70 | 1.45 | 0.75 | 7.7 | 7.7 100% | 6.4 83% | 6.9 90% |
| Example 2 | A | 70 | AN EC | 6 24 | 0.71 | 1.45 | 0.75 | 7.7 | 7.7 100% | 5.8 75% | 6.5 85% |
| Example 3 | B | 100 | — | — | 0.72 | 1.45 | 0.74 | 7.9 | 7.9 100% | 6.3 80% | 7.7 98% |
| Example 4 | C | 100 | — | — | 0.69 | 1.48 | 0.73 | 7.0 | 7.0 100% | 4.9 70% | 6.1 87% |
| Example 5 | A | 50 | AN EC | 50 | 0.71 | 1.35 | 0.62 | 5.9 | 5.9 100% | 2.2 37% | 4.7 80% |
| Example 6 | A | 70 | AN EC | 6 24 | 0.60 | 1.42 | 0.55 | 4.7 | 4.7 100% | 3.5 74% | 4.0 85% |
| Comp. Ex 1 | — | — | AN EC | 20 80 | 0.55 | 1.40 | 0.40 | 1.8 | 1.7 94% | 1.1 61% | 1.3 72% |

*ads. amt. of photo. = adsorption amount of photosensitizer
**rutile (min. ana.) = rutile titanium oxide containing a minute amount of anatase)
TPAI = tetrapropylammonium iodide
I$_2$ = iodine
A = p-cyanophenyl-pentylpyrimidine
B = 2,3-difluoro-4-ethylene-phenyl-p-pentylcyclohexane
C = 2-(4'-heptyloxyphenyl)-6-dodecylthiobenzothiazole
AN = acetonitrile
EC = ethylene carbonate As apparent from Table 1, the photovoltaic cell which exhibits high photovoltaic transduction efficiency and is excellent in long-term stability can be obtained when a liquid crystal compound is contained in the electrolyte.

in a solution consisting of a mixture of 3685.5 g of ethanol, 1365 g of pure water and 921.5 g of aqueous ammonia of 28% by weight concentration. 161 g of a 1% by weight aqueous solution of NaOH was added and subjected to ultrasonic treatment. Thus, a seed particle dispersion was obtained.

This seed particle dispersion was placed in an autoclave, and heated to 120° C. While maintaining this temperature, 4 g of a silicic acid solution ($SiO_2$ concentration: 5.0% by weight) obtained by dealkalifying an aqueous solution of sodium silicate by means of a cation exchange resin was first added thereto. Subsequently, 131.5 g of a liquid mixture of ethanol, water and ammonia (weight ratio=1.0:0.3:0.1) and 21 g of ethyl silicate (concentration in terms of $SiO_2$:28% by weight) were simultaneously added to the dispersion.

The above operation was repeated in such a manner that what was finally added was the silicic acid solution. Over a period of 5 hr, there were added 120.5 g of the silicic acid solution, 3937.5 g of the liquid mixture of ethanol, water and ammonia, and 625 g of the ethyl silicate.

After the addition of the whole amounts, 117 g of a 1% by weight aqueous solution of NaOH was added, and the mixture was maintained at 150° C. for 1 hr. Thus, a silica particle dispersion was obtained Thereafter, particles were separated from the dispersion, washed and dried at 200° C. Thus, silica particles (1) were obtained.

The average diameter and 10% K-value of obtained silica particles (1) were 6.1 μm and 4500 $Kgf/mm^2$, respectively.

(2) Preparation of Polyorganosiloxane Particle (2)

Preparation of Seed Particle Dispersion 13,162 g of pure water was placed in a vessel of 20 lit. internal volume, and the liquid temperature was controlled at 0±1° C. under agitation. 1,500 g of methyltrimethoxysilane whose temperature was controlled at 5° C. in advance was slowly added so that methyltrimethoxysilane and pure water were separated from each other into vertical two layers. Thereafter, the layers were cooled under agitation until the temperature of the upper layer of methyltrimethoxysilane became 1±1° C.

Separately, 6.98 g of isobutyl alcohol and 2.70 g of aqueous ammonia of 28% by weight concentration were added to 279.2 g of pure water. 15.0 g of anionic surfactant (sodium octylnaphthalenesulfonate) was added thereto. Thus, there was obtained a surfactant-mixed solution whose temperature was controlled at 5±1° C.

The obtained surfactant-mixed solution was added to the lower layer (water layer) of the vertical two layers over a period of 60 min while stirring to such a degree that complete mixing of the upper and lower layers was not effected.

The stirring was continued for 2 hr. Thus, a seed particle dispersion was obtained. Part of the seed particle dispersion was harvested, and particles were separated therefrom. The particles were washed, and dried at 110° C. for 2 hr. Thus, powdery seed particles were obtained. A scanning electron micrograph of the obtained seed particles was taken, and the particle diameter distribution and particle diameter variation coefficient (CV value) were measured therefrom.

As a result, it was found that the average diameter and CV value of the seed particles were 5.2 μm and 2.4%, respectively.

Growth of Seed Particles 6,008 g of methyltrimethoxysilane and a liquid mixture of 233,528 g of pure water, 589 g of isobutyl alcohol and 4.8 g of aqueous ammonia of 28% by weight concentration (the temperature of the liquid mixture controlled at 5±3° C.) were added to 14,966 g of the obtained seed particle dispersion each over a period of 24 hr while maintaining the liquid temperature at 0±1° C. Thus, a polyorganosiloxane fine-particle dispersion was obtained.

Heating of Fine Particles of Polyorganosiloxane

Fine particles of polyorganosiloxane were separated from the obtained dispersion, washed, and dried at 110° C. for 2 hr. The fine particles of polyorganosiloxane was heated at 440° C. for 3 hr in a nitrogen gas atmosphere containing 10% of ammonia gas. Thus, desired fine particles of polyorganosiloxane were obtained.

With respect to the obtained fine particles of polyorganosiloxane, the particle diameter distribution, particle diameter variation coefficient (CV value) and 10% K-value were measured.

The results are given in Table 2.

(3) Preparation of Core/Shell Structure Particle (3)

Step of Activating Spherical Core Particle 100 g of silica particles (SW-5.0 produced by Catalysts & Chemicals Industries Co., Ltd., average particle diameter: 5.0 μm, particle diameter variation coefficient: 1.0%, and 10% K-value: 4800 $Kgf/mm^2$) was dispersed in 2000 g of pure water. The pH of the dispersion was adjusted to 10 by the use of a 1% by weight aqueous solution of NaOH. The resultant dispersion was heated up to 80° C., and heating and agitation thereof was continued for 60 min. The dispersion was cooled to 30° C., and 100 g of an ion exchange resin was added. The dispersion was dealkalified under agitation, and silica particles were separated, washed and dried at 110° C. Thus, activated spherical core particles were obtained.

Preparation of Hydrophobic Nuclear Particle 50 g of obtained spherical core particles were dispersed in 333 g of methyl alcohol, and subjected to ultrasonic treatment to thereby monodisperse the spherical core particles. A solution of a mixture of 25 g of hexamethyldisilazane and 25 g of methyl alcohol was added to the dispersion under agitation, and the agitation was continued for 12 hr. Particles were separated, washed with alcohol, and dried at 80° C. for 2 hr. Thus, hydrophobic nuclear particles were obtained.

Formation of Elastic Coating Layer (Shell)

10 g of obtained hydrophobic nuclear particles were dispersed in 526 g of a 5% by weight aqueous solution of n-butanol. To the dispersion, 1.2 g of sodium octylnaphthalenesulfonate as a surfactant was added, and 60 g of methyltrimethoxysilane was added under ultrasonic vibration. Thus, there was obtained a dispersion of two separate layers wherein the lower layer consisted of a layer of hydrophobic nuclear particle dispersion while the upper layer consisted of a layer of methyltrimethoxysilane. Subsequently, 12.0 g of a 0.28% by weight aqueous solution of $NH_3$ was added to the layer of hydrophobic nuclear particle dispersion lower over a period of 2 hr while stirring to such a degree that complete mixing of the upper and lower layers was not effected. After the addition of the aqueous solution of $NH_3$, hydrolysis of methyltrimethoxysilane was carried out while continuing the stirring for about 2 hr until the upper layer of methyltrimethoxysilane disappeared. Thus, an elastic coating layer of polyorganosiloxane was superimposed on the nuclear particles. After the completion of reaction, remaining gel was removed, and the mixture was allowed to stand still at 80° C. for 12 hr. The resultant particles were harvested, washed with ethanol, and dried at 80° C. for 2 hr. Further, the particles were heated at 300° C. in air for 3 hr. Thus, particles of core/shell structure (3) having the elastic coating layer were obtained.

The average diameter and particle diameter variation coefficient of obtained particles were 7.2 μm and 2.0%, respectively.

(4) Resin-Coated Particle (4)

Use was made of resin-coated particles (silica particles of 8.0 μm average diameter (AW-2-8 produced by Catalysts &

Chemicals Industries Co., Ltd.) coated with 0.15 μm thick polymethyl methacrylate (PMMA) resin). The polymethyl methacrylate was a resin having a softening point of 120° C.

(5) Resin Particle 125 ml of a 5% aqueous solution of polyvinyl alcohol was charged in a 500 ml flask. A dissolved monomer mixture consisting of 31.3 g of divinylbenzene, 31.3 g of dipentaerythritol hexaacrylate and 1.25 g of benzoyl peroxide was added, and heated up to 80° C. Polymerization reaction was carried out at that temperature for 10 hr, which was continued at 95° C. for 1 hr. After the completion of the reaction, particles were washed with hot water, dried and classified.

The average diameter of obtained resin particles was 11.1 μm, and the 10% K-value thereof was 403 Kgf/mm$^2$.

(6) Preparation of Core/Shell Structure Particle (6)

10 g of the above obtained core/shell structure particle (3) were dispersed in 200 g of pure water. The pH of the dispersion was adjusted to 10 by the use of a 1% by weight aqueous solution of NaOH. The resultant dispersion was heated up to 80° C., and heating and agitation thereof was continued for 60 min. The dispersion was cooled to 30° C., and 10 g of an ion exchange resin was added. The dispersion was well dealkalified under agitation, and silica particles were separated, washed and dried at 110° C. Thus, activated spherical core particles were obtained.

10 g of obtained spherical core particles were mopnodispersed in 67 g of methyl alcohol under ultrasonic vibration to thereby obtain a spherical core particle dispersion. A solution of a mixture of 5 g of hexamethylsilazane and 5 g of methyl alcohol was added to the obtained spherical core particle dispersion under agitation, and the agitation was continued for 12 hr. Separation was effected, and the solid contents were washed with alcohol and dried at 80° C. for 2 hr. Thus, hydrophobic nuclear particles (average particle diameter: 7.2 μm) were obtained.

10 g of obtained hydrophobic nuclear particles were dispersed in 5000 g of a 5% by weight aqueous solution of n-butanol. To the dispersion, 1.2 g of sodium octylnaphthalenesulfonate as a surfactant and 50 g of hydroxycellulose (molecular weight: 100,000) were added, and 5000 g of methyltrimethoxysilane was added under ultrasonic vibration. Thus, there was obtained a dispersion of two separate layers wherein the lower layer consisted of a layer of hydrophobic nuclear particle dispersion while the upper layer consisted of a layer of methyltrimethoxysilane.

Subsequently, 120 g of a 0.28% by weight aqueous solution of NH$_3$ was added to the layer of hydrophobic nuclear particle dispersion lower over a period of 5 hr while stirring to such a degree that complete mixing of the upper and lower layers was not effected. After the addition of the aqueous solution of NH$_3$, hydrolysis of methyltrimethoxysilane was carried out while continuing the stirring for about 2 hr until the upper layer of methyltrimethoxysilane disappeared.

After the completion of reaction, remaining gel was removed, and the mixture was allowed to stand still at 80° C. for 12 hr.

The resultant particles were harvested, washed with ethanol, and dried at 80° C. for 2 hr. Further, the particles were heated at 300° C. in air for 3 hr. Thus, particles of core/shell structure (6) having an elastic coating layer were obtained.

b) Preparation of Titanium Particle (A) for Semiconductor Film 18.3 g of titanium tetrachloride was diluted with pure water, thereby obtaining an aqueous solution of 1.0% by weight concentration in terms of TiO$_2$. Aqueous ammonia of 15% by weight concentration was added to the aqueous solution under agitation, thereby obtaining a white slurry of pH 9.5.

This slurry was filtered and washed, thereby obtaining a cake of titanium oxide hydrate gel of 10.2% by weight in terms of TiO$_2$. This cake was mixed with 400 g of a 5% aqueous solution of hydrogen peroxide, and heated to 80° C. to thereby effect dissolution. Thus, a solution of peroxotitanic acid was obtained. 90% by volume (remaining 10% by volume used in working example) was divided from the whole amount of the solution, and its pH was adjusted to 9 by adding concentrated aqueous ammonia. The resultant mixture was placed in an autoclave and subjected to a hydrothermal treatment at 250° C. for 5 hr under saturated vapor pressure. Thus, titania colloid particles (A) were obtained. The crystal system of obtained particles was analyzed by X-ray diffractometry, which showed that it consisted of highly crystalline anatase titanium oxide. The crystallite diameter and average particle diameter of the obtained particles were 5.5 nm and 15 nm, respectively.

The crystallite diameter and average particle diameter of the obtained particles are listed in Table 2.

Example 7

Formation of Metal Oxide Semiconductor Film

The dispersion of titania colloid particles for semiconductor film (A) was concentrated to a concentration of 10% and mixed with the remaining 10% by volume of peroxotitanic acid solution. Hydroxypropylcellulose (film formation auxiliary) was added to the obtained mixture in an amount of 30% by weight based on the weight of TiO$_2$, specifically the weight, in terms of TiO$_2$, of titanium contents of the mixture. Thus, a coating liquid for semiconductor film formation was obtained. In this coating liquid, the weight ratio, in terms of TiO$_2$, of titanium oxide binder component/crystalline titanium oxide particles was 0.11.

Thereafter, this coating liquid was applied onto a transparent glass plate overlaid with an electrode layer of fluoride-doped tin oxide on the side of the electrode layer, air dried and irradiated with 6000 mJ/cm$^2$ ultraviolet light by means of a low pressure mercury lamp. Thus, the peroxotitanic acid was decomposed and the coating film was hardened. The coating film was heated at 300° C. for 30 min to thereby carry out decomposition of hydroxypropylcellulose and annealing. Thus, a metal oxide semiconductor film was formed.

With respect to the formed metal oxide semiconductor film, the film thickness and the pore volume and average pore diameter measured by the nitrogen adsorption technique are listed in Table 2.

Adsorption of Photosensitizer

A ruthenium complex of cis-(SCN$^-$)-bis(2,2'-bipyridyl-4, 4'-dicarboxylato)ruthenium (II) as a photosensitizer was dissolved in ethanol in a concentration of 3×10$^{-4}$ mol/lit. The thus obtained ethanol solution of photosensitizer was applied onto the metal oxide semiconductor film by the use of 100 rpm spinner, and dried. These application and drying operations were performed five times.

The photosensitizer adsorption amount of the obtained metal oxide semiconductor film is listed in Table 2.

Preparation of Photovoltaic Cell

Acetonitrile and ethylene carbonate were mixed together at a volume ratio (acetonitrile:ethylene carbonate) of 1:4 to thereby obtain a solvent. Tetrapropylammonium iodide and iodine were mixed into the solvent in respective concentrations of 0.46 and 0.06 mol/lit. Thus, an electrolyte solution (a-1) was obtained.

Separately, silica particles (1) produced in the Production Example were added to a solvent consisting of a mixture of 350 cc of pure water, 120 cc of isopropyl alcohol and 30 cc of ethyl alcohol in a concentration of 1% by weight. The mixture was subjected to ultrasonic vibration under agitation, thereby obtaining an application liquid wherein the silica particles (1) were dispersed. This application liquid was sprayed over the above semiconductor film formed on the electrode through a nozzle arranged at a distance of 70 cm from the electrode under a pressure of 3 Kg/cm$^2$ so that the average particle spread density was about 130 particles/mm$^2$, and dried. The above electrode overlaid with spacer particles, as one electrode, and a transparent glass plate overlaid with an electrode layer of fluoride-doped tin oxide having platinum superimposed thereon, as a counter electrode, were arranged so that the one electrode and the counter electrode were opposite to each other. The side faces thereof were sealed with a resin, and the above electrolyte solution (a-1) was interposed between the two electrodes in a hermetically sealed manner. These electrodes were electrically connected to each other by a lead. Thus, a photovoltaic cell (a) was obtained.

The photovoltaic cell (a) was irradiated with light of 100 W/m$^2$ intensity at an angle of light incidence (against cell surface) of 90° by means of a solar simulator. The Voc (voltage in open circuit condition), Joc (density of current flowing at a short circuit), FF (curve factor) and η (transduction efficiency) of the photovoltaic cell were measured. Further, the photovoltaic cell (a) was heated in a dryer at 75° C. for 500 hr, taken out, and irradiated with light of 100 W/m$^2$ intensity at an angle of light incidence of 90° by means of the solar simulator to thereby measure the η (transduction efficiency) of the photovoltaic cell. Thus, the long-term stability of the photovoltaic cell was evaluated.

The results are given in Table 2.

Examples 8 to 12

Photovoltaic cells (b) to (f) were prepared in the same manner as in Example 7, except that the polyorganosiloxane particles (2), core/shell structure particles (3), resin-coated silica particles (4), resin particles (5) and core/shell structure particles (6) produced in the Production Example were respectively employed in place of the silica particles (1), and evaluated in the same manner as in Example 1.

The results are given in Table 2.

Example 13

Formation of Metal Oxide Semiconductor Film

The titania colloid particles (A) obtained in the Production Example were concentrated to a concentration of 10% and mixed with the above peroxotitanic acid solution. Hydroxypropylcellulose as a film formation auxiliary was added to the obtained mixture in an amount of 30% by weight based on the weight of TiO$_2$, specifically the weight, in terms of TiO$_2$, of titanium contents of the mixture. Thus, a coating liquid for semiconductor film formation was obtained.

Thereafter, this coating liquid was applied onto a transparent polyimide film substrate overlaid with an electrode layer of fluoride-doped tin oxide on the side of the electrode layer, air dried and irradiated with 6000 mJ/cm$^2$ ultraviolet light by means of a low pressure mercury lamp. Decomposition of hydroxypropylcellulose and annealing were carried out. Thus, a metal oxide semiconductor film was formed.

With respect to the formed metal oxide semiconductor film, the film thickness and the pore volume and average pore diameter measured by the nitrogen adsorption technique are listed in Table 2.

Adsorption of Photosensitizer

In the same manner as in Example 7, the photosensitizer solution was applied onto the metal oxide semiconductor film by the use of 100 rpm spinner, and dried. These application and drying operations were performed five times.

The photosensitizer adsorption amount of the obtained metal oxide semiconductor film is listed in Table 2.

Preparation of Photovoltaic Cell

Acetonitrile, ethylene carbonate and liquid crystal compound (p-cyanophenyl-pentylpyrimidine) were mixed together at a volume ratio (acetonitrile:ethylene carbonate:p-cyanophenyl-pentylpyrimidine) of 1:4:5. Tetrapropylammonium iodide and iodine were mixed into the mixture in respective concentrations of 0.46 and 0.06 mol/lit. Thus, an electrolyte solution (a-2) was obtained.

Separately, silica particles (SW-2.0 produced by Catalysts & Chemicals Industries Co., Ltd., average particle diameter: 2.0 μm, and 10% K-value: 4800 Kgf/mm$^2$) were added to a solvent consisting of a mixture of 350 cc of pure water, 120 cc of isopropyl alcohol and 30 cc of ethyl alcohol in a concentration of 1% by weight. The mixture was subjected to ultrasonic vibration under agitation, thereby obtaining an application liquid wherein the silica particles were dispersed. This application liquid was sprayed over the above semiconductor film through a nozzle arranged at a distance of 70 cm from the above electrode under a pressure of 3 kg/cm$^2$ so that the average particle spread density was 130 particles/mm$^2$, and dried.

The above electrode overlaid with spacer particles, as one electrode, and a PET film substrate overlaid with an electrode layer of fluoride-doped tin oxide having platinum superimposed thereon, as a counter electrode, were arranged so that the one electrode and the counter electrode were opposite to each other. The side faces thereof were sealed with a resin, and the above electrolyte solution (a-2) was interposed between the two electrodes in a hermetically sealed manner. These electrodes were electrically connected to each other by a lead. Thus, a photovoltaic cell (G) was obtained. The photovoltaic cell was evaluated in the same manner as in Example 7.

The results are given in Table 2.

During the evaluation, the center of the photovoltaic cell was compressed so that the photovoltaic cell was curved to a depth of 5 mm per 5 cm of the width. However, no performance change was recognized.

Comparative Example 2

Photovoltaic cell (H) wherein the inter-electrode gap was 10 μm was prepared in the same manner as in Example 7, except that silica particles (1) were not used. The photovoltaic cell was evaluated in the same manner as in Example 7.

The results are given in Table 2.

Comparative Example 3

Photovoltaic cell (I) wherein the inter-electrode gap was 100 μm was prepared in the same manner as in Comparative Example 2, and was evaluated in the same manner as in Example 7.

The results are given in Table 2.

TABLE 2

| | spacer particle | | | | semiconductor film | | | | | ads. |
|---|---|---|---|---|---|---|---|---|---|---|
| | | | | | | Average | | | | |
| | | average diameter (nm) | 10% K value | CV value | thickness ($\mu$m) | pore volume (ml/g) | pore diameter (nm) | surface roughness ($\mu$m) | Rs/D | amt. of photo.* $\mu$g/cm$^2$ |
| Example 7 | silica | 6.1 | 4800 | 1.7 | 9 | 0.6 | 10 | 0.4 | 0.066 | 200 |
| Example 8 | org./inorg. composite particle | 13.1 | 450 | 1.9 | 9 | 0.6 | 10 | 0.4 | 0.031 | 200 |
| Example 9 | core/shell structure particle | 7.2 | 980 | 2 | 9 | 0.6 | 10 | 0.4 | 0.056 | 200 |
| Example 10 | resin-coated silica particle | 8.3 | 550 | 3.5 | 9 | 0.6 | 10 | 0.4 | 0.048 | 200 |
| Example 11 | resin | 11.1 | 403 | 8.5 | 9 | 0.6 | 10 | 0.4 | 0.036 | 200 |
| Example 12 | org./inorg. composite particle | 45 | 990 | 12 | 9 | 0.6 | 10 | 0.4 | 0.0009 | 200 |
| Example 13 | silica | 2 | 4800 | 1.5 | 7 | 0.6 | 10 | 0.35 | 0.175 | 210 |
| Comp. Ex 2 | not used | — | — | — | 9 | 0.6 | 10 | 0.4 | — | 200 |
| Comp. Ex 3 | not used | — | — | — | 9 | 0.6 | 10 | 0.4 | — | 200 |

| | electrode layer | | Inter- | photovoltaic cell | | | | | |
|---|---|---|---|---|---|---|---|---|---|
| | surface roughness ($\mu$m) | Rs/D | Electrode gap ($\mu$m) | Voc (V) | Joc mA/cm$^2$ | FF | transduction efficiency $\eta(1)$ | long-term stability $\eta(2)$ (%) | |
| Example 7 | 0.25 | 0.041 | 6.1 | 0.71 | 1.47 | 0.72 | 7.7 | 7.2 94% | |
| Example 8 | 0.25 | 0.019 | 13.1 | 0.69 | 1.4 | 0.7 | 6.8 | 6.2 91% | |
| Example 9 | 0.25 | 0.035 | 7.2 | 0.7 | 1.45 | 0.72 | 7.3 | 6.8 93% | |
| Example 10 | 0.25 | 0.03 | 8 | 0.7 | 1.44 | 0.71 | 7.2 | 6.8 94% | |
| Example 11 | 0.25 | 0.023 | 11.1 | 0.7 | 1.42 | 0.7 | 7 | 6.7 96% | |
| Example 12 | 0.25 | 0.0006 | 45 | 0.69 | 1.21 | 0.67 | 5.6 | 4.8 86% | |
| Example 13 | 0.2 | 0.1 | 2 | 0.49 | 1.03 | 0.72 | 3.6 | 3.4 94% | |
| Comp. Ex 2 | 0.25 | | 10 | 0.65 | 1.27 | 0.62 | 5.1 | 3.9 76% | |
| Comp. Ex 3 | 0.25 | | 100 | 0.65 | 1.07 | 0.55 | 3.8 | 2.7 71% | | ads. amt. of photo. = adsorption amount of photosensitizer

Example 14

Colloidal titanium oxide particles (A) produced in the same manner as in Production Example 1 were concentrated to a concentration of 10%, and mixed with the above peroxotitanic acid solution so that the weight ratio, in terms of TiO$_2$, of peroxotitanic acid to colloidal titanium oxide particles (A) (peroxotitanic acid/titanium oxide particles) was 0.1. Silica particles (1) produced in Production Example 1, as spacer particles, and hydroxypropylcellulose, as a film formation auxiliary, were added to the obtained mixture in an amount of 0.05% by weight and 30% by weight, respectively, based on the weight of TiO$_2$, specifically the weight, in terms of TiO$_2$, of titanium contents of the mixture. Thus, a coating liquid for semiconductor film formation was obtained.

Thereafter, this coating liquid was applied onto a transparent glass plate overlaid with an electrode layer of fluoride-doped tin oxide on the side of the electrode layer, air dried and irradiated with 6000 mJ/cm$^2$ ultraviolet light by means of a low pressure mercury lamp. Thus, the peroxotitanic acid was decomposed and the coating film was hardened. The coating film was heated at 300° C. for 30 min to thereby carry out decomposition of hydroxypropylcellulose and annealing. Thus, a metal oxide semiconductor film was formed.

With respect to the formed metal oxide semiconductor film, the film thickness and the pore volume and average pore diameter measured by the nitrogen adsorption technique are listed in Table 3.

Adsorption of Photosensitizer

A ruthenium complex of cis-(SCN$^-$)-bis(2,2'-bipyridyl-4,4'-dicarboxylato)ruthenium (II) as a photosensitizer was dissolved in ethanol in a concentration of 3×10$^{-4}$ mol/lit. The thus obtained ethanol solution of photosensitizer was applied onto the metal oxide semiconductor film (A) by the use of 100 rpm spinner, and dried. These application and drying operations were performed five times. The photosensitizer adsorption amount of the obtained metal oxide semiconductor film is listed in Table 3.

Preparation of Photovoltaic Cell

Acetonitrile and ethylene carbonate were mixed together at a volume ratio (acetonitrile:ethylene carbonate) of 1:4 to thereby obtain a solvent. Tetrapropylammonium iodide and iodine were mixed into the solvent in respective concentrations of 0.46 and 0.06 mol/lit. Thus, an electrolyte solution (a-3) was obtained.

The above transparent glass plate having its electrode overlaid with the metal oxide semiconductor film, as one electrode, and a transparent glass plate overlaid with an electrode layer of fluoride-doped tin oxide having platinum superimposed thereon, as a counter electrode, were arranged so that the one electrode and the counter electrode were opposite to each other. The side faces thereof were sealed with a resin, and the above electrolyte solution (a-3) was interposed between the two electrodes in a hermetically sealed manner. These electrodes-were electrically connected to each other by a lead. Thus, a photovoltaic cell (A) was obtained.

The photovoltaic cell (A) was irradiated with light of 100 W/m$^2$ intensity at an angle of light incidence (against cell surface) of 90° by means of a solar simulator. The Voc (voltage in open circuit condition), Joc (density of current flowing at a short circuit), FF (curve factor) and η (transduction efficiency) of the photovoltaic cell were measured. Further, the photovoltaic cell (A) was heated in a dryer at 75° C. for 500 hr, taken out, and irradiated with light of 100 W/m$^2$ intensity at an angle of light incidence of 900 by means of the solar simulator to thereby measure the η (transduction efficiency) of the photovoltaic cell. Thus, the long-term stability of the photovoltaic cell was evaluated.

The results are given in Table 3.

Examples 15 to 20

Photovoltaic cells (B) to (F) were prepared in the same manner as in Example 14, except that the polyorganosiloxane particles (2), core/shell structure particles (3), resin-coated silica particles (4), resin particles (5) and particles overlaid with elastic coating layer (6) produced in the Production Example 1 were respectively used as spacer particles in place of the silica particles (1), and evaluated in the same manner as in Example 14.

The results are given in Table 3.

Example 21

Formation of Metal Oxide Semiconductor Film

Colloidal titanium oxide particles (A) produced in the same manner as in Production Example 1 were concentrated to a concentration of 10%, and mixed with the above peroxotitanic acid solution so that the weight ratio, in terms of TiO$_2$, of peroxotitanic acid to colloidal titanium oxide particles (A) (peroxotitanic acid/titanium oxide particles) was 0.1. Silica particles (SW-2.0 produced by Catalysts & Chemicals Industries Co., Ltd., average particle diameter: 2.0 μm, and 10% K-value: 4800 Kgf/mm$^2$), as spacer particles, and hydroxypropylcellulose, as a film formation auxiliary, were added to the obtained mixture in an amount of 0.2% by weight and 30% by weight, respectively, based on the weight of TiO$_2$, specifically the weight, in terms of TiO$_2$, of titanium contents of the mixture. Thus, a coating liquid for semiconductor film formation was obtained.

Thereafter, this coating liquid was applied onto a transparent polyimide film substrate overlaid with an electrode layer of fluoride-doped tin oxide on the side of the electrode layer, air dried and irradiated with 6000 mJ/cm$^2$ ultraviolet light by means of a low pressure mercury lamp. Thus, the peroxotitanic acid was decomposed and the coating film was hardened. The coating film was heated at 350° C. for 30 min to thereby carry out decomposition of hydroxypropylcellulose and annealing. Thus, a metal oxide semiconductor film was formed.

With respect to the formed metal oxide semiconductor film, the film thickness and the pore volume and average pore diameter measured by the nitrogen adsorption technique are listed in Table 3.

Adsorption of Photosensitizer

In the same manner as in Example 14, the photosensitizer solution was applied onto the metal oxide semiconductor film by the use of 100 rpm spinner, and dried. These application and drying operations were performed five times. The photosensitizer adsorption amount of the obtained metal oxide semiconductor film is listed in Table 3.

Preparation of Photovoltaic Cell

Acetonitrile, ethylene carbonate and, as a liquid crystal, p-cyanophenyl-pentylpyrimidine were mixed together at a volume ratio (acetonitrile:ethylene carbonate:p-cyanophenyl-pentylpyrimidine) of 1:4:5 to thereby obtain a solvent. Tetrapropylammonium iodide and iodine were mixed into the solvent in respective concentrations of 0.46 and 0.06 mol/lit. Thus, an electrolyte solution (a-4) was obtained.

The above electrode overlaid with the metal oxide semiconductor film, as one electrode, and a PET film substrate overlaid with an electrode layer of fluoride-doped tin oxide having platinum superimposed thereon, as a counter electrode, were arranged so that the one electrode and the counter electrode were opposite to each other. The side faces thereof were sealed with a resin, and the above electrolyte solution (a-4) was interposed between the two electrodes in a hermetically sealed manner. These electrodes were electrically connected to each other by a lead. Thus, a photovoltaic cell (G) was obtained. The photovoltaic cell was evaluated in the same manner as in Example 14. The results are given in the table. During the evaluation, the center of the photovoltaic cell was compressed so that the photovoltaic cell was curved to a depth of 5 mm per 5 cm of the width. However, no performance change was recognized.

Comparative Example 4

Photovoltaic cell (H) wherein the inter-electrode gap was about 10 μm was prepared in the same manner as in Example 14, except that silica particles (1) were not used. The photovoltaic cell was evaluated in the same manner as in Example 14.

The results are given in Table 3.

Comparative Example 5

Photovoltaic cell (I) wherein the inter-electrode gap was about 100 μm was prepared in the same manner as in Comparative Example 4, and was evaluated in the same manner as in Example 14.

The results are given in Table 3.

TABLE 3

| | spacer particle | | | | semiconductor film | | | | photovoltaic cell | | | |
|---|---|---|---|---|---|---|---|---|---|---|---|---|
| | | average diameter μm | 10% K value | CV value % | thickness μm | pore vol. ml/g | Average pore diameter nm | ads. amt. of photo.* μg/cm² | inter-electrode gap μm | Voc V | Joc mA/cm² | FF | transduction efficiency η(1) % |
| Example 14 | silica particle (1) | 6.1 | 4800 | 1.7 | 5 | 0.6 | 10 | 200 | 1.1 | 0.71 | 0.75 | 0.75 | 4.0 |
| Example 15 | polyorganosiloxane particle (2) | 13.1 | 450 | 1.9 | 10 | 0.6 | 10 | 200 | 3.1 | 0.69 | 1.49 | 0.75 | 7.7 |
| Example 16 | core/shell structure particle (3) | 7.2 | 980 | 2 | 5 | 0.6 | 10 | 200 | 2.2 | 0.70 | 0.72 | 0.75 | 3.8 |
| Example 17 | resin-coated silica particle (4) | 8.3 | 550 | 3.5 | 6 | 0.6 | 10 | 200 | 2 | 0.70 | 0.91 | 0.75 | 4.8 |
| Example 18 | resin particle (5) | 11.1 | 403 | 8.5 | 10 | 0.6 | 10 | 200 | 1.1 | 0.70 | 1.10 | 0.72 | 5.5 |
| Example 19 | elastic coating layer particle (6) | 45 | 990 | 12 | 10 | 0.6 | 10 | 200 | 35 | 0.69 | 1.59 | 0.70 | 7.7 |
| Example 20 | silica particle (7) | 2.0 | 4800 | 1.5 | 1.5 | 0.6 | 10 | 210 | 0.5 | 0.49 | 0.54 | 0.75 | 2.0 |
| Comp. Ex 4 | no spacer | — | — | — | 9 | 0.6 | 10 | 200 | 10 | 0.65 | 1.27 | 0.62 | 5.1 |
| Comp. Ex 5 | no spacer | — | — | — | 9 | 0.6 | 10 | 200 | 100 | 0.65 | 7.00 | 0.55 | 3.8 |

*ads. amt. of photo. = adsorption amount of photosensitizer

Production Example 2

Metal oxide particles of core/shell structure comprising a core particle part and a shell part (I) to (V) and metal oxide particles not having a core/shell structure (VI) and (VII), listed in the table, were prepared in the following manner.

Preparation of Metal Oxide Particle (I)

57.7 g of tin chloride and 14.0 g of stannous fluoride were dissolved in 100 g of methanol to thereby obtain a solution. The obtained solution was added to 1000 g of pure water under agitation at 90° C. over a period of 4 hr to thereby carry out hydrolysis. The formed precipitate was collected by filtration, washed and fired at 500° C. in dry air for 2 hr. Thus, powdery fluoride-doped tin oxide was obtained. 30 g of the powder was added to 70 g of an aqueous solution of potassium hydroxide (3.0 g of KOH contained). This mixture, while maintaining the temperature at 30° C., was milled by means of a sand mill for 3 hr to thereby obtain a sol. This sol was treated with an ion exchange resin to thereby dealkalify the same, and coarse particles were deposited and removed by means of an ultracentrifuge. Thus, there was obtained a dispersion of core particles of fluoride-doped tin oxide. Ethyl cellosolve was added to this dispersion, and a solvent replacement was performed by means of a rotary evaporator. Thus, there was obtained an ethyl cellosolve dispersion of core particles of fluoride-doped tin oxide. An aliquot of particles were withdrawn, dried, and fired at 500° C. for 2 hr. The average particle diameter and conductivity thereof were measured. The results are given in Table 4.

Subsequently, ethyl cellosolve was added to the dispersion of core particles of fluoride-doped tin oxide to thereby obtain a core particle dispersion of 5% by weight concentration.

Titanium acetylacetonatoalkoxide separately obtained by reacting 1.2 g of acetylacetone with 3.5 g of isopropoxy titanate was added to 100 g of the above dispersion and heated at 80° C. so as to coat the core particles with a titanium hydrolyzate (titanium hydroxide). 10 g of aqueous hydrogen peroxide of 36% by weight concentration was added thereto and heated.

Further, a separately prepared peroxotitanic acid solution was added, and the pH was adjusted to 12 by the addition of quaternary ammonium hydroxide. The mixture was autoclaved at 200° C. for 12 hr. Thus, metal oxide particles (I) were obtained.

The average diameter of obtained metal oxide particles (I) was measured. Half (½) of the difference between the average diameter of obtained metal oxide particles (I) and the average diameter of core particles was regarded as the thickness of the shell parts. The results are listed in Table 4.

Preparation of Peroxotitanic Acid Solution

Titanium tetrachloride was diluted with pure water, thereby obtaining an aqueous solution of titanium tetrachloride having a concentration of 1.0% by weight in terms of $TiO_2$. Aqueous ammonia of 15% by weight concentration was added to the aqueous solution under agitation, thereby obtaining a white slurry of pH 9.5. This slurry was filtered and washed, thereby obtaining a cake of titanium oxide hydrate gel of 10.2% by weight in terms of $TiO_2$. 190 g of this cake was mixed with 670 g of a 5% aqueous-solution of hydrogen peroxide, and heated to 80° C. to thereby effect dissolution. Thus, a solution of peroxotitanic acid was obtained.

Preparation of Metal Oxide Particle (II)

79.9 g of indium nitrate was dissolved in 686 g of water to thereby obtain a solution. 12.7 g of potassium stannate was dissolved in a 10% by weight potassium hydroxide solution to thereby obtain another solution. These solutions were added to 1000 g of pure water maintained at 50° C. over a period of 2 hr. During the addition, the pH of the system was maintained at 11. Thus, a dispersion of Sn-doped indium oxide hydrate was obtained. The Sn-doped indium oxide hydrate was harvested from the dispersion by filtration, washed and dried. The Sn-doped indium oxide hydrate was fired at 350° C. in air for 3 hr, and further fired at 600° C. in air for 2 hr. Thus, Sn-doped indium oxide particles were obtained. These particles were dispersed in pure water in a concentration of 30% by weight, and the pH thereof was adjusted to 3.5 with the use of an aqueous solution of nitric acid. This mixture, while maintaining the temperature at 30° C., was milled by means of a sand mill for 3 hr to thereby obtain a sol. This sol was treated with an ion exchange resin to thereby remove nitrate ions, and coarse particles were deposited and removed by means of an ultracentrifuge. Thus, there was obtained a dispersion of core particles of tin-doped indium oxide. Ethyl cellosolve was added to this dispersion, and a solvent replacement was performed by means of a rotary evaporator. Thus, there was obtained an ethyl cellosolve dispersion of core particles of tin-doped indium oxide. An aliquot of particles were withdrawn, dried, and fired at 500° C. for 2 hr. The average particle diameter and conductivity thereof were measured. The results are given in Table 4.

Subsequently, ethyl cellosolve was added to the dispersion of core particles of tin-doped indium oxide to thereby obtain a core particle dispersion of 5% by weight concentration.

Titanium acetylacetonatoalkoxide separately obtained by reacting 1.2 g of acetylacetone with 3.5 g of isopropoxy titanate was added to 300 g of the above dispersion and heated at 80° C. so as to coat the core particles with a titanium hydrolyzate (titanium hydroxide). 10 g of aqueous hydrogen peroxide of 36% by weight concentration was added thereto and heated.

Further, a separately prepared peroxotitanic acid solution was added, and the pH was adjusted to 12 by the addition of quaternary ammonium hydroxide. The mixture was autoclaved at 200° C. for 12 hr. Thus, metal oxide particles (II) were obtained.

The average diameter and film thickness of obtained metal oxide particles (II) were measured.

The results are listed in Table 4.

Preparation of Metal Oxide Particle (III)

In the same manner as in the preparation of metal oxide particles (II), ethyl cellosolve was added to the dispersion of core particles of tin-doped indium oxide to thereby obtain a core particle dispersion of 5% by weight concentration.

Titanium acetylacetonatoalkoxide separately obtained by reacting 1.2 g of acetylacetone with 3.5 g of isopropoxy titanate was added to 100 g of the above dispersion and heated at 80° C. so as to coat the core particles with a titanium hydrolyzate (titanium hydroxide). 10 g of aqueous hydrogen peroxide of 36% by weight concentration was added thereto and heated.

Further, a separately prepared peroxotitanic acid solution was added, and the pH was adjusted to 12 by the addition of quaternary ammonium hydroxide. The mixture was autoclaved at 200° C. for 12 hr. Thus, metal oxide particles (III) were obtained.

The average diameter and film thickness of obtained metal oxide particles (III) were measured.

The results are listed in Table 4.

Preparation of Metal Oxide Particle (IV)

In the same manner as in the preparation of metal oxide particles (II), ethyl cellosolve was added to the dispersion of core particles of tin-doped indium oxide to thereby obtain a core particle dispersion of 5% by weight concentration.

Titanium acetylacetonatoalkoxide separately obtained by reacting 0.6 g of acetylacetone with 1.75 g of isopropoxy titanate was added to 50 g of the above dispersion and heated at 80° C. so as to coat the core particles with a titanium hydrolyzate (titanium hydroxide). 5 g of aqueous hydrogen peroxide of 36% by weight concentration was added thereto and heated.

Further, a separately prepared peroxotitanic acid solution was added, and the pH was adjusted to 12 by the addition of quaternary ammonium hydroxide. The mixture was autoclaved at 200° C. for 12 hr. Thus, metal oxide particles (IV) were obtained.

The average diameter and film thickness of obtained metal oxide particles (IV) were measured. The results are listed in Table 4.

Preparation of Metal Oxide Particle (V)

136 g of zinc chloride and 10 g of aluminum chloride were dissolved in 1000 g of pure water. The obtained solution was added to 3000 g of pure water maintained at 50° C. over a period of 2 hr. During the addition, the pH of the system was maintained at 9.0. Thus, a dispersion of Al-doped zinc oxide hydrate was obtained. The Al-doped zinc oxide hydrate was harvested from the dispersion by filtration, washed and dried. The Al-doped zinc oxide hydrate was fired at 350° C. in air for 3 hr. and further fired at 700° C. in air for 2 hr. Thus, Al-doped zinc oxide particles were obtained. These particles were dispersed in diacetone alcohol in a concentration of 30% by weight. This dispersion, while maintaining the temperature at 30° C., was milled by means of a sand mill for 3 hr to thereby obtain a sol. Subsequently, from the sol, coarse particles were deposited and removed by means of an ultracentrifuge. Thus, there was obtained a dispersion of core particles of Al-doped zinc oxide. An aliquot of particles were withdrawn, dried, and fired at 500° C. for 2 hr. The average particle diameter and conductivity thereof were measured. The results are given in Table 4.

Thereafter, diacetone alcohol was added to the dispersion of Al-doped zinc oxide particles to thereby obtain a core particle dispersion of 5% by weight concentration.

Titanium acetylacetonatoalkoxide separately obtained by reacting 1.2 g of acetylacetone with 3.5 g of isopropoxy titanate was added to 100 g of the above dispersion and heated at 80° C. so as to coat the core particles with a titanium hydrolyzate (titanium hydroxide). 10 g of aqueous hydrogen peroxide of 36% by weight concentration was added thereto and heated.

Further, a separately prepared peroxotitanic acid solution was added, and the pH was adjusted to 12 by the addition of quaternary ammonium hydroxide. The mixture was autoclaved at 200° C. for 12 hr Thus, metal oxide particles (V) were obtained.

The average diameter and film thickness of obtained metal oxide particles (V) were measured.

The results are listed in Table 4.

Preparation of Metal Oxide Particle (VI)

18.3 g of titanium tetrachloride was diluted with pure water, thereby obtaining an aqueous solution of titanium tetrachloride having a concentration of 1.0% by weight in terms of $TiO_2$. Aqueous ammonia of 15% by weight concentration was added to the aqueous solution under agitation, thereby obtaining a white slurry of pH 9.5. This slurry was filtered and washed, thereby obtaining a cake of titanium oxide hydrate gel of 10.2% by weight in terms of $TiO_2$. This cake was mixed with 400 g of a 5% aqueous solution of hydrogen peroxide, and heated to 80° C. to thereby effect dissolution. Thus, a solution of peroxotitanic acid was obtained.

The pH thereof was adjusted to 10 by adding concentrated aqueous ammonia. The resultant mixture was placed in an autoclave and subjected to a hydrothermal treatment at 250° C. for 8 hr under saturated vapor pressure. Thus, titania colloid particles (VI) were obtained. The obtained titania colloid particles were analyzed by X-ray diffractometry, and it was found that they consisted of highly crystalline anatase titanium oxide. The average particle diameter thereof was 40 nm.

Preparation of Metal Oxide Particle (VII)

Silica sol (Cataloid SI-30P produced by Catalysts & Chemicals Industries Co., Ltd., average particle diameter: 30 nm, aqueous sol of 30% by weight concentration) was employed as a core particle dispersion. Ethyl cellosolve was incorporated in this sol, and a solvent replacement was performed by means of a rotary evaporator. Thus, there was obtained an ethyl cellosolve dispersion of silica core particles.

Subsequently, ethyl cellosolve was added to the dispersion of silica core particles to thereby obtain a core particle dispersion of 5% by weight concentration.

Titanium acetylacetonatoalkoxide separately obtained by reacting 1.2 g of acetylacetone with 3.5 g of isopropoxy titanate was added to 100 g of the above dispersion and heated at 80° C. so as to coat the core particles with a titanium hydrolyzate (titanium hydroxide). 10 g of aqueous hydrogen peroxide of 36% by weight concentration was added thereto and heated.

Further, a separately prepared peroxotitanic acid solution was added, and the pH was adjusted to 12 by the addition of quaternary ammonium hydroxide. The mixture was autoclaved at 200° C. for 12 hr. Thus, metal oxide particles (VII) were obtained.

The average diameter and film thickness of obtained metal oxide particles (VII) were measured.

The results are listed in Table 4.

Example 21

Formation of Metal Oxide Semiconductor Film

The metal oxide particles (I) obtained in Production Example 2 were concentrated to a concentration of 10% and mixed with the above peroxotitanic acid solution so that the weight ratio, in terms of oxide, of peroxotitanic acid solution to metal oxide particles (peroxotitanic acid/metal oxide particles) was 0.1. Hydroxypropylcellulose as a film formation auxiliary was added to the obtained mixture in an amount of 30% by weight based on the total oxide weight of the mixture. Thus, a coating liquid for semiconductor film formation was obtained.

Thereafter, this coating liquid was applied onto a transparent glass plate overlaid with an electrode layer of fluoride-doped tin oxide on the side of the electrode layer, air dried and irradiated with 6000 $mJ/cm^2$ ultraviolet light by means of a low pressure mercury lamp. Thus, the peroxotitanic acid was decomposed and the coating film was hardened. The coating film was heated at 300° C. for 30 min to thereby carry out decomposition of hydroxypropylcellulose and annealing. Thus, a metal oxide semiconductor film was formed.

With respect to the formed metal oxide semiconductor film, the film thickness and the pore volume and average pore diameter measured by the nitrogen adsorption technique are listed in Table 4.

Adsorption of Photosensitizer

A ruthenium complex of cis-($SCN^-$)-bis(2,2'-bipyridyl-4, 4'-dicarboxylato)ruthenium (II) as a photosensitizer was dissolved in ethanol in a concentration of $3 \times 10^{-4}$ mol/lit. The thus obtained ethanol solution of photosensitizer was applied onto the metal oxide semiconductor film by the use of 100 rpm spinner, and dried. These application and drying operations were performed five times. The photosensitizer adsorption amount of the obtained metal oxide semiconductor film is listed in Table 4.

Preparation of Photovoltaic Cell

Acetonitrile and ethylene carbonate were mixed together at a volume ratio (acetonitrile:ethylene carbonate) of 1:4 to thereby obtain a solvent. Tetrapropylammonium iodide and iodine were mixed into the solvent in respective concentrations of 0.46 and 0.06 mol/lit. Thus, an electrolyte solution was obtained.

The above prepared electrode, as one electrode, and a transparent glass plate overlaid with an electrode layer of fluoride-doped tin Oxide having platinum superimposed thereon, as a counter electrode, were arranged so that the one electrode and the counter electrode were opposite to each other. The side faces thereof were sealed with a resin, and the above electrolyte solution was interposed between the two electrodes in a hermetically sealed manner. These electrodes were electrically connected to each other by a lead. Thus, a photovoltaic cell (I) was obtained.

The photovoltaic cell (I) was irradiated with light of 100 $W/m^2$ intensity at an angle of light incidence (against cell surface) of 90° by means of a solar simulator. The Voc (voltage in open circuit condition), Joc (density of current flowing at a short circuit), FF (curve factor) and η (transduction efficiency) of the photovoltaic cell were measured.

The results are given in Table 4.

Examples 22 to 25

Photovoltaic cells were prepared in the same manner as in Example 21, except that the metal oxide particles (II) to (V) produced in Production Example 2 were respectively used in place of the metal oxide particles (I), and evaluated in the same manner as in Example 21.

The results are given in Table 4.

Comparative Examples 6 and 7

Photovoltaic cells (VI) and (VII) were prepared in the same manner as in Example 21, except that the metal oxide particles (VI) and (VII) indicated in the reference example were respectively used in place of the metal oxide particles (I), and evaluated in the same manner as in Example 21.

The results are given in Table 4.

TABLE 4

| | | metal oxide particle | | | | shell part | | semiconductor film | | | | photovoltaic cell | | | |
|---|---|---|---|---|---|---|---|---|---|---|---|---|---|---|---|
| | | core particle | | | | | | | | | | | | | |
| | | average | | | | | film, | film | average | ads. | | | | | |
| No. | | particle diameter (nm) | metal oxide | average diameter (nm) | int. vol. res.* ($\Omega \cdot cm$) | metal oxide | thickness (nm) | thickness ($\mu$m) | pore volume (ml/g) | pore diameter (nm) | amt. of photo.** ($\mu$g/cm$^2$) | Voc (V) | Joc (mA/cm$^2$) | FF | $\eta$ (%) |
| Example 21 | I | 20 | F-doped SnO$_2$ | 10 | 0.1 | anatase | 5 | 7 | 0.4 | 25 | 180 | 0.80 | 1.25 | 0.79 | 7.9 |
| Example 22 | II | 30 | Sn-doped In$_2$O$_3$ | 20 | 0.01 | anatase | 5 | 15 | 0.5 | 60 | 210 | 0.75 | 1.35 | 0.79 | 8.0 |
| Example 23 | III | 40 | Sn-doped In$_2$O$_3$ | 20 | 0.01 | brucite | 10 | 15 | 0.6 | 66 | 200 | 0.75 | 1.37 | 0.80 | 8.2 |
| Example 24 | IV | 50 | Sn-doped In$_2$O$_3$ | 20 | 0.01 | rutile | 15 | 20 | 0.6 | 85 | 190 | 0.75 | 1.37 | 0.75 | 7.7 |
| Example 25 | V | 40 | Al-doped ZnO | 30 | 30 | anatase | 5 | 20 | 0.6 | 55 | 170 | 0.72 | 1.43 | 0.74 | 7.6 |
| Comp. Ex. 6 | VI | 40 | TiO$_2$ (anatase) | 40 | over 10$^{14}$**** | no shell part formed | | 12 | 0.6 | 18 | 200 | 0.71 | 1.47 | 0.72 | 7.5 |
| Comp. Ex. 7 | VII | 40 | SiO$_2$ | 30 | over 10$^{14}$**** | anatase | 5 | 15 | 0.4 | 20 | 180 | 0.70 | 0.45 | 0.65 | 2.0 |

*int. vol. res. = intrinsic volume resistivity
**ads. amt. of photo. = adsorption amount of photosensitizer
****namely insulating

We claim:

1. A photovoltaic cell comprising:

a first substrate having on its surface an electrode layer, said electrode layer having on its surface a semiconductor film on which a photosensitizer is adsorbed, and a second substrate having on its surface an electrode layer, said first substrate and said second substrate arranged so that the electrode layer overlaid with the semiconductor film and the electrode layer on the second substrate are opposite to each other with an electrolyte sealed between the semiconductor film and the electrode layer on the second substrate, wherein spacer particles are spread in locations positioned across a plane interposed between the semiconductor film and the electrode layer on the second substrate thereby uniformizing a gap between the semiconductor film and the electrode layer on the second substrate, and wherein at least one of the electrode-layer-having substrates is transparent.

2. The photovoltaic cell as claimed in claim 1, wherein a surface of the semiconductor film that is brought into contact with the spacer particles has a roughness ($R_s$) of 5 $\mu$m or less, and also a surface of the electrode layer on the second substrate that is brought into contact with the spacer particles has a roughness ($R_E$) of 5 $\mu$m or less, and wherein the ratio of surface roughness ($R_S$) to average diameter of spacer particles (D), $R_S/D$ and the ratio of surface roughness ($R_E$) to average diameter of spacer particles (D), $R_E/D$, are both 0.2 or less.

3. The photovoltaic cell as claimed in claim 1, wherein the spacer particles are spherical particles having an average diameter (d) of 1 to 100 $\mu$m.

4. The photovoltaic cell as claimed in claim 1, wherein the semiconductor film is a film of metal oxide semiconductor.

* * * * *